US010282681B2

(12) United States Patent
Wang

(10) Patent No.: US 10,282,681 B2
(45) Date of Patent: May 7, 2019

(54) SYSTEM AND METHOD FOR CUSTOMIZABLE PRESCHEDULED DISPATCHING FOR TRANSPORTATION SERVICES

(71) Applicant: OPERR Technologies, Inc., Flushing, NY (US)

(72) Inventor: Kevin Sunlin Wang, Flushing, NY (US)

(73) Assignee: OPERR TECHNOLOGIES, INC., Flushing, NY (US)

( * ) Notice: Subject to any disclaimer, the term of this patent is extended or adjusted under 35 U.S.C. 154(b) by 0 days.

(21) Appl. No.: 15/715,012

(22) Filed: Sep. 25, 2017

(65) Prior Publication Data

US 2018/0012151 A1    Jan. 11, 2018

Related U.S. Application Data

(63) Continuation-in-part of application No. 15/239,783, filed on Aug. 17, 2016.
(Continued)

(51) Int. Cl.
*G06Q 10/00* (2012.01)
*G06Q 10/02* (2012.01)
(Continued)

(52) U.S. Cl.
CPC ......... *G06Q 10/02* (2013.01); *G06Q 10/0639* (2013.01); *G06Q 10/08* (2013.01); *G06Q 10/1093* (2013.01)

(58) Field of Classification Search
CPC .... G06Q 10/02; G06Q 10/0639; G06Q 10/08; G06Q 10/1093
(Continued)

(56) References Cited

U.S. PATENT DOCUMENTS 5,604,676 A * 2/1997 Penzias ............... G06Q 10/047
700/90
6,336,097 B1 * 1/2002 Scipioni ............... G06Q 10/02
705/400
(Continued)

OTHER PUBLICATIONS

Wang, Xing ( )May 2013) Optimizing Ride Matches for Dynamic Ride-Sharing System. (Doctoral Thesis). Retrieved from https://smartech.gatech.edu/bitstream/handle/1853/47668/wang_xing_201305_phd.pdf (Year: 2013).*
(Continued)

*Primary Examiner* — Folashade Anderson
(74) *Attorney, Agent, or Firm* — Monte, Wang & Associates, PLLC

(57) ABSTRACT

A method for providing a customized platform for facilitating prescheduling transport and delivery services based on estimated driver availability and compatibility with individual customers. A service provider and customer may be matched based on favorites, preferred or regular and a dispatch matrix of preferences, limitations, and indicators. Customers and service providers may create favorites lists, preferred lists, and blacklists according to feedback with each other to enable customers to receive service from their favorite service providers and vice versa, and prevent service between customers and service providers when blacklisted. Customers and drivers may also negotiate prices for requested services based at least in part on supply and demand. The method provides for automatically scheduling transportation services in which service requests are received and automatically scheduled based on a partner driver arrangement using a micro-dispatch system without live dispatching agent involvement.

30 Claims, 12 Drawing Sheets

Related U.S. Application Data

(60) Provisional application No. 62/325,602, filed on Apr. 21, 2016, provisional application No. 62/290,778, filed on Feb. 3, 2016, provisional application No. 62/505,626, filed on May 12, 2017, provisional application No. 62/399,129, filed on Sep. 23, 2016.

(51) Int. Cl.
*G06Q 10/10* (2012.01)
*G06Q 10/06* (2012.01)
*G06Q 10/08* (2012.01)

(58) Field of Classification Search
USPC .......................................................... 705/7.12
See application file for complete search history.

(56) References Cited

U.S. PATENT DOCUMENTS

| | | | |
|---|---|---|---|
| 6,430,496 B1 | 8/2002 | Smith | |
| 7,080,019 B1* | 7/2006 | Hurzeler | G06Q 10/025 705/6 |
| 7,113,864 B2* | 9/2006 | Smith | G06Q 10/025 701/117 |
| 7,840,427 B2* | 11/2010 | O'Sullivan | G06Q 10/00 340/988 |
| 8,533,215 B2 | 9/2013 | Szabo et al. | |
| 8,554,608 B1 | 10/2013 | O'Connor | |
| 8,990,288 B2 | 3/2015 | Hendrey | |
| 9,141,112 B1* | 9/2015 | Loo | G05D 1/0293 |
| 9,151,614 B2 | 10/2015 | Poppen et al. | |
| 9,392,418 B2 | 7/2016 | Lubeck et al. | |
| 9,672,734 B1* | 6/2017 | Ratnasingam | G08G 1/0112 |
| 9,706,367 B2 | 7/2017 | Tao et al. | |
| 9,762,601 B2* | 9/2017 | Truong | H04L 63/1425 |
| 2001/0037174 A1 | 11/2001 | Dickerson | |
| 2005/0038696 A1 | 2/2005 | Kalevik et al. | |
| 2006/0034201 A1* | 2/2006 | Umeda | G06Q 30/02 370/310 |
| 2006/0059023 A1* | 3/2006 | Mashinsky | G06Q 10/02 705/5 |
| 2008/0033652 A1 | 2/2008 | Hensley et al. | |
| 2008/0195428 A1 | 8/2008 | O'Sullivan | |
| 2009/0089105 A1* | 4/2009 | Wu | G06Q 10/02 705/5 |
| 2011/0153629 A1 | 6/2011 | Lehmann et al. | |
| 2012/0089482 A1* | 4/2012 | Patel | G06Q 10/02 705/26.41 |
| 2012/0239452 A1 | 9/2012 | Trivedi et al. | |
| 2013/0132140 A1 | 5/2013 | Amin et al. | |
| 2013/0290040 A1* | 10/2013 | Perry | G06Q 10/02 705/5 |
| 2014/0067491 A1 | 3/2014 | James et al. | |
| 2014/0229258 A1 | 8/2014 | Seriani | |
| 2014/0278838 A1 | 9/2014 | Novak | |
| 2015/0099461 A1 | 4/2015 | Holden et al. | |
| 2015/0339923 A1 | 11/2015 | Konig et al. | |
| 2016/0042303 A1 | 2/2016 | Medina et al. | |
| 2016/0117610 A1* | 4/2016 | Ikeda | G06Q 10/02 705/5 |
| 2016/0364823 A1 | 12/2016 | Cao | |
| 2018/0253805 A1* | 9/2018 | Kelly | G06Q 50/12 |

OTHER PUBLICATIONS

Search Report & Written Opinion of ISA for PCT/US2017/015226, dated Mar. 2, 2017 (11 pages).
Search Report and Written Opinion of ISA for PCT/US2017/05330, dated Jan. 19, 2018 (19 pages).

\* cited by examiner

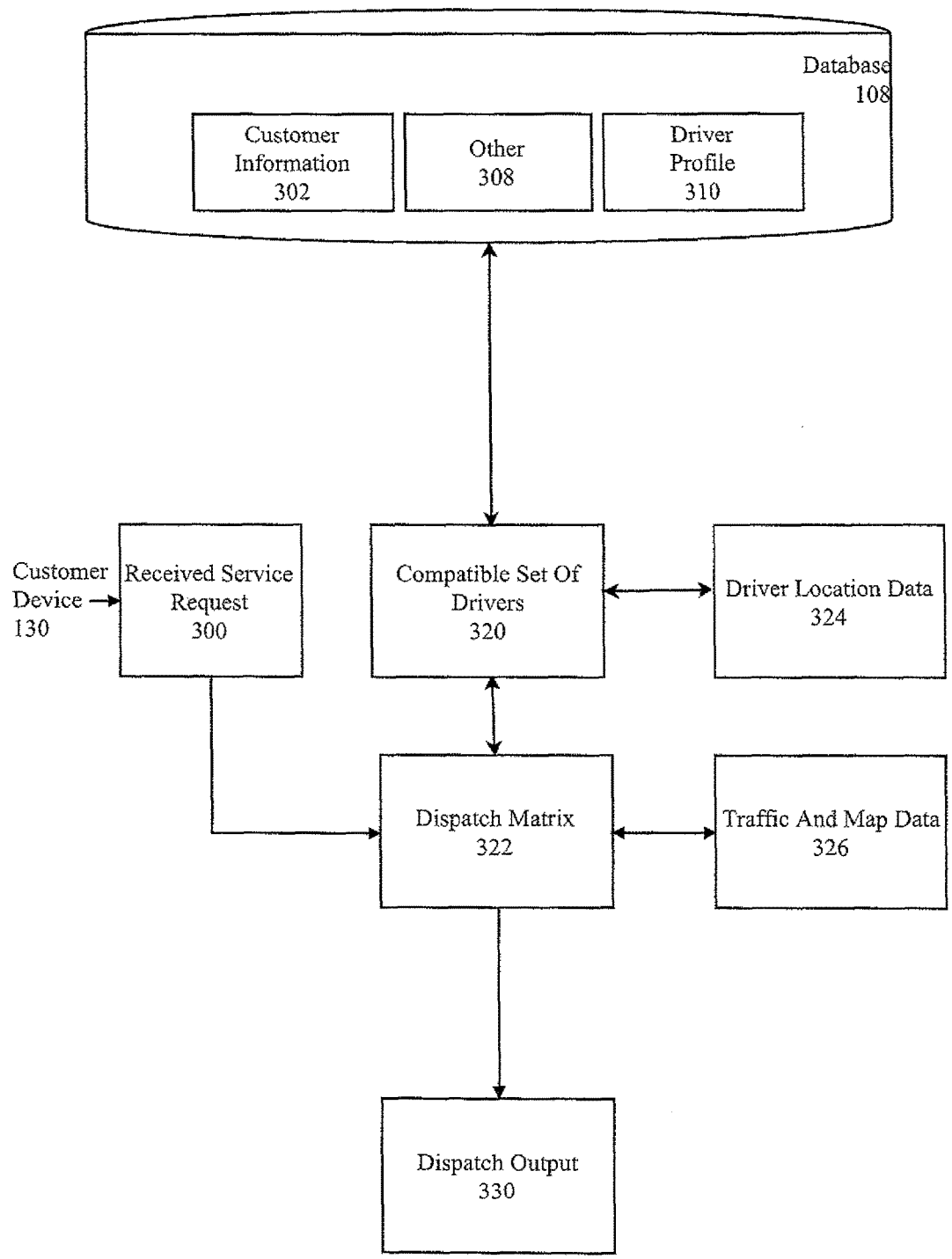

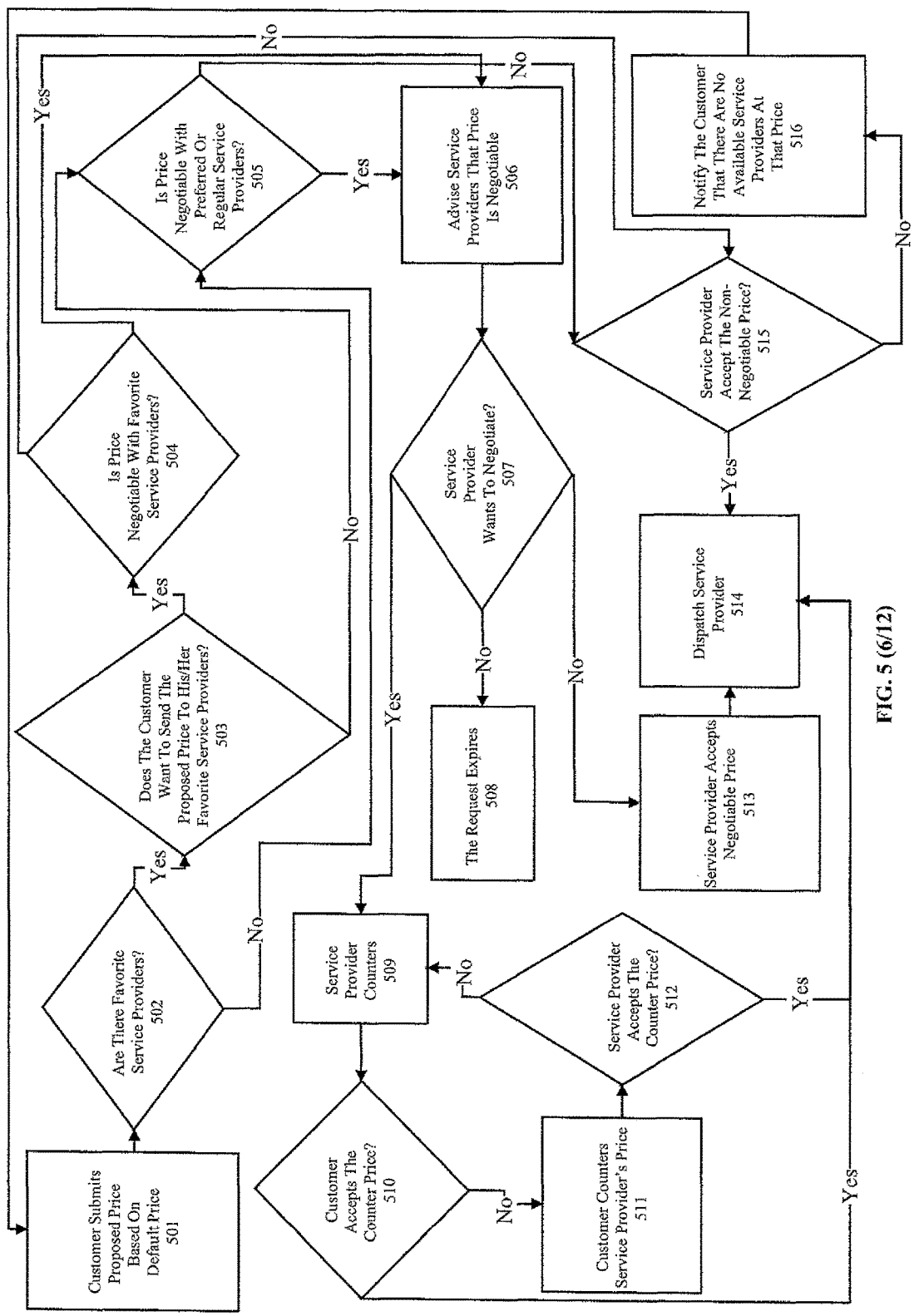
FIG. 5 (6/12)

SYSTEM AND METHOD FOR CUSTOMIZABLE PRESCHEDULED DISPATCHING FOR TRANSPORTATION SERVICES

CROSS-REFERENCE TO RELATED APPLICATIONS

This application claims the benefit of U.S. Provisional Patent Application No. 62/399,129, filed Sep. 23, 2016, U.S. Provisional Patent Application No. 62/505,626, filed May 12, 2017, and is a continuation-in-part application of U.S. Non-Provisional patent application Ser. No. 15/239,783 (hereafter, the '783 application) filed on Aug. 17, 2016, which claims the benefit of U.S. Provisional Patent Application No. 62/325,602, filed on Apr. 21, 2016, and U.S. Provisional Patent Application No. 62/290,778, filed Feb. 3, 2016, the entire disclosures of which are hereby incorporated by reference.

FIELD OF THE INVENTION

The present disclosure generally relates to systems and methods for transport services, and more particularly, to systems and methods for prescheduled transport services in which one or more service requests are received in advance of a designated dispatch date, prescheduled and/or grouped based on driver availability and compatibility with individual customers.

BACKGROUND

Dispatching and scheduling software in the transportation services industry is programmed to deal with different variables relating to drivers and customers, from processing service requests received from both customers and vendors to coordinating drivers in accordance with those service requests. However, dispatch software is imperfect in terms of the types of information it collects and stores for later processing when creating schedules. Errors or conflicts can slow processing speeds and compound problems that may eventually obstruct service. Organizing such information in a database and comprehensively querying it to preschedule service requests in an efficient manner presents numerous challenges, particularly where systems sort through one driver after another until a preliminary match is found. After finding a preliminary match, the driver must be contacted to see if he/she is actually able to provide the service. Alternatively, if the driver receives a list of already-scheduled trips, he/she may have to cancel one or more if a conflict arises.

In conventional systems, such problems can be extremely confusing and time consuming for a dispatcher to preschedule trips the day before, or taxing on a computing system. The process is further complicated when cancellations and booking changes are factored in, especially when there are multiple legs per trip (e.g. taking a customer from home to a store and then back home), simultaneous service for more than one customer, or multiple trips scheduled back to back. Changes or cancellations may necessitate that a service request be sent back to a "dashboard" for re-scheduling, often manually.

When presented with a service request, a driver may assume that he/she will be able to get it completed on time, but due to an unforeseen route change or a miscalculation, may have to work past his/her desired stopping time. Thus, drivers are often dispatched to service requests for which their schedules are incompatible, and customers and drivers sometimes have to cancel with little advanced notice. Dispatchers are not always familiar with who the customers are, and may not know their preferences. Situations arise where a dispatcher sends the closest driver to the customer, but that driver may be unfamiliar with the area or not like by the customer to which he/she is assigned. Although the driver is close and can quickly pick-up the customer, the customer may be dissatisfied with the service. Moreover, sometimes drivers who are prescheduled for a service have to wait extended periods of time outside for a customer who is not yet ready, even though the driver was dispatched to show up at a certain time. Dispatchers have no way of knowing or efficiently updating the driver as to when the customer may be ready. Providing dispatch and transport services is a complicated operation, and has numerous areas in need of systematic improvement. Traditional dispatching methods allow for less adaptability to new service requests or service requests that change unexpectedly.

It will therefore be appreciated that improved systems and methods are needed in the art to address these issues, streamline processes, increase driver utilization, improve efficiency, limit manual dispatching, address customer and driver dissatisfaction, enable customer and driver customization for prescheduling service request assignments, and utilize technological improvements for prescheduled services with automation.

SUMMARY OF THE INVENTION

The present invention relates to various systems and methodologies of a prescheduling computer-implemented system. This summary is not intended to identify or point to essential features or limit the scope of the subject matter claimed herein. The present invention relates to methods and systems for prescheduling transportation services in which a plurality of service requests are received in advance of a designated dispatch date, prescheduled, and grouped based on driver availability and compatibility with individual customers to solve the deficiencies of known scheduling and dispatch service systems, with at least the following objectives:

To provide a customizable prescheduling dispatch service method and system whereby a service provider and a customer are most appropriately matched based on a dispatch matrix of known customer's preferences and known service provider's preferences and limitations.

To provide a system configured to dynamically update a database to indicate changes in a customer's and a service provider's presets, settings, preferences, limitations, feedback or other information in order to provide quality services.

To enable customers to customize options within the system based on the types of preferences they have in order to receive the best service from the best matching service provider.

To facilitate the development and nurturing of a relationship between a customer and a service provider by creating a favorites list and a preferred list based on feedback they give each other to improve the quality of service, and to enable customers to choose one or more favorite and/or preferred service providers, where favorite service providers may then be given priority to accept service requests from their favorite customers who are on their favorites lists.

To enable drivers to prioritize the list of customers on their favorite customer list, in order to resolve any conflicts arising during the prescheduling process.

To enable customers or drivers to prioritize their categories of preferences or limitations, respectively, in order to further resolve any conflicts arising during the prescheduling process.

To create blacklists whereby service providers will be skipped over in dispatching service requests from customers who put them on their blacklists.

To present an electronically implemented platform for customers and service providers to set or negotiate prices for requested services on their own initiations with reference to a default price based at least in part on supply and demand.

To provide various sets of indicators to a customer and/or a driver to facilitate selecting a best match for a single service request in a convenient and efficient way.

To facilitate a micro-disbatch system between drivers and partner drivers to substantially reduce the workload of a traditional dispatch system.

To enable automated prescheduling of a batch of service requests to one more drivers who have each preset one or more geographic regions where they prefer to provide service.

To facilitate connectivity between a dispatcher and drivers by displaying changes to a prescheduled service request in a dispatch web portal and in a driver device associated with a driver assigned to the service request, and dynamically updating and storing the changes in a database without any phone call communication.

To enable a price negotiation for a single service request between a customer and one or more best matching drivers.

To enable full service dispatching which includes pre-scheduling service requests, dispatching of servicer requests, dynamically updating and facilitating changes to service requests, and providing real time information to all parties during transport.

In accordance with exemplary embodiments, a computer-implemented method is provided for customizable prescheduled transportation dispatching. The method comprises receiving, through one or more computing devices, a service request for prescheduling from a customer having at least one customer optional preset service request preference. The service request includes at least one trip having at least one of: a pickup time, a pickup location, a drop off time, or a drop off location. The at least one customer optional preset service request preference includes at least a driver type comprising one of a favorite driver, a preferred driver, or a regular driver. The method further comprises receiving, through the one or more computing devices, at least one driver optional preset service preference with optional preset location limitation or time limitation; automatically precluding at least one driver from a first set of a plurality of drivers from receiving the service request if the at least one driver is unable to complete the service request based on the at least one customer optional preset service request preference or based on a blacklist of the customer; generating at least one indicator associated with a second set of said plurality of drivers that corresponds to service relevant data; transmitting the at least one indicator to the customer, wherein the at least one indicator corresponds with the at least one customer optional preset service request preference; determining, on at least one designated date or time, if the at least one customer optional preset service request preference matches with at least a portion of: the at least one driver optional preset service preference; and the at least one indicator; assigning the service request to the at least one driver from the second set of the plurality of drivers; sending at least one notification dispatching the service request to the at least one driver from the second set of the plurality of drivers; receiving acceptance of the service request from at least one of the at least one driver from the second set of the plurality of drivers; and dynamically updating the service relevant data in at least one database.

In accordance with other exemplary embodiments, a computer-implemented method for providing customizable automated prescheduled transportation dispatching is provided. The method comprises receiving a plurality of service requests for prescheduling, wherein each of the plurality of service requests includes at least one leg having at least one of a pick-up time, a pick-up location, a drop-off time, or a drop-off location; sorting the plurality of service requests according to a geographic region of one of the pickup location or the drop-off location; storing the plurality of service requests in one or more databases; retrieving, from the one or more databases, (i) customer information of a customer associated with each service request of the plurality of service requests, the customer information comprising at least one of optionally preset service preferences, a favorites list, a preferred list, or a blacklist, (ii) one or more driver profiles, each of the one or more driver profiles comprising driver information, the driver information comprising a geographic service region and at least one of optionally preset service limitations, service history, a favorites list, a blacklist, or historical data, and (iii) for a designated geographic region on a designated date, at least one of: a batch of service requests from the stored plurality of service requests; a plurality of customer profiles corresponding to a plurality of customers associated with the batch, the customer profiles including customer information; or a plurality of driver profiles corresponding to a plurality of drivers to assign to the batch, the driver profiles including driver information; precluding one or more drivers from a first set of drivers (i) incompatible with the service request, (ii) present on said blacklist of said customer, or (iii) having the customer on the blacklist of the driver; generating a dispatch matrix based on at least one or more sets of indicators using the service request, the customer information, and the one or more driver profiles of drivers from a second set of drivers, the dispatch matrix creating a priority assignment to each driver of said second set of drivers. The method further comprises assigning each driver from the second set of drivers to a service request of the batch in accordance with the priority assignment; transmitting, to a customer computing device, a group of drivers from the second set of drivers based on the priority assignment; receiving, from the customer computing device, a selected one best matching driver from the group of drivers; and transmitting the service request to said selected one best matching driver.

In other embodiments, a computer-implemented method for providing customizable automated micro-dispatching for transportation services is provided, comprising receiving, through one or more remote computing devices, a service request for scheduling from a customer having one or more optionally preset service request preferences, the service request including at least one leg of a route; storing information relating to the service request in one or more databases; selecting a driver from a subset of drivers to receive the service request based at least in part on information displayed through one or more indicators, and dispatching the service request to the selected driver; receiving acceptance of the service request from the selected driver; identify one or more partner drivers associated with the selected driver in a micro-dispatching system, the one or more partner drivers in communication with the selected driver through said one or more remote computing devices;

transmitting, by the selected driver, a redispatch request for the accepted service request to an identified one of the one or more partner drivers; sending a redispatch notification to the identified partner driver; receiving acceptance of the redispatch request from the partner driver; automatically notifying the customer of the identified partner driver and providing the customer with an option to accept or reject the identified partner driver; and updating the service relevant data in the one or more databases dynamically based on receiving the acceptance of the redispatch request from the partner driver.

In other embodiments, a method for dynamically and automatically updating service relevant data exchanged between a database stored on a server computing system and at least one remote computing device is provided. The method comprises receiving, at a server computing device, a service request from a customer, the service request including at least one leg of a route; storing service relevant data relating to the service request in one or more databases on the server computing device; selecting a driver from a group of drivers to complete the service request, and automatically dispatching the service request to the selected driver; receiving, through one or more remote driver computing devices, acceptance of the service request from the selected driver; identifying first updated service relevant data related to the service request, the first updated service relevant data being identified at the server computing device prior to completion of the service request; updating the database dynamically with the first updated service relevant data; automatically transmitting the first updated service relevant data to the driver for display through the one or more remote driver computing devices; identifying second updated service relevant data related to the service request, the second updated service relevant data being identified by the driver through the one or more remote driver computing devices after acceptance of the service request by the driver; automatically transmitting the second updated service relevant data to the server computing device; updating the database dynamically with the second updated service relevant data; and displaying on a display apparatus the second updated service relevant data.

Other objects, features, and characteristics of the present invention, as well as the methods of operation and functions of the related structural elements, and the combination of parts and economies of development and manufacture, will become more apparent upon consideration of the detailed description below with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. The drawings are not intended to limit the scope of this invention, which is set forth with particularity in the claims as appended or as subsequently amended, but merely to clarify and exemplify the invention. Accordingly, a more complete appreciation of the present invention and many of the attendant aspects thereof may be readily obtained as the same becomes better understood by reference to the following detailed description when considered in conjunction with the accompanying drawings, where:

FIG. 3 is a diagram depicting a dispatch operation incorporating an exemplary dispatch matrix in accordance with various embodiments of the invention;

FIG. 5 is a flowchart illustrating an exemplary price negotiation between a driver and a customer with or without a dispatcher web portal;

DETAILED DESCRIPTION OF THE PREFERRED EMBODIMENT

Figure 1:
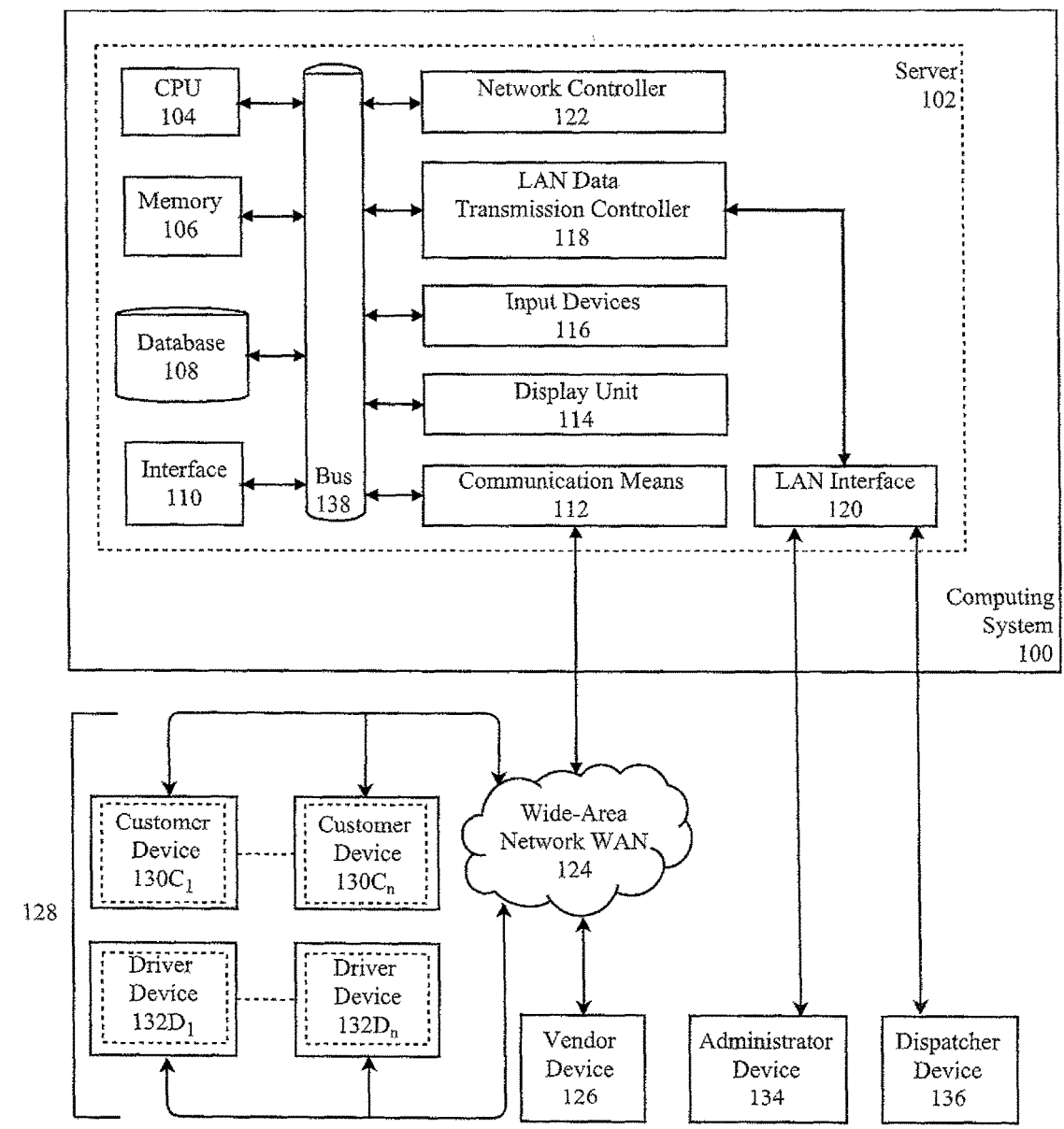
FIG. 1 is a diagram of an exemplary prescheduled dispatch system, including a computing system and one or more peripheral computing devices for use with various embodiments of the invention.

The present disclosure is not intended to be limited to the specific terminology so selected, and it is to be understood that each specific element includes all technical equivalents which operate in a similar manner. Specific embodiments that may be practiced are shown by way of illustration and explanation. The embodiments are described in sufficient detail to enable those skilled in the art to practice the embodiments, and it is to be understood that the logical, mechanical, and other changes may be made without departing from the scope of the embodiments. The following detailed description is therefore not to be taken in a limiting sense. In describing exemplary embodiments of the present invention illustrated in the drawings, specific terminology is employed for sake of clarity.

Systems and methods for providing dispatch and transport services are described herein. It will be appreciated by one of ordinary skill in the art that one or more of such exemplary embodiments may be carried out using various programmatic engines, programmatic modules, or other hardware or software components comprising one or more routines or one or more subroutines, which may be used individually or in combination and carried out on any appropriate technological means.

It will also be appreciated that various modules of the systems and methods described herein may be implemented in part by using an interfacing mobile application (app) on an internet-enabled mobile device's operating system, such as, for example, Android, iOS, or Windows Phone OS, and in part by using a web portal interface, and that different types of users may utilize different functionalities of the system. Such users or subscribers can include, for example, one or more "driver(s)" or customers. "Customer(s)" herein can include anyone, including, for example, one or more individuals, entities, or one or more individuals from an entity, who request or order services. A "customer" can refer to anyone who registers with the system, either individual or individuals from an entity, who requests or orders services, regardless of which type of services that may be, whether transport service, delivery service or both. As customers and service providers alike use the methods and systems described herein, both may generally be referred to as a "user" or "users," in addition to being referred to by specific user type corresponding to the role they play in the service request. There are at least two types of users: a service provider, and a customer.

"Services" herein can refer to three types of services: transport service for riders, delivery service of goods, and both transport and delivery service. Those services can be prescheduled or requested on-demand. "On-demand" herein is meant to further define when services take place in real-time, as requested. "On-demand" is used in opposition to the notion of being "prescheduled" or occurring at a future fixed time, such as a couple hours or days later. On-demand services happen at the moment, whereas prescheduled services take place at a predetermined future time, date, or during a predetermined timeframe. Furthermore, "customized" modifies the nature of the services, and refers to the preferences of a customer or the preferences or limitations of a service provider involved in the services, on an individual basis. Regardless of the type of service, a "service provider" herein may be a single individual such as a driver, a group of people or an affiliate of a private business entity such as a car service company who can be summoned to provide transport service or delivery service or both. The service provider's ability to provide service depends on what tools he/she has at the disposal. For example, in the case of driving a customer somewhere, a vehicle would be necessary, whereas a request for a delivery service can be provided not only by vehicle, but also by someone on foot, or someone on a bicycle.

"Dispatcher(s)" herein can include a party which manages service request(s) and operates various scheduling and pre-scheduling functionalities. "Vendors" herein can refer to a broker or other business entity, government office, or individual who brokers a service on behalf of a customer or passenger. As described herein, each of these different roles may be referred to specifically or by the catch-all terms "user" or "users" that register in or are otherwise directly or indirectly associated with the system.

A request for any type of service is generally referred to as a "service request" or "trip(s)" throughout the disclosure. In accordance with exemplary embodiments of the inventive disclosure, a service request is assigned to a driver based on a customer's preference(s) and a driver's preferences and/or limitations, and priority is given to certain drivers for certain trips with customers based on one or more attributes or prior trips. The term "preference" as used herein refers to various factors about a particular service that a customer would like included in the overall service provided to him/her in terms of the particular driver, the particular vehicle the driver uses, and any attributes related thereto. These preferences may represent ideal or favored conditions for the service request. Alternatively, such preferences may represent preconditions for service. A customer can set his/her preferences on a mobile device and update them at any point, allowing the customer to feel comfortable, and in the end, satisfied with the quality of the services received. A customer can have one or more such "preferences."

In accordance with exemplary embodiments of the inventive disclosure, the term "limitations" can mean any type of constraint that a driver may wish to place upon a service he/she provides. These limitations may include two broad categories: personal limitations regarding when, where, how, and to whom a driver provides services. Such personal limitations may include location limitations based on a driver's reluctance to provide services in certain geographic zones, and time limitations based on a driver's reluctance to provide service within certain time periods. Alternatively, in certain preferred embodiments, a driver may also specify one or more preset location preferences based on a driver's desire to provide services to (e.g., preference to receive work within) certain geographic zones. In such embodiments, the driver may also specify location limitations within his/her location preferences based on the driver's reluctance or inability to provide services in certain geographic zones within the driver's preferred geographic zone of service. Service limitations may additionally or alternatively relate to times or time frames when the driver might not want to provide service to a customer. Such times can include hours of the day, days of the week, times of year, etc. Drivers can also set "limitations" for location and time. By way of example, a driver may not want to provide service in a certain area past 10 PM, but is willing to provide service in another area past that time. In such embodiments, the driver may also specify time preferences indicative of a time period during which the driver prefers to receive service requests. A driver can have one or more such "limitations" and/or "preferences". The terms "preferences" and "limitations" are not intended to limit a customer or driver to only having a preference or a limitation. Rather, they are intended to draw an illustrative contrast.

In accordance with exemplary embodiments of the invention, multiple terms are used to refer to a customer who has an established positive relationship with a driver. A "favorite customer" is one who is on a driver's "favorite customer list". A driver who has an established a positive relationship with a customer is referred to as a "favorite driver" (e.g., on a customer's "favorite list"). The term "favorite" as used herein is meant to be broadly construed, and refers to any customer or driver who is prioritized in an assignment of a service request (e.g., on a "favorite list"). It will be understood by one skilled in the art that the concept of a "favorite list" may alternatively be referenced as, for example, a "friend," a "top", a "priority", or any other word used by drivers or customers to define the concept of such list. Regardless of specific terminology, the intention as a top priority is to denote the concept of a positive driver-customer relationship which encompasses matching between the driver and the customer.

In contrast to "favorite", a driver's "blacklist" or a customer's "blacklist" as used herein refers to lists which can prevent a match between a driver and a customer in the future (e.g., where both are precluded from service request processing). It will be appreciated by one skilled in the art that other terms may be used to describe this concept, such as, for example, "block list", "ban list" "dislike list," or the like. Regardless of specific terminology, the intention is to denote the concept of a driver excluding customers to whom he/she does not want to provide service, or with whom he/she does not want to have contact, and a way for a customer to exclude the drivers from whom he/she does not want service or contact.

A customer may additionally or alternatively have a "preferred" driver. A preferred driver is a driver who is not on the customer's favorite list, but one whom the customer has directly requested be on his/her "preferred list", or one whom the customer has requested be on his/her favorite's list, but whose request has not been agreed to by the driver. In either case, if the driver refuses a customer's request, then the driver will not be added to the customer's favorite or preferred list, and vice versa. Thus, in preferred embodiments, drivers and customers are placed on each others favorite lists when both parties agree, and on preferred lists when one or both parties directly request it or when one party requests favorite but the other does not respond. The word "preferred" as used herein generally refers to a lower ranking than "favorite" for purposes of matching customers and drivers when assigning prescheduled service requests. Driver and customers may further rank each other within these classifications as further discussed herein. Drop-off locations can be complicated, such as, for example, at hospitals or clinics which often have confusing or unclear layouts. At these locations, it can be difficult to locate the correct entrance. Thus, it may be preferred to dispatch a service request to a driver who is familiar with a particular route when this type of location is involved. In certain embodiments, any driver who is not a favorite driver or a preferred driver of a customer is referred to herein as a "regular" driver. This term essentially means that the driver is not a preferred driver and has not been added to the favorite list). It will be understood that a particular status relating to a driver (i.e., driver type), be it "favorite," "preferred" or "regular," is always also relative. A driver who is preferred for one customer might be a favorite for another.

The term "system" herein is referred to the implementation through a combination of hardware and software that operates a portable computing device, which comprises various pre-programmed features combined and integrated with basic components including but not limited to one or more servers, databases, mobile end applications, web portals, network settings, etc. With the support of these components, the system provides the services through user interfaces, such as a website or a mobile application. In addition, the system may have more than one server that may be in a distributed structure with support from data centers that may be located anywhere around the world. These implementations may be communicatively linked and cross platform so that a user on a mobile device (e.g., smartphone, tablet, etc.) or stationary (e.g., desktop computer, etc.), may be provided with the information relevant to their service request, (e.g., electronic map displays, indicators which display travel times, routes, pricing information, profile/setting information, etc.). The term "indicator" as used herein is a means to transmit or display information related to services to a customer or to a service provider or both in a simple, fast, and convenient way.

Various embodiments of systems described herein provide prescheduling transportation through a computing system. The computing systems described herein can include any combination of hardware and software, and can communicate with a plurality of portable computing devices through, for example, a wide-area, packet switched network, which can allow users to access various pre-programmed features combined and integrated with basic components. Such features and components can include but are not limited to one or more servers, databases, mobile end applications, web portals, network settings, etc. within a communications framework/network. With the support of these components, the systems described herein provide services through user interfaces, such as, for example, a website or a mobile application on a portable computing device. The systems may also include more than one server operatively disposed in a distributed structure with support from data centers that may be located anywhere around the world.

Certain embodiments of the systems described herein are not limited to applications involving conventional computer programs or programmable apparatuses that run them. It is contemplated, for example, that embodiments of the inventive disclosure could include an optical computer, a quantum computer, an analog computer, or the like.

Each element in the flowcharts herein depicts a step or a group of steps of a computer-implemented method, and each step may contain one or more sub-steps. For purposes of illustration, these steps (as well as any and all other steps identified and described) are presented in a certain logical order. However, it will be appreciated that any exemplary embodiment described herein can contain an alternate order of the steps adapted to a particular application of a technique disclosed herein, and that any variations and/or modifications are intended to fall within the scope of this inventive disclosure. The depiction and description of steps in any particular order is not intended to exclude embodiments having the steps in a different order, unless required by a particular application, explicitly stated, or otherwise clear from the context.

The systems and methods described herein are best understood with reference to the following drawings, which are described in detail below. Referring first to FIG. 1, illustrated is a diagram of an exemplary computing system 100 and a plurality of peripheral computing devices for use with various exemplary embodiments of the invention. A combination of hardware and software operates on a plurality of computing devices 128 and the computing system 100, generally with one or more connections to wired or wireless wide area network (WAN) 124 (e.g., the Internet), incorporated with local devices through a local area network (LAN) interface 120. Computing devices 128 can be a wireless mobile hardware device having software capable of communicating information to other mobile devices or computer systems, determining the location of that device with geographical position location capability (e.g., through triangulation of a cell system, GPS, by location specification from the user, etc.), and connecting to a private computer network or public network such as the Internet through a network.

Computing system 100 can include, for example, server 102 including central processing unit (CPU) 104, memory unit 106, database 108, interface 110, communication means 112, display unit 114, one or more input devices 116 (e.g., keyboard, mouse, etc.), LAN data transmission controller 118, LAN interface 120, network controller 122, and internal bus 138. As shown, the system may be connected to a data storage device, such as, for example, a hard disk disposing one or more databases 108 via a wired or wireless link. Central computing system 100 can include one or more servers configured the same or similar to server 102 shown in FIG. 1, or one or more servers configured in a different manner, which may dispose different hardware or software. For example, computing system 100 may comprise multiple servers hosted in multiple spaces such as data centers or server farms.

Computing system 100 may be configured to communicate with network service coordinated through a communication means 112, which may include any approach for communicating data over one or more networks or to one or more peripheral devices. Communication means 112 may include, but is not limited to, circuitry and control systems for providing wireless connections, wired connections, cellular connections, data port connections, Bluetooth connections, or any combination thereof, and the means may include devices enabled to communicate using such communication approaches. One of ordinary skill in the art will appreciate that there are numerous approaches to communications that may be utilized.

Server 102 and computing system 100 may be communicatively linked, through communication means 112 and WAN 124, to peripheral devices such as computing devices 128, vendor device 126, administrator device 134, and dispatcher device 136. Computing devices 128 may be configured as one or more customer computing devices 130C1-130Cn or driver computing devices 132D1-132Dn. Computing devices 128 may be devices (e.g., smartphone, smartwatch, etc.) which allow a user (e.g., customer, driver, etc.) to interact with the computing system 100. Any number (e.g., 1, 2, 3, . . . n) of driver devices 132D1 . . . 132Dn, or customer devices 130C1 . . . 130Cn may be used in conjunction with computing system 100.

Computing system 100 may have more than one server 102 in a distributed structure with support from data centers that may be located anywhere around the world. These implementations may be communicatively linked and cross-platformed, so that a user on a mobile device may be provided with information relevant to the service request, such as, for example, the electronic map display, indicators which display travel times, routes, pricing information, profile information, settings information, etc. Features of the systems described herein can be implemented through computing devices that allow for method steps to be processed and output by a processor. According to an exemplary embodiment of the invention, server 102 coordinates user interfaces and interacts with database 108. Each user, depending on that user's role and needs, may be provided a different functionality.

Server 102, through a server interface, may receive customer input information, location information, and service request information to configure content, as well as the information from the driver (e.g., location information, limitation information, historical information, etc.). As discussed above, server 102 can send information to one or more computing devices through server interfaces, and information can be output to a display of the computing devices. Such content can include features which are region-specific if particularly relevant regional information exists, especially with respect to service request mapping or routing.

The service request information received through the server interface may be stored by the computing system 100 in database 108, and may include, for example: the status of service requests; the status of service request acceptances by drivers; the reasons from drivers for cancelling service requests; the histories associated with assigned service requests; operation logs of dispatchers; etc. The content/timestamps of notifications and confirmation statuses may also be recorded in system logs, and this information can be checked by the administrator of computing system 100. It will be appreciated that this is not an exhaustive list of the operational service request information that the system may record.

The data stored in one or more databases 108 of computing system 100 can be continually updated with all user information discussed herein, and analyzed in accordance with the various methodologies discussed herein to enable efficient booking and dispatch of prescheduled transport services. In certain embodiments, every time computing system 100 gets an input/request from a customer, a driver, a dispatcher, or other user, computing system 100 can first open a safe access channel with database(s)/database center and then send out query sentences through the access channel to a database management module. If a relational database is utilized, then the data tables may have one kind of relationships, such as one to many relationships, many to many relationships, and one to one relationships with other data table(s). Based on the relationships between data tables, the database(s) management module can exactly follow the query sentences and find the specific data table(s) by using ID(s), table names and column names of the tables with/without joining two or more data tables together. If a non-relational database is utilized instead of data tables, with the data stored in key-value pairs, then the database management module can exactly follow the query sentences and find the specific data by using keys that query sentences provide.

Computing system 100 can access all information stored in the one or more databases 108. The database(s) 108 can include rules and procedures data, driver data, administrative data, group data, customer data, map component data, and any other data relevant to implementation of computing system 100. Rules and procedures data can include system price, promotion setting rules and procedures, as well as rules and procedures for indicators, referrals, payments, service requests, system management, system log, system analysis and optimization, etc. The map component data can store map data for service requests that are identified by the GPS and LBS. The GPS and LBS data can determine the location of the computing devices in different ways, such as, for example, through receiving location-based resources. Driver data can include drivers' profiles, such as personal data including a photo of the driver and years of his/her driving experience, gender, country of origin, and language abilities.

Database 108 can also include data related to a driver's vehicle, such as make and model, color, seating capacity and accessibility, insurance status, and even pictures of the vehicle. Additional information in the driver's profile may include such information as a driver's favorite list and blacklist, limitations related to zip codes, time, location, and price, as well as service data and records. Database 108 can further include administrative data comprising prices and rates, system data such as contact and FAQ information, and registration details regarding customers and drivers. For example, database 108 may store billing information or other information related to administering on-demand service applications for computing system 100. Group data can include base data, company data, group of individuals data, or data related to vendors. Customer data can comprise customers' profiles including personal data, customers' favorite driver lists, customers' driver blacklist, customers' preferences, service requests data, and records. One of ordinary skill in the art will appreciate that database 108 can sync dynamically so that whenever changes or updates in data blocks are made, server 102 and database 108 dynamically update the data accordingly to reflect the latest changes. Additionally, at least one backup database may be utilized to back up a primary one of databases 108 in case of data loss in the primary database 108. One of ordinary skill in the art will appreciate that database 108 components may vary from the ones depicted herein.

Alternatively, computing system 100 may use a set of databases or data storage mediums to provide and maintain a prescheduled service application in order to dispatch a compatible driver based on a customer's preferences and needs. Databases 108 may contain several data categories or groupings. Sections of database 108 may be independent or synchronized in order to retrieve information from both sections at the same time. Such data can include rules and procedures data, administrative data, customer data, driver data, group data comprising base data, company's data, or group of individuals' data, and other types of data such as data relating to user types. In accordance with exemplary embodiments of the present invention, all historical information may be categorized and stored in and retrieved from database 108. Historical data can be tracked in part by assigning a tracking number, service ID number or trip ID corresponding to each service request to help computing system 100 refer back to the service request. Information categorized with this identification may include the type of service request, who requested and carried it out, where it took place (zip code, borough, county, city, state, etc.), what the route was, the cost of the service request, when and how payment for the service took place, and whether either party was added to a favorite list or a blacklist. All information regarding a customer's or driver's preferences or limitations, pricing, and other customizable information can be stored within database 108.

Such a comprehensive database 108 may store administrative data and other information. The administrative data can include any information or data which is part of a prescheduled service application, and comprise system data such as contact and FAQ information, customer and driver registration details, such as, for example, billing information or other relevant information relating to administering the prescheduled service application. By way of example, the registration details can include how long users have been registered with the system or how frequently they use the prescheduled service application. Administrative data can include information such as price and rate information for routes from different organizations. Other stored information can include service rules, procedures, and prices, as well as procedures for drivers' and customers' settings.

In accordance with exemplary embodiments of the present invention, records of completed service requests can also be stored and maintained within database 108. Computing system 100 can automatically store records of historical data for any completed service requests in a comprehensive database. Database 108 may be dynamically updated as services are booked and completed. Database 108 may store an index of each service request that has been requested and completed, including the registration numbers or user identifications of customers and drivers, which can be retrieved for reference if needed at any time.

The service request information stored in the database 108 may include, for example, a service request ID, relevant driver information, relevant customer information, requested pick-up location, actual pick-up location, requested drop-off location, actual drop-off location, pick-up time, drop-off time, distance, duration time, status, prices, insurance company, etc. Even if a customer does not have a smartphone or use the application which is in communication with the system, this will not adversely affect the functioning of the system as methods which circumvent a customer not having access to the system may be utilized. For example, a dispatcher may update such customer on the status of his/her service request or on the location of the driver. The dispatcher can provide the customer with the most current information, as the start button functionality discussed above allows a driver to instantly connect with the dispatcher at the backend.

The relevant service information may include information such as fleet number, first name, last name, username, email, password, phone number, date of birth, gender, country of origin, driving experience, driver type (e.g., owner-operator), affiliated company name, affiliated base name, allow pets, allow wheelchair, language, signature, and general profile. The relevant service information may also include licensure information such as license number, license class, license state, license issuance, license expiration, FHV license number, FHV license issue date, and FHV license expiration; driving record information such as driving record start date and driving record expiration date; vehicle information such as registration status, registration state, registration start date/end date, model year, brand, model, VIN, vehicle type, plate number, FHV registration start/end date, FHV license number, and FHV license; and insurance and inspection information such as liability status, insurance status, insurance provider, insurance start date, insurance end date, vehicle inspection, and vehicle inspection end date.

The comprehensive database 108 may also store the details of service requests for each particular driver for future reference. Database 108 can include data about a driver's vehicle, such as type of the vehicle, model, color, seating capacity and accessibility, insurance status and even pictures of the vehicle. Additional information in the driver's profile may include information such as a driver's favorite list and blacklist, preferences, and limitations such as zip codes, time or location limitations, and service data and records.

Any backup databases related to database 108 may also be updated accordingly to reflect the latest changes. In certain embodiments, such information can be organized or structured in a manner allowing for effective sorting and retrieval. The information can be stored in a non-relational or unstructured manner. One of ordinary skill in the art will appreciate that numerous methods for providing, storing, and organizing data in database 108 or other data storage medium may be utilized in accordance with the exemplary embodiments of the present invention discussed herein. Additionally, it will be appreciated that at least one backup database may be utilized which backs up the primary database frequently in case any data is lost from the primary database.

Information stored in the database(s) can be used to generate various indicators (further discussed below) in the prescheduled service system 100. The indicator related icons, shapes, or other depictions can be stored in database 108. Based on the results of exploration and analysis of data in database 108, as well as icon, shape or other depiction assignment rules, the icons, shapes or other depictions can be displayed with other indicators to customers, drivers, and dispatchers accordingly. Using information maintained about the customers and the drivers stored in database 108, the prescheduled service system 100 can provide relevant information to any prescheduled service application operatively associated therewith. Driver information may correspond to information about the available drivers themselves, such as profile information about the drivers, current location or movement of the vehicles, or particular distances from the customer or estimated time periods before pick-up.

Computing system 100 may also use a set of databases 108 or data storage mediums to provide and maintain a prescheduled service application in order to dispatch a compatible driver based on a customer's preferences and needs. Database 108 may contain several data categories or groupings. Sections of database 108 may be independent or synchronized in order to retrieve information from both sections at the same time. As discussed herein, such data may include rules and procedures data, administrative data, customer data, driver data, group data comprising base data, company's data, group of individuals' data, and other types of data such as data relating to user types. According to an exemplary embodiment of the present invention, all historical information in database 108 may be categorized and stored in and retrieved from database 108. Historical data can be kept track of partly by assigning a tracking number, service ID number or trip ID number assigned to each service request to help computing system 100 refer back to the service request if questioned. Information stored can include what type of service request was requested or provided, who requested it and who carried it out, where the service took place, such as a zip code, borough or county, city or state, which route was utilized, how much the service request cost, when and how payment for the service was made, and whether either party was added to a favorite list or blacklist. All information regarding a customer's or driver's preferences or limitations, pricing and other customizable information may be stored within database 108 of computing system 100.

Additionally, specific data such as times of the service requests and prices for the service requests may be used as a reference to find average prices for customers so that they may receive fair prices when booking services. Data which is entered and stored in database 108 can be subject to continual verification. Maintaining a comprehensive database 108 also allows for the accurate tracking of service requests that may be in dispute by a customer or a driver. Service request records may be retrieved in an efficient manner from database 108 in order for any claims to be resolved in a timely manner.

Additional data may be input into database 108, including, but not limited to, locations where customers traveled to, favorite lists or blacklists, locations, other transaction data and details, historical data, insurance policy expiration dates, inspection dates, drivers' license expiration dates, or any combination thereof. This data may also include information relating to indicators and the display thereof. By way of example, the data may include the service requests that all customers or drivers have completed in a certain area, such as one or more streets, zip codes, town, city, borough, county, state, or any other region defining feature, or how many times a customer and a driver have been paired by computing system 100.

It will be appreciated that computer program instructions used by the computing system 100 may include computer executable code. A variety of languages for expressing computer program instructions are possible, including without limitation, C, C++, Java, JavaScript, Python, assembly language, Lisp, and so on. Certain logical functions may need to be implemented to provide highly specific and tailored services for customers and drivers for the technical challenges that need to be solved. These logical functions may be pre-programmed to accommodate various preferences and limitations, and may be exceedingly complex to carry out particular if-then scenarios. Rules may be established that identify certain parameters. In this manner, many complex conditions may be accounted for, and drivers and customers can be filtered by chaining logical functions based on those filters. Various language features can be utilized, and programmed and implemented through programming languages such as Java. Such languages may include assembly languages, hardware description languages, database programming languages, functional programming languages, imperative programming languages, and so on. In certain embodiments, computer program instructions can be stored, compiled, or interpreted to run on a computer, a programmable data processing apparatus, a heterogeneous combination of processors or processor architectures, and so on.

Figure 2:
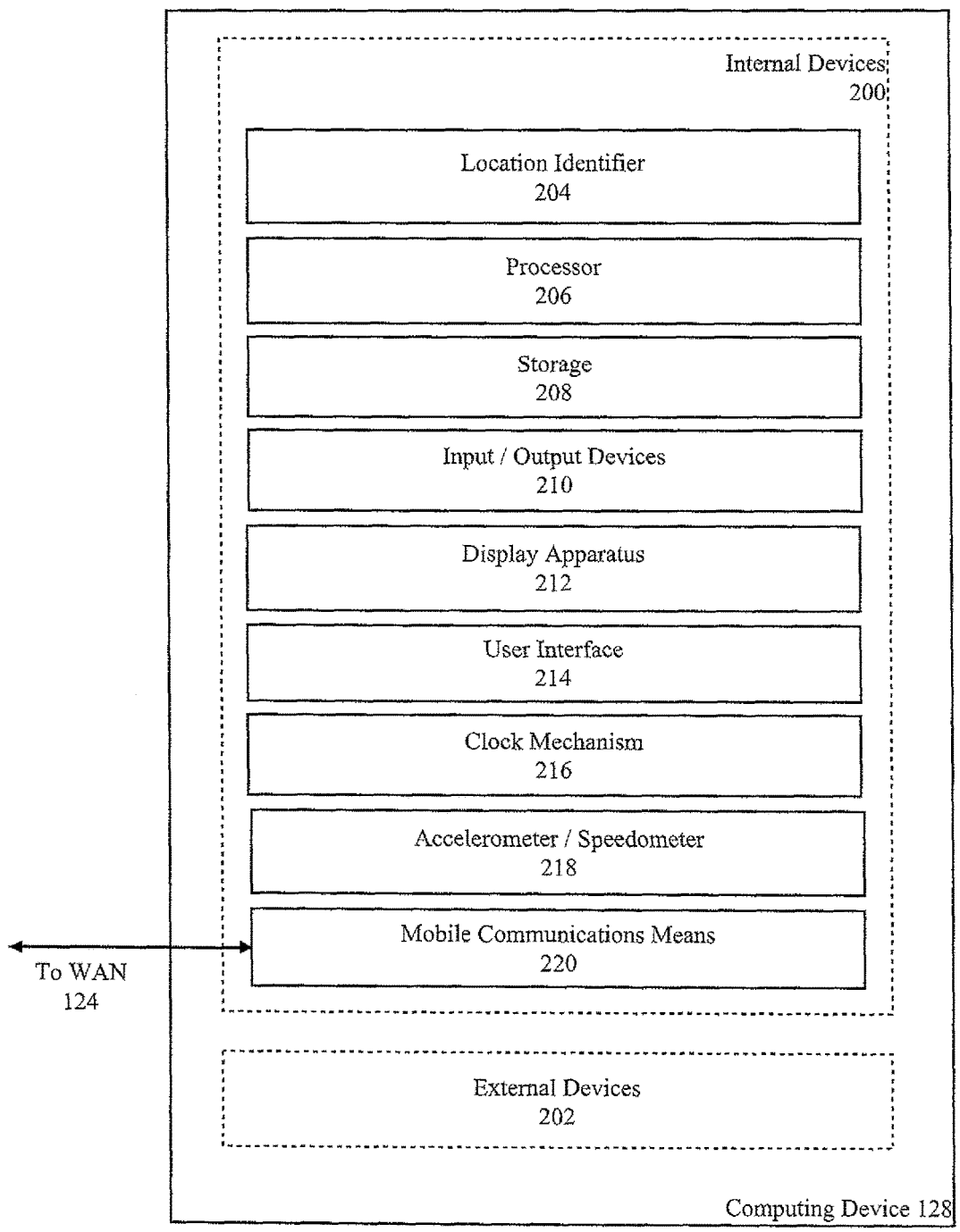
FIG. 2 is a diagram of an exemplary computing device and associated components in accordance with various embodiments of the invention.

Turning now to FIG. 2, shown is a diagram illustrating various components of an exemplary embodiment of computing devices 128. As discussed above, computing devices 128 can be used by either customers (e.g., via devices 130C1 . . . 130Cn) or drivers (e.g., via devices 132D1 . . . 132Dn) or both, and may be in communication with various components, tangible or intangible, of computing system 100. Computing devices 128 may incorporate various internal devices 200 and external devices 202, and may utilize mobile communications devices 220 for receiving voice, text, and data for connecting to computing system 100 such as over a WAN 124, and location identifier 204 such as a Global Positioning System (GPS) receiver for identification of a present location. An application, a map component, map data, and location identifier 204, such as, for example, a GPS module or other circuitry for providing location-based services (LBS) data may be integrated into one or more of computing devices 128 for certain location identification functions. Location identifier 204 may identify a location of computing devices 128 in different ways, such as, for example, through receiving location-based resources. One of ordinary skill in the art will appreciate that there are numerous approaches for providing location identification and location based services. A GPS-enabled system or device allows tracking components to identify the location of computing devices 128. For example, location identifier 204 can be instantiated through processing received GPS data from location-based or geo-aware resources of computing devices 128. Additionally, location identifier 204 can receive GPS data from other applications or programs that operate on the computing device using one or more application program interfaces (APIs). The application can use location information to cause a user interface component to configure a user interface framework.

In preferred embodiments, a customer can access a customer module such as computing device 128 operatively associated with computing system 100 to input a service request which includes trip details such as pick-up and drop-off locations as well as desired pick-up and drop-off times. If, however, any entity requests a service which is deemed incompatible with the system (e.g., based on data received from location identifier 204 regarding the location of one or more drivers and/or driver limitations in database 108), then a dispatcher may be notified.

The computing system 100 may be configured to generate a notification to customer device 130 when a driver comes within a region that is a certain distance (e.g., one or two miles) of a customer pick-up location designated in a service request. Such location-based services, facilitated by location identifiers 204 in driver devices 132D1 . . . 132Dn, allow for efficient routing of drivers based on point-to-point directions. Driver devices 132D1 . . . 132Dn may each include an interface component which provides location information gathered by location identifier 204, and passes such location information to an interface component on customer device 130C1 . . . 130Cn via WAN 124 and server 102. Driver devices 132D1 . . . 132Dn may also include radio-frequency identification (RFID) technology, or other similar identification device or means, so as to alert the system when a driver is at his/her vehicle or is away from his/her vehicle.

The location identifier 204 can include a GPS-enabled system or device whose tracking components identify the location of customers who are making service requests and drivers who are looking to provide service. Computing system 100 may include an application manager which, based on a customer's current location or service location, may cause a region-specific customer interface feature to be output by a customer interface component on display apparatus 212. A region specific to a customer can include the customer's current location or a service location in which the customer wishes to preschedule service. The region may be identified by zip code, city name, metropolitan area name, etc., in which computing devices 128 are currently located, and may be an area having a certain distance or radius from the customer's current location (e.g., one mile, five miles, etc.), or may be an area specifically partitioned from other areas. Region-specific information about the prescheduled service may be provided in part by a system which supplies driver location data 324 (FIG. 3). It will be appreciated that use of location related preferences or limitations may depend in part on GPS-enabled devices. By cross-referencing data, the prescheduled service systems described herein can identify specific locations (e.g., stores, restaurants, apartment complexes, venues, street addresses, etc.) proximate to and/or located at an identified location, and provide this specific location information as location data (e.g., as part of the traffic and map data 326).

Processor 206 is preferably provided for executing software or a set of instructions on computing devices 128. Computing devices 128 may also contain storage 208 such as random-access memory (RAM) or flash storage. Input/output (I/O) devices 210 can be used to connect computing devices 128 to other system implements, depending on the available functionalities of computing devices 128. For example, a driver may use an in-vehicle navigation system, which might not have a camera, while a smartphone may have a built-in camera. In this situation, a camera may be included as an input for the in-vehicle navigation system. Other I/O devices 210 may include a scanner, a microphone, and/or a speaker. Computing device 128 may also include display apparatus 212 to receive and display to a user notifications and/or other data received from computing system 100. Display apparatus 212 may, for example, be an electronic touchscreen display configured to provide user interface 214 in accordance with various methodologies of the invention. Computing devices 128 may also utilize internal clock mechanism 216 to determine the present time. An accelerometer or a speedometer 218 can also be provided as part of and/or in communication with computing devices 128 to measure speed, acceleration, directional changes, etc.

User interface 214 displays various content based on user selections and preferences. It will be appreciated that one or more components of computing devices 128 may be combined to provide user features specific to user selections and user locations. These selections can be displayed to the user, and the user can utilize user interface 214 to interact with displays of certain information. For instance, user interface 214 can correspond to a program downloaded onto a smartphone or other portable computer device such as a tablet computer or personal digital assistant (PDA). A user can download and install the application on one or more computing devices 128 and register with the system. In certain embodiments, pre-programmed features of computing devices 128 are utilized based on certain protocols or methods of integration of basic components, such as servers, databases 108, mobile end applications, web portals, network settings, etc. The applications can be applications written for Android (a mobile platform developed by Google and the Open Handset Alliance), IOS (a mobile platform developed by Apple, Inc.), Windows Phone (a mobile platform developed by Microsoft Corporation), etc.

All types of users can be registered and entered within the system for the purpose of activity tracking. Registration may be performed through means such as assigning a user ID to each user such that system functionalities can only be accessed when a user ID is entered. Additionally, the device the user employs to access the system may be tracked by IP address, and system activity may be tracked with time-stamps or similar means and stored in database 108. In this manner, a system administrator can track not only who is accessing the system, but also from which device, the location of the device, and the time of such access. Such capabilities allow dispatchers to track activity, and if an error occurs, such as entry of a wrong address on a service request, then the cause of the error can be easily diagnosed and addressed. It is currently a drawback in the industry that such errors cannot be detected and located, especially when a dispatcher does not want to admit the error. It will be appreciated that such functionality also provides a means for added security. Any service request entered from an unauthorized computer can be ignored. Unless computing device 128 is given access permission, it cannot access certain functionalities restricted to registered users. Allowing a dispatch system to be run in part by dispatchers allows for increased flexibility and executive function if necessary, as exceptional situations can arise which require human judgement.

According to an exemplary embodiment of the present invention, user interface 214 can be, for example, a homepage, access to a dispatch portal (for drivers), a service requesting module (for customers), an access interface to database 108, or a way for users to access one or a combination of any of the features described herein. The system can retrieve a user's information and other data that is stored in database 108, which may be provided locally and/or remotely. One of ordinary skill in the art will appreciate that numerous additional user interfaces can be utilized and contemplated for use with or in place of user interface 214.

Customer devices 130C1 . . . 130Cn may each utilize a customer interface to display various indicators on maps showing geographic information. Each indicator can signify, for example, differing customer information or customer inputs received by computing system 100 from the customer, a vender, or any application which takes a prescheduled service request 300 from the customer. Customer devices 130C1 . . . 130Cn can also each contain application features adapted to dynamically synchronize content based on customer selections provided via a customer input.

User interfaces 214 on customer computing devices 130C1 . . . 130Cn can include, but are not limited to, a home page customer interface, a service request panel used for customers to identify the details of service requests, preference details, etc., a summary customer interface, a location search customer interface, a confirmation page interface, or a combination of any of these features. By way of example, if a customer's current location is different from an originally requested pick-up location, then the customer can manually preschedule a new pick-up location that is different from the current location stored in computing device 128 or computing system 100.

A start button functionality can be provided as part of computing device 128 on, for example, one or more of driver devices 132D1 ... 132Dn. The display of one or more mobile driver device 132D1 ... 132Dn may display relevant information to a driver about the trip queue, starting with the next trip in the queue, where the details of that trip are shown, such as the pick-up location and pick-up time along with the destination and the scheduled drop-off time. The driver can then click 'Start' (e.g., a physical push button or via a touch screen interface on the driver device 132D) in order to let a dispatch or administrator know that he/she has begun the trip and is on the way. The display on the mobile device may also show a list of the remaining trips in the queue with limited details which may be expanded or viewed later. This Start button functionality helps address current drawbacks in communication between various parties as dispatchers can easily identify which service requests are underway. Additionally, it provides a means by which a customer who has scheduled a second leg can let a driver know the status of the related appointment. In a traditional dispatch system run by telephone, the current location of drivers and the status of second leg customers may be unknown. As a result, dispatchers have no choice but to operate by guesswork if they cannot easily reach a driver or customer while coordinating a service request. When a driver presses a start button at the beginning of each leg of a service request, the system can record the status in the database 108. Such functionality will also make tracking easier if the legs of a service request are handled by more than one driver.

It will be appreciated that the systems and methodologies disclosed herein provide functionalities which allow for a much smoother and more efficient process overall than those of conventional dispatch service methods. Pressing the Start button may trigger a series of events which affect the dispatch backend system, and that series of events may be carried out with the help of various software and hardware implements. Pressing the Start button may, for example, cause the driver's location to be relayed to a third-party mapping and navigation service such as Waze©, which may configure various routing options and the ETA for the driver on each route based on the driver's current speed and the distance associated with each route. This information may be relayed to a dispatch, a customer, and back to the driver, and may be provided in real-time.

In certain embodiments, the user interface may include a Start button which triggers a series of events in the database 108 regarding data storage, where the geolocation of the driver is tracked by the location identifier 204 as part of the records associated with a service request, the customer, the driver, etc. Without this Start button functionality, GPS devices may still be able to detect a driver's current location and heading. However, when providing prescheduled services, the drivers will have a long list of scheduled trips, and without a driver actually confirming that he/she is underway to pick-up a particular customer, there is no way to be sure that the location which the driver seems to be heading towards is the customer's pick-up location. As a result, the Start button is a powerful feature that can provide dispatchers and other parties with an instant update on the driver's real-time status.

Other functionalities may be of use in NEMT (Non-Emergency Medical Transportation), including functionalities provided for users on the clinic end. A clinic operator such as an employee of the clinic may be able to manage (e.g., search/add/delete/modify) appointments affiliated with the clinic, and by using the functionality of a start button, notify other employees of the clinic and customers of any changes. For example, the clinic operator or a customer may be able to notify other users that an appointment has begun by pressing the start button on their end. If, for instance, the appointment began later than scheduled, the system may be able to make any necessary changes, such as shifting an appointment to a different time or notifying customers of how the changes will impact their appointments. Additionally, in certain embodiments, a driver who has been assigned to pick-up the customer at the end of the appointment may get a real-time notification about the status of the customer, such as "Checked In," "Seeing Doctor," "Almost Finished," "Finished," etc., which allows a driver to be ready for any changes in the scheduled pick-up time.

Customer devices 130C1 ... 130Cn may be configured to allow a customer to manually supply location inputs by entering an address (e.g., street number, street name, city, state, etc.) or by manipulating and moving a service location graphic/icon on an electronic map display on a portion of a customer interface. In response to such customer selection, the prescheduled service application running on one or more of customer devices 130C1 ... 130Cn can provide the location data to computing system 100.

Once the start button is engaged, computing system 100 can calculate an estimated time of arrival (ETA). A driver may be provided with potential jobs through this interface, where queries can be displayed temporarily for the dispatch of a trip. A driver module can facilitate enabling the interface on a mobile device which the driver has in the vehicle. In the event that a customer cannot sign for a trip, computing system 100 may depend on the driver to collect a signature on his/her phone from a customer.

In preferred embodiments, the system 100 dynamically updates and stores any changes to a service request before or during the start thereof, or any updates on the status of the service request, and displays these changes in real time, both in a web portal for the dispatcher, and in a driver interface on the driver device 132 associated with the driver assigned to the service request. For example, if a customer cancels a service request or needs to change the pick-up time or location, the customer can enter this information into the system 100 via the customer device 130. The new information is stored in the database 108. The web portal of the dispatcher updates, and a notification of the change is immediately sent to the driver associated with the service request via the driver device 132. The driver can then preferably access the same information about the service request displayed in the web portal of the dispatcher. Additionally, in preferred embodiments, any new information about the customer (e.g., phone number, email address, a change to preferences, etc.) entered prior to the service request can be communicated to the web portal of the dispatcher and the user interface of the driver device 132 of the driver assigned to the service request. Preferably, only relevant driver devices are updated with new customer information (e.g., driver devices associated with drivers involved with the customer's service requests).

When a driver presses the start button at the beginning of each trip or leg of a service request, the trip status can be updated in the web portal of the dispatcher and the customer device 130 of the customer. It will be appreciated that a customer can thus view an estimate of the arrival time of his/her driver in advance thereof. Such functionality will diminish or eliminate the workload of a dispatcher as he/she will not need to field phone calls regarding changes to service, and will not have to call drivers.

Those skilled in the art will appreciate that these functions are merely examples, and that other functionalities of the driver's interface may be utilized.

External devices 202 (i.e., additional mobile devices, tablets, laptops, or other computing devices) can connect to computing devices 128 through a wired or wireless connection. It will be appreciated that these external devices 202 may include any device that can provide additional or enhanced functionalities to computing devices 128, whether computing devices 128 is a mobile device such as a tablet or smartphone, an in-vehicle navigation system, or another type of computing device.

It will be appreciated that computing system 100 can integrate different functionalities specific to various industries, including the NEMT industry. It is a conventional practice in the NEMT industry to receive service requests from brokers who request that services be provided at very specific times between two locations for which addresses are specified. These specific stipulations are understandably meant to combat fraud and make sure that service requests are completed properly. However, for drivers in this industry, adhering to the exact timing and addresses specified is not always easy. Unexpected traffic congestion or construction may prevent drivers from arriving on time to both the pick-up and drop-off locations. Dropping a customer off at the exact address as requested may not be possible because of parking regulations, pick-up and drop-off rules, standing prohibitions, or other applicable laws or fines. The driver may need to wait a certain amount of time or complete drop-offs down the block or around the corner where stopping and drop-off is appropriate and legal.

In certain embodiments, the systems and methods disclosed herein may be used in conjunction with the systems and methods disclosed in U.S. patent application Ser. No. 15/474,685, filed Mar. 30, 2017, entitled "System and Method For Geo-Aware Transportation Billing Verification," the disclosure of which is incorporated herein by reference in its entirety. The bona fide nature of these billing adjustments can be confirmed by tracking a driver's geolocation using location identifier 204 and assigning a timestamp at the time of pick-up or drop-off to make sure that such pick-up or drop-off location and timing are within a predetermined field of acceptability, such as within 150 feet away from a specified address or within a fifteen (15) minute timeframe. If a service request falls outside of such predetermined field of acceptability, then an inquiry may be opened to investigate the reasons for such deviation. In this manner, billing clerks can save valuable time, drivers do not have to risk being fined, and brokers know that the service requests they booked were completed in good faith.

Referring now to FIG. 3, it will be appreciated that dispatch systems are tasked with receiving, organizing, coordinating, and dispatching a large volume of service requests. Equitably and efficiently prescheduling each driver with a customer can be challenging. When services are prescheduled, customers can be demanding with regard to preferences when selecting a driver to dispatch. For example, a Spanish-speaking customer may not be happy with a driver who cannot speak Spanish. The present invention may sort service requests based on customer preferences, and give priority to certain drivers based on a variety of factors.

FIG. 3 is a diagram illustrating an exemplary dispatch operation incorporating an exemplary dispatch matrix in accordance with various embodiments of the invention. Illustrated is an exemplary embodiment of the operation of computing system 100 where service request 300 is received and a driver is dispatched based on dispatch matrix 322 to complete service request 300. Information from a received service request 300, which a customer can submit through one of customer devices 130C1 . . . 130Cn (or by a vendor on behalf of a customer through vendor device 126), is included in a generated dispatch matrix 322. It will be appreciated that a customer may also enter or submit service request 300 using a traditional telephone.

Once a particular customer or vendor submits service request 300, processor 104 executes instructions for retrieving relevant data from database 108 relating to a particular customer's information 302. Data may preferably be stored categorically within database 108 and be updated dynamically to ensure the most current and up-to-date information is used in the prescheduling process.

Customer information 302 may include any information associated with the customer, including, for example, the customer's transportation needs, one or more customer preferences, a customer favorites list, a customer blacklist, customer contact information, customer billing information, etc. Customer information 302 can also include the customer's home address, the customer's place of business, the customer's preferences, historical information such as information about previous locations for which a customer requested service, recommended points of interest, etc. When a customer selects one of the entries of a recommended point of interest as a current location and/or pick-up location, the system may retrieve various types of historical and current driver location data 324. As shown, computing system 100 can additionally retrieve driver profile information 310 from database 108. Driver profile information 310 can include driver service limitations, driver history and/or service history, driver favorites list, driver blacklist, etc. It will be appreciated that database 108 can store customer information 302 and driver profile information 310 for a plurality of customers and drivers, as well as any other data 308 desired.

A driver may preset various limitations which are meant to limit the scope of service requests that the driver would like to provide, and which are taken into consideration when identifying matching drivers for a customer's service request. For example, a driver's limitation that relates to distance from the driver's current location to the pick-up location may prevent computing system 100 from displaying a driver for a particular service request whose current distance from the requested pick-up location exceeds the distance that this driver has preset as location or distance limitation. A driver may prioritize the various preset limitations in order to resolve potential conflicts when they arise. Additionally, the preset driver limitation on distance to a pick-up location can limit the unavailable service requests 1010 displayed on the electronic map display 1000 to the driver. Similarly, a driver may not be displayed to the customer as a potential option in the event that the prescheduling service is switched to an on-demand service.

The historical data retrieved by computing system 100 for each driver can include information on whether the driver has been previously assigned by the particular dispatcher handling the present batch or auto-dispatched by computing system 100, whether the driver has reserved any particular zip codes where he/she prefers to provide service, the number of times the driver has previously handled service requests along the route of the legs of the service request (directly or indirectly), and the driver's rating (e.g., user rating, number of times he/she has cancelled trips and/or been rejected or blacklisted by customers, etc.). Each of these factors can be assigned a particular weighting by computing system 100. The historical data can also include a driver ID number or name, home address, a preferred service location or geographic region, preferred working hours, a partner list, a favorites list, a black list, a scheduled trip list, and an accepted trip list. These other factors relating to the customer's preferences, the driver's limitations, and other information associated with the customers and drivers may be utilized when assigning drivers to service requests or legs thereof. Various algorithms and weighted factors may be utilized in making driver assignments in accordance with the systems and methodologies discussed herein. It will also be appreciated that if any drivers not in an originally retrieved potential set of drivers identified for a batch of service requests (further discussed below) are in close proximity to the pick-up location of a service request and available, then computing system 100 can assign one of such drivers provided such driver is compatible with the customer (e.g., not on the customer's blacklist, not having the customer on his/her blacklist, and not precluded by any absolute mismatches between the customer's preferences and the driver's limitations).

Based on customer information 302 and driver profile information 310, dispatch matrix 322 can be implemented to preclude one or more drivers who cannot provide service for service request 300 because of one or more aspects of service request 300 and/or who do not wish to provide service to this particular customer, based on a set of rules relating to "compatibility." If, for example, a driver's limitations (included in driver profile 310) conflict in some manner with service request 300 (e.g., if service request 300 includes a trip from Brooklyn to Manhattan, but driver profile information 310 indicates that the driver has opted not to provide service in Manhattan, or if service request 300 includes a pick-up at 7 AM, but driver profile information 310 indicates that the driver wants his/her earliest time for picking up customers to be 8 AM), then such drivers can be precluded from inclusion within a compatible set of drivers 320 generated by computing system 100.

In certain embodiments, driver location data 324 and/or traffic and map data 326 can be retrieved by computing system 100 and factored into the system's determination of whether a particular driver is sufficiently compatible for inclusion in the compatible set of drivers 320. Driver location data 324 can include a preset and/or relatively current location of the driver or the location where the driver is scheduled to be at a certain time. Traffic and/or map data 326 can include geographic, traffic, and travel time information associated with particular areas. It will be appreciated that database 108 can include driver location data 324 for a plurality of drivers and traffic and map data 326 for a wide array of geographic areas.

In certain embodiments, computing system 100 generates a compatible set of drivers 320 and dispatch matrix 322 from service request 300, customer information 302, driver profiles 310, and/or driver location data 324 by using a processing function in which different variables having different priorities are processed. For example, received service request 300 may include numerous details, such as timing information and locations to which one or more customers want to travel. Driver location data 324 and traffic/map data 326 (e.g., routes, traffic information including traffic patterns, congestion, etc.) can additionally or alternatively be factored into the calculations. In addition, a driver priority can be established which includes a certain "weight" assigned to a driver indicative of how well a particular driver matches service request 300, the customer's preferences, and the customer favorites list, and/or the feasibility of the driver being able to service the request given where he/she is expected to be at the time of pick-up (driver location data 324), and the expected traffic patterns expected (traffic and map data 326).

By way of example, two of the compatible drivers 320 who are both familiar with a certain route of service request 300 and who have no service limitations which interfere with service request 300 may be assigned the same weighted priority for these factors. However, if one of the two drivers is on the customer's favorites list while the other is not, then the driver on the favorites list may be prioritized over the driver not on the favorites list, and thus assigned a greater driver priority. Based on the various driver priorities established in dispatch matrix 322 for the compatible set of drivers 320, computing system 100 creates dispatch output 330. Dispatch output 330 can include a display of a selection of potential drivers, and can be automatically sent to the customer by computing system 100, or reviewed by, for example, a third-party administrator 134 operating computing system 100, and then sent to the customer. Dispatch output 330 may be a subset of the compatible set of drivers 320 or the entire compatible set of drivers 320 depending on how many drivers make the cut into the compatible set 320 and depending on how many options for drivers the customer wants to view. The customer can then select a driver from the list of drivers included in dispatch output 330. The driver selected by the customer may then be given the option to accept or may be automatically scheduled (further discussed below with respect to FIG. 4B).

If a driver accepts the service requests, then he/she may see the status of the accepted service requests on his/her service requests list, marked "Accepted." The driver may then select one or more service requests to start together. After the driver selects more than one service request and begins to act on the first service request, a list of all of the selected service requests may be presented to the driver via one of driver devices 132D1 . . . 132Dn for reference, and the driver may update the status of each service request. For example, each service request may have buttons for "Navigation", "Arrived at Pick-up Location", "Begin Trip", "Arrived at Drop-off Location", etc. If there is more than one service request that the driver is handling at the same time, then the driver may be able to decide pick-up and drop-off in sequence. A signature function may be added to the system for customers to e-sign before or after the service request has been finished.

Each of driver devices 132D1 . . . 132Dn may also include a lockout screen that blocks other functions such that the only item appearing is a notification which queries the driver whether or not to confirm a trip. Such notification may show the details of the trip, such as pick-up location, pick-up time, destination, and drop-off time, but without any other interactive feature other than a "Yes" or "No" query for trip confirmation.

Prescheduled service requests may be shown on a list with each having the caption "Assigned" or "Unassigned" over a status column. Drivers may be given two options: accept or reject. If a driver accepts the service request, then the service request may show "Accepted" in the status column of the service requests list. If a driver rejects the service request, then the service request may show "Rejected" in the status column, and the pre-scheduled driver's name may be shown for reference. Service requests which are deleted from the updated list or version based on records in database 108, or ones which are marked "Cancelled" in the updated version, may be stored as cancelled service requests in computing system 100. If certain cancelled service requests were originally assigned to drivers and started, then the system can mark or store them as "Cancelled After Start," and the name of the driver may additionally be recorded for further reference. If new service requests are received which did not appear in previous service request schedule updates, then such new service requests may be displayed to the dispatcher, and may be assigned a high priority in order to remind the dispatchers to find a driver and dispatch those service requests as soon as possible. If dispatchers receive new service requests by, for example, phone, email, text message, etc., then these could be entered manually into the service requests list, and subsequently assigned to drivers who can either accept or reject them.

In certain embodiments, the system can determine compatibility between a customer and a driver for a service request by comparing various factors relating to each user's limitations and preferences. For example, if a driver has not indicated Mandarin language abilities and a customer prefers a Mandarin-speaking driver for all of his/her potential drivers, then all service providers who do not speak Mandarin can be deemed incompatible by the system. With regard to time limitations, a driver's time limitations can be compared to the estimated travel time to complete the customer's service request, including the time for which the driver may be underway from traveling to the pick-up location to the drop-off location to the return location, if applicable. If the estimated travel time is beyond the driver's time limitations (e.g., the driver would be unable to get to where he/she needs to be by a certain time), then the driver or service provider may be deemed incompatible for that particular service request. The system can also compare the driver's location limitations with the route of the service request. If a driver has indicated that he/she will not go to certain areas, then in situations where the customer's pick-up or drop-off location involves at least one of those areas, the driver can be deemed incompatible. Each customer can customize which, if any, factors or attributes is/are relevant to his/her compatibility preferences for being matched with drivers for prescheduled services, and the degree/extent to which each attribute is relevant. The system can be configured to make a weighted calculation based on the customer's preset priority levels for various preferences pertaining to the driver, the driver's vehicle, the driver's capabilities, and/or whether or not a particular driver has or offers such preferences.

It will be appreciated that location limitations may greatly affect where a driver eventually provides services, and that the exemplary embodiments discussed herein allow for an efficient dispatch system that can use different defined geographic regions as a factor when scheduling service requests. These regions may be defined by country to smaller divisions such as state, county or borough, neighborhood, and even zip code. The system can be configured to identify where service requests take place, particularly the start locations and end locations, as these relate to the times at which the service requests are scheduled, and can group them by region. It will be appreciated that such groupings using the information in database 108 will provide improved efficiency over standard practices of dispatching randomly. For example, in a large city such as New York, a driver may be dispatched at random times to random locations. In the NEMT industry, a driver may, for example, drop-off a customer in the Bronx and immediately be dispatched to pick-up another customer in Far Rockaway, Queens. Although both of these locations are within the New York metro area, they are relatively far apart geographically. In addition, after factoring in traffic and navigation difficulties common to New York, the travel time between these two locations can easily be upward of an hour or more. By grouping service requests according to geographic area and tracking drivers, dispatching can be performed more efficiently, enabling drivers to complete more service requests in less time. It will also be appreciated that such groupings will make it easier for dispatchers to preschedule service requests with much higher efficiency.

It will be appreciated that the systems and processes described herein will allow for prescheduling of service requests and driver assignments, whether such prescheduling is for same day service, for service just hours in advance, or for service days or weeks in advance. By storing customer information, driver profile information, driver location data, and traffic map data in the manner discussed above, computing system 100 is able to quickly eliminate a number of drivers in database 108, and match a service request to a select list of drivers who are deemed most compatible with the customer and his/her service request, and based on the driver's location or expected location. It will be appreciated that such processing allows computing system 100 to operate more efficiently because it can quickly focus in on more compatible and geographically close drivers.

Figure 4A:
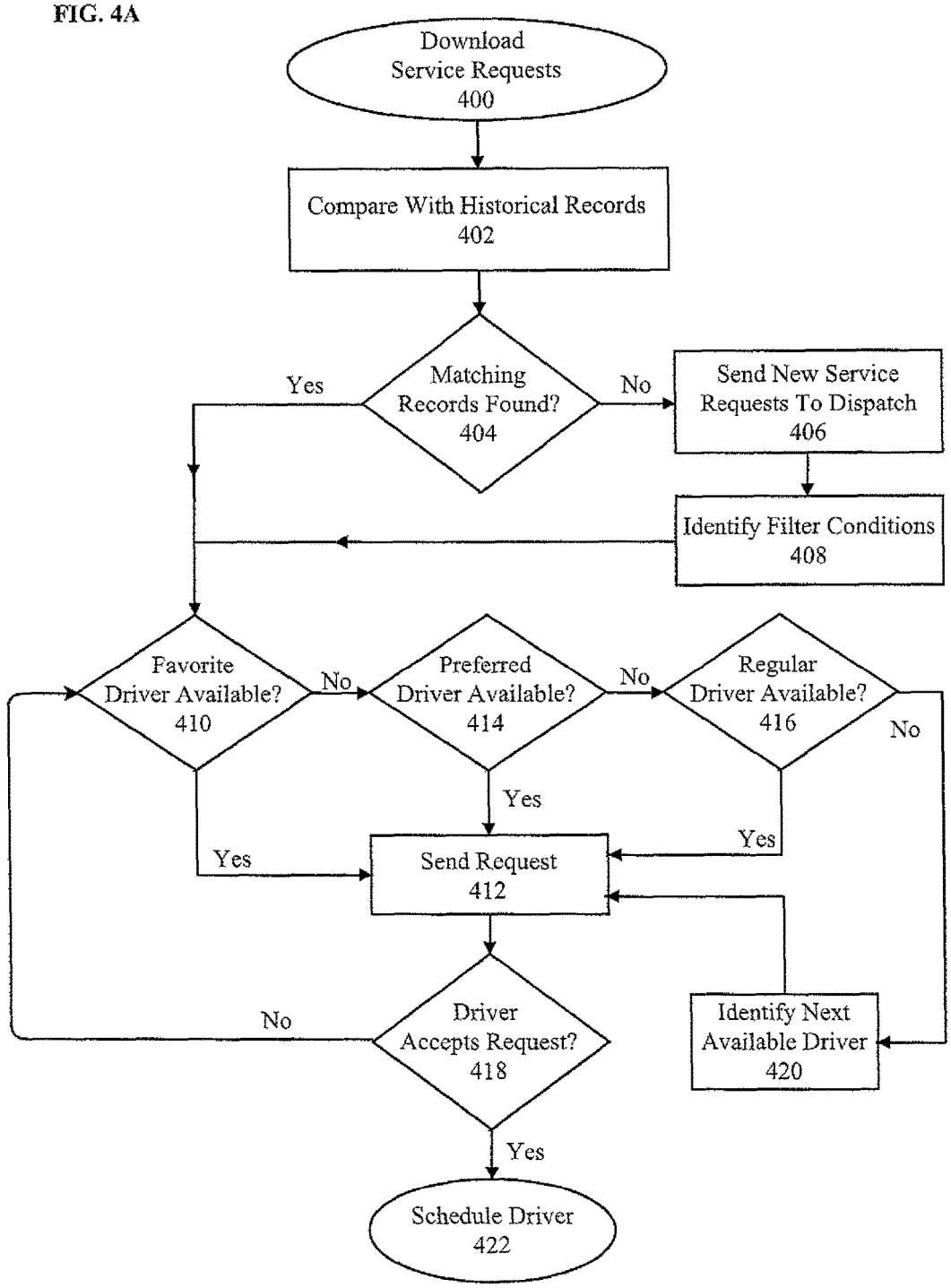
FIG. 4A is a flowchart illustrating exemplary dispatch logic in accordance with various embodiments of the invention.

Turning now to FIG. 4A, shown is a flowchart illustrating an exemplary dispatch operation in accordance with an embodiment of the invention. The process starts with computing system 100 downloading or otherwise receiving service requests 300 (Step 400) which may have been uploaded by a vendor and/or submitted by a customer. Computing system 100 may download service requests 300 automatically based on programmatic steps, or a dispatcher can manually download the service requests by, for example, clicking a download link in a web portal or refreshing a pending requests page. Computing system 100 may be configured to allow for several ways in which the service requests can be populated and updated to reflect any changes. For example, computing system 100 may be configured to access relevant vendor web portals or an application program interface (API) to download the list of service requests. In order to ensure that the service request list reflects the most recent changes, computing system 100 may perform such downloads repeatedly at certain intervals (e.g., every 5 minutes, every 15 minutes, every 30 minutes, etc.). Vendors may also supply and edit service requests through a vendor module (e.g., through vendor device 126). In either case, computing system 100 then processes the updated list of service requests, and compares them with past service requests based on historical records stored within database 108 to determine whether there are similarities (Step 402).

Computing system 100 then determines whether its details match a record of any previous service requests stored in database 108 (Step 404), such as, for example, a matching customer name, a pick-up location, and/or a drop-off location. If no match is found, then the service request 300 is sent to dispatch for new processing (Step 406). Before service request 300 is dispatched, however, the system identifies any filter conditions (408) (e.g., level of familiarity with route, prior number of service requests done for the customer, two-door versus four door vehicle, etc.) that service request 300 may have, and accommodates those filter conditions by, for example, comparing them to relevant portions of the driver's limitations in database 108 and precludes certain driver's from being selected to complete the service request (e.g., the service request requires the driver to be fluent in a particular language, but the driver does not speak the particular language). If matching records are found (Step 404) or after new service request records have been processed (Steps 406/408), computing system 100 searches the records in database 108 to determine whether a favorite driver of a customer for a service request is available to carry out the service request 300 (Step 410).

If a favorite driver is determined to be available (Yes, Step 410), then computing system 100 sends service request 300 to the favorite driver for acceptance (Step 412). If no favorite driver is determined to be available (No, Step 410), then computing system 100 searches database 108 to determine if a preferred driver is available (Step 414). If a preferred driver is available (Yes, Step 414), then computing system 100 sends service request 300 to that preferred driver for acceptance (Step 412). If no favorite or preferred driver are found to be available (No, Step 414), then computing system 100 identifies whether a regular driver is available (Step 416). If a regular driver is available (Yes, Step 416), then computing system 100 sends the service request to the regular driver for acceptance (Step 412). If no regular driver is available (No, Step 416), then computing system 100 continues to monitor all drivers for the next available driver to be identified and scheduled (Step 420). Once an available driver is identified, service request 300 can be sent to the identified available driver (Step 412).

If the first regular driver to whom service request 300 is sent at Step 412 does not accept the service request, then the system can repeat the process until another driver is identified (Step 420). When a driver receives service request 300 on his/her driver device 132D1 . . . 132Dn, that driver has an option to either accept or reject the request (Step 418). If the driver accepts service request 300, then that driver is scheduled to complete the service request (Step 422). If, however, the driver rejects service request 300, then computing system 100 cycles back to step 410 and checks again whether there are any favorite drivers available. If no favorite, preferred, or regular drivers are available, then after a certain amount of time has elapsed, the dispatcher may need to be notified so he/she can go through the process of identifying another driver (Step 420).

A driver may make additions to the driver's favorite customer list and/or the driver's customer blacklist after completing a service request. For example, the driver may be queried as to whether he/she was satisfied with the customer. If the driver was not happy with the customer, then the driver may add the customer to the driver's customer blacklist, in which case the driver and the customer will not be matched together in for future service requests. If the driver is neutral on how he/she feels about the customer, then the driver need not take any action, and the customer will not be added to the driver's favorite customer list or the driver's customer blacklist. If the driver is satisfied with the customer, then the driver can send the customer a request to authorize addition of the driver to the driver's favorite customer list. In such embodiments, it is the up to the customer to decide whether or not to accept this request. If the customer denies the request, then the customer is not added to the driver's favorite customer list. If the customer accepts this request, then he/she is added to the driver's favorite customer list. When the driver provides service to the customer another time, the driver can again be queried as to whether or not he/she was satisfied with the customer. If so, then the driver can keep the customer on his/her favorite customer list until the driver provides service to the customer another time, in which case the query will come up again, and so on. In this manner, the driver can be queried about his/her satisfaction with a customer at the end of each service request. If the driver is not satisfied with the customer, then he/she may choose to remove the customer from the driver's favorite customer list.

A customer can similarly make an addition to his/her favorite driver list and/or his/her driver blacklist after completion of a service request. The customer may be queried as to whether he/she was satisfied with the driver. If the customer was not happy with the driver, then he/she may add the driver to the customer's driver blacklist, in which case the customer and driver will not be matched together in future service requests. If the customer is neutral on how he/she feels about the driver, then the customer need not take any action, and the driver will not be added to the customer's favorite driver list or the customer's driver blacklist. If the customer is satisfied with the driver, then the customer can send the driver a request to authorize addition to the customer's favorite driver list. In such embodiments, it can be up to the driver to decide whether or not to accept this request. If the driver denies this request, then the driver is not added to the customer's favorite driver list. If the driver accepts this authorization, then he/she is added to the customer's favorite driver list. When the driver provides service to the customer another time, the system can query the customer again whether or not he/she was satisfied with the driver. If so, then the customer can keep the driver on the favorite driver list until the driver provides service to the customer another time, in which case the query can come up again, and so on. The customer can be queried about his/her satisfaction with a driver at the end of each service request. If the customer is not satisfied with the driver, then the customer may choose to remove the driver from his/her favorite driver list. Computing system 100 may be configured to determine which driver finished a service request the most number of times, and attempt to add this driver to the customer's favorites list. If this driver is not available, then computing system 100 may be configured to assign another favorite driver who finished a service request for the customer the second most times, the third most times, and so on.

When a customer indicates that he/she wants to add a driver or several drivers to his/her driver blacklist, the customer may be prompted to input reason(s). It will be appreciated that skipping over blacklisted drivers automatically improves the efficiency of service for the customer and the processing speed of computing system 100 in creating dispatch matrix 322 and dispatch output 330. It will also be appreciated that the driver blacklists will function as incentive tools for drivers to improve their overall service. The driver may realize that he/she needs to improve service to gain more business.

A driver may refer a customer from his/her favorite customer list to another driver. For example, two drivers involved in such a process may be referred to as Driver 1 and Driver 2, with the customer referred to as Customer 1. Driver 1 may indicate that he wants to refer a favorite customer, Customer 1, to another driver, Driver 2. An authorization request is first sent to Customer 1 to give him/her the choice to authorize the referral or not. If Customer 1 does not authorize the referral, then no referral occurs. If Customer 1 does authorize the referral, then Driver 2 is notified and given the option to accept the referral or not. If Driver 2 does not accept the referral, then no referral occurs. If Driver 2 accepts the referral, then Driver 2 is provided with the service request to complete and Customer 1 may then be added to Driver 2's favorite customer list. Similarly, Driver 2 may be added to Customer 1's favorite driver list.

Users of computing system 100 may make referrals to other users of computing system 100 as long as both users are registered. For users receiving a referral of someone on a blacklist or a favorite list, information such as profile information about the individual being referred can be made available to the user receiving the referral. Computing system 100 can similarly provide information to the referred party about the user to whom they are being referred. For example, a second customer receiving information about a driver may see in the profile information of that driver that he/she has been found in the past to be a no-show, and the customer may choose not to add that driver to his/her favorite list.

Customers may also refer drivers from their blacklist to other customers. Referring customers can refer individual drivers, groups of drivers, or entire lists of blacklisted drivers to one or several other customers. Drivers can refer customers from their favorite list to other drivers. Referring drivers can refer individual customers, groups of customers or entire favorite lists to one or several other drivers. A driver may include one or more preset reasons or a note describing why he/she is referring the favorite customer or customers. Such a process may start, for example, with Customer 1 indicating that he wants to refer Driver 1, who is on Customer 1's favorite driver list, to another customer, Customer 2. Before the referral is executed, however, an authorization request is sent to Driver 1 who is given the choice to authorize the referral or not. If Driver 1 does not authorize the referral, then no referral occurs. If Driver 1 accepts the referral, then Customer 2 is given the option to accept the referral or not. If Customer 2 does not accept the referral, then no referral occurs. If Customer 2 accepts the referral, then Driver 1 is added to Customer 2's favorite Driver list. Similarly, Customer 2 may be added to Driver 1's favorite customer list.

Computing system 100 can provide information to a dispatcher showing which service requests remain unassigned. Such information can be presented using a map display with labels which identify the service request or the customer number. On this same display, a dispatcher might see drivers near the locations of unassigned service requests. Various indicators may be utilized on the visual display to differentiate an available driver from an unavailable driver so that the dispatcher can know immediately which driver(s) to whom he/she should assign to a service request. For example, an available driver may be marked by an indicator that shows a white car, whereas an unavailable driver may be marked by an indicator that shows a black car. It will be understood by one skilled in the art that the indicators described herein are not meant to be limiting. Instead, they are illustrative as exemplary embodiments of the present invention.

Accordingly, the system can provide sets of indicators to better assist users, including drivers and customers, schedule service or get service prescheduled. Various sets of indicators may be provided to streamline the conveyance of information. Indicators can depict this information through one or more letters, numbers, icons, symbols or other graphic representations of the information, which can be displayed on a user's interface. For example, a set of indicators can be provided to convey an estimated travel time (ETT) from the customer's pick-up location to the customer's drop-off location specified in a service request. A service request may contain multiple pick-ups and drop-offs if the service request is pre-scheduled to have more than one leg. This set of indicators conveying ETT connects location information associated with the customer's pick-up location and the customer's drop-off location in a prescheduled service request. Preferably, such indicators are displayed to inform the customer about an estimated time in transit, or the driver about the estimated travel time to complete the service request. Such indicators may be based on the estimated time to get from the pick-up location to the drop-off location, which can be provided by a third-party mapping API such as Google® Maps. From the point of view of the driver, it may be the time from the current location to the pick-up location and from the pick-up location to the drop-off location, an additional step. This too may change if the customer's service request is prescheduled to have multiple legs. Such indicators may also include the time it would take the driver to return to the return location from the drop-off location, if an applicable return location limitation was set by the driver. From the driver's point of view, the estimated travel time also means the time to complete a service request. However, a completed service request from the customer's point of view is only the time from the pick-up location(s) to the drop-off location(s).

A set of indicators may also be provided to identify more specific availability of drivers. Such indicators may be shown to both customers and dispatchers on an electronic map, where a driver may only be shown on the electronic map when active. Such indicators may also include information about the driver's availability based days and/or times the driver has preset. For example, such indicators can show availability and how long the period of availability may last, or whether it is indefinite availability. Such indicators can be removed if the driver goes off-duty or is currently carrying out a service request. Alternatively, such indicators may be provided to identify whether a customer's service request has been assigned to a driver. Such indicators may be shown to dispatchers on an electronic map display, thus providing a visual representation of which trips are still waiting to be assigned, and they may be configured to automatically disappear from the dispatcher's interface if a driver is dispatched for the service request (e.g., once the service request is no longer unassigned).

A set of indicators may also be provided to convey information about the current geolocation of a driver and the driver's return location, if the driver has preset a return location. Such indicators may be provided for viewing by a dispatcher on his/her touch screen electronic map display, so that the dispatcher is able to assign a service request to the most compatible driver. In another embodiment, a set of indicators may be provided to convey information about designated pick-up locations and drop-off locations, and locations from the first and second leg of a service request, as prescheduled by the customer. Such indicators may show service request related location information to a dispatcher or a driver on a touch screen electronic map display. The touch screen display enables a customer to make selections regarding a service request, and can be equipped with sensors within the touch screen display that are clickable or otherwise react to touch. The signals that are received by the sensors within the touch screen display are what the processor may receive as input, and those signals may be turned into outputs which lead the system to carry out the selection a customer or a driver has made.

A set of indicators may also be provided to show to a customer the driver's estimated time of arrival (ETA) at the requested pick-up location. In order to generate a driver's ETA, the system, with the assistance of a third-party API such as Waze®, may identify a driver's current real-time traveling speed, such as a road speed along a potential route from the driver's current location to the prescheduled pick-up location. Alternatively, a set of indicators may be provided to show to a driver the customer's estimated time of readiness (ETR). Such indicators can reveal, for example, when the customer intends to be ready for pick-up if the customer has scheduled a second leg for a trip. For example, a customer at a doctor's appointment can enter into one or more of customer devices 130C1 . . . 130Cn that he/she estimates that he/she will be ready for the return trip in thirty (30) minutes. The functionality of an ETR indicator allows for improved efficiency in the provision of prescheduled services. It will be appreciated that such prescheduling and ETR estimates can help drivers cut back on wasted time. With the assistance of the ETR indicators, a driver will be kept aware of the customer's current status, and if the ETR happens to be a long enough amount of time, then the driver may be able to complete another service request during that time.

This functionality is especially useful on multiple leg trips. The first driver who provided a service for the first customer on the first leg may be able to decide, based on the ETR specified by the first customer, whether to wait for that first customer on the second leg or to take a second different service request. If the first customer's ETR shows that he/she might not be ready for a while, then the first driver might decide to take the second service request, and anticipate completing it by the time he/she is ready for the second leg. Even if the first driver is considered a preferred driver for that first customer, if the system detects, based on the ETA, that the first driver is not able to arrive for the second leg on time, then the system can notify the first customer. At this point, the first customer will have an option to either agree to wait until the preferred driver completes his/her second service request, or to request reassignment of the second leg to another driver. If the second leg is provided to another driver, that other driver is sent an estimate about when to be at the pick-up location for the second leg which may be conveyed by the ETR indicator.

The system provides multiple sets of indicators to better assist a customer select a best matching service provider for the service request. Extensive customization may be allowed for both a customer and a service provider. However, various information including but not limited to pricing, identification of the number of completed service requests, familiarity with a route in a service request, etc. may be complicated for a user to navigate when making a deal for a service request. As a customer and service provider need different information, the indicators will differ depending on what that information may need to be. Service providers and customers are able to customize their experience, expectations and preferences through the various sets of indicators. Exemplary embodiments of the present invention provide at least twenty-six (26) customizable sets of indicators to streamline this comprehensive information. The system will display unified indicators to avoid confusion, but users may also elect to change certain sets of indicators. For example, users may want to replace a default symbol or icon that represents an indicator with their own symbol, such as an emoticon or abbreviation for his/her own user ID. Furthermore, explanations about what each indicator means may also be provided, and both customers and service providers have the option of turning these explanations on/off, or temporarily hiding them. If they turn them off, they may still able to turn any or all back on. For example, new users may prefer to have the explanations on, while those who have used the service for a while and are very familiar with them may not need the explanations for the meanings of the various sets of indicators. Customers and service providers may also change the order in which the indicators are displayed if they would like to prioritize one set of indicators over another.

The indicators are a means to transmit or display information related to services to a customer, a service provider, or both in a simple, fast, and convenient way. Multiple sets of indicators are used to assist with matching proper service between the two, as well as allow for customization by both customers and service providers. Customers and service providers may have different indicators on their respective interfaces, but they can also see each other's indicators if they choose to. Additionally, there may be a tiering system for some indicators, which includes a range of numbers with a minimum and maximum amount, and each tier representing a different meaning to different customers and service providers. Below is a brief description of preferred sets of indicators. A more complete description of these indicators is provided in the '783 application, which is incorporated herein by reference in its entirety.

A first set of indicators may identify a user type for drivers in three categories, including but not limited to favorites, preferred, and regular drivers. A second set may also identify a user type for customers in three categories, including but not limited to favorites, preferred, and regular customers. A third set may identify the availability of service providers, which may connect the time for which the service providers will remain available for service requests. A fourth set may identify whether a customer is currently requesting a service request, which may connect the time for which service requests from the customer will remain available. A fifth set may be based on the service request volume that a service provider has carried out, where numbers regarding historical data are connected. That is, they may connect numbers to reflect the total number of service requests carried out by a service provider within certain period of time, where the total number is further divided according to a certain period of time and is reflected by numbers, tiers, or combination thereof. A sixth set may show one or more or any combination of geographic zones based on one or more or any combination of corresponding search parameters preset by the customer. A seventh set may be based on the data and information provided by the sixth set of indicators to further compare the total number of potential available service providers with the total number of potential available customers. An eighth set may help streamline pricing information regarding a service provider's response to a price proposal from a customer by connecting numbers regarding pricing. A ninth set may display information regarding a price that has been initiated by a service provider in the case a customer sends the service request without a quoted price, and the service provider responds with a proposed price, which may be either negotiable or non-negotiable. A tenth set may connect historical data and geolocation data to reflect information regarding zone information based on the total number of service requests completed by a service provider within the geographic zone in which a customer indicates the pick-up location the service request. And, an eleventh set may connect historical data and geolocation data to reflect information regarding zone information based on the total number of requests completed by a service provider within the geographic zone in which a customer indicated the drop-off location in the service request.

A twelfth set may convey the level of familiarity of a service provider with the route of the service request, represented at least through percentage or any other depiction such as tiers, wherein the familiarity is calculated by the route between the pick-up location and the drop-off location indicated in the customer's service request is matched with one or more service providers' past routes derived from the one or more service providers' historical service data stored in the database. An administrator of computing system 100 such as a dispatcher may utilize features unique to their job functions coordinating drivers with various customers. Such coordination may be done automatically through route matching software, manually by human dispatchers making decisions about who is likely available to service a service request, or some combination thereof.

This set of indicators may be generated by connecting requested route information with a service provider's service records stored in a database. For a transport request, this information may include the service provider's familiarity with the route indicated in the service request; for delivery service, this may be information such as the service providers experience or familiarity with the route. Regardless of the service request type, the indicator is adjusted to display information relevant to the situation. The percentage may be displayed by itself as a percentage, or it may be divided into tiers, for example, tier E standing in for familiarity between 0-19 percent, tier D for 20-39 percent, tier C for 40-59 percent, tier B for 60-79 percent and tier A for 80-100 percent. The representation of tier need not be limited to A through E or even letters at all, as tiers may be shown as any single one or combination of depictions that divides the familiarity percentages by tier. The tier and percentage may also be shown together. For a service provider, this may be a useful indicator in evaluating where he/she has picked up many customers, or where he/she picked up only a few customers. This set of indicators may be used by service providers to evaluate where they have the most experience or may be the most valuable, or it may be used by a customer in selecting a best matching service provider based on the experience he/she may have with the service request.

A service provider's familiarity is contextualized in two ways, by "direct" or "indirect" familiarity, and each type is distinct. Direct familiarity is a calculation of how familiar the service provider is with a certain route, as in the route from the pick-up location to the drop-off location—all done in one trip. Indirect familiarity, in contrast, is a calculation of how familiar a service provider is with the route between the pick-up and drop-off location, but this familiarity may be through piecemeal experience with the route. For example, two service providers have 100 percent familiarity with a route; the first service provider has provided service of this same route for a customer previously, from the same pick-up location to the same drop-off location. This is direct familiarity, and in addition to the 100 percent rating for matching, it may be indicated by number or by tier that this service provider has provided service using the same route. The second service provider also has a 100 percent familiarity however, the one part of the route he/she provided for a different customer in the past, and another part of the route was also included as part of the route in another service request. Even though the service provider has traversed the length of this entire route, it was not from the same pick-up location to the same drop-off location. The familiarity the service provider has with the route is indirect. The degree of familiarity with the requested route, whether direct or indirect, will be calculated by comparing the requested route with the routes of service requests previously completed by the same service provider by tracking how common all or any parts of the requested route are to the routes of previously completed service requests. The service provider's familiarity with the requested route would especially matter at times when any part of the requested route lies within the area known to have weak or no GPS signal, or when the service request takes place after dark making it harder to follow navigation directions.

A thirteenth set of indicators may be based on how many times a customer and a service provider have been matched and have completed a transaction together. A fourteenth set may connect the location information of the service provider with location information of the customer's pick-up location to display the time within which a service provider can pick-up the customer, an estimated time of arrival (ETA). A fifteenth set may be based on the estimated travel time (ETT) from the customer's pick-up location to the customer's drop-off location indicated in a service request. A sixteenth set may connect geolocation data to reflect at least the customer's pick-up and drop-off locations indicated in the service request. A seventeenth set may convey information about total number of service requests requested and completed by a customer. An eighteenth set may identify one or more or any combination of geographic zones based on one or more or any combination of search parameters preset by the service provider. A nineteenth set may be based on the eighteenth set of indicators to further display the number of potential available service providers compared to the number of potential available customers. A twentieth set may streamline the display of the price proposals a customer initiates, where numbers regarding pricing information are connected and displayed. A twenty-first set may provide details about a customer's proposed price that comes as a response to a service provider proposed price, where numbers regarding pricing information are connected and displayed by this set of indicators. A twenty-second set may connect historical data regarding a customer's service request history and geolocation data to identify a customer by how many service requests he/she has requested and completed based on pick-up location geographic zones. A twenty-third set may identify a customer by how many service requests he/she has requested and completed based on drop-off location geographic zones, where geolocation data and historical service request data are connected. A twenty-fourth set may connect historical service request data to display the number of times a service provider and a customer have been matched with each other and completed a transaction together. A twenty-fifth set may identify the estimated travel time to complete a service request for a service provider. And, a twenty-sixth set may connect geolocation data of a service provider and the geolocation data of service provider's preset return location after carrying out a service request, if the service provider preset a return location.

In addition, any indicator that is based at least in part on countable numbers may also be reflected in terms of tiers. Tiers assigned by the system may be ranges of numbers with minimum and maximum amounts depending on whether it is applied to customers or to service providers, and also depending on whether it is applied to transport service, delivery service or both transport and delivery service. They may be displayed as letters, shapes or colors or any other way that shows the difference between each tier. Some customers' and service providers' indicators may have different meanings. The indicators indicate activity relative to their user type, category and subcategory. Since the system stores service request records in the database of the system, it is able to quantify when they were made or carried out by using time stamps and where they were carried out by request details. These records regarding the time or other numbers, however, may be scaled up or down, where a customer may divide the time frame of relevance, such as one or more days, one or more months or one or more years. All of these different adjustable search parameters regarding time or timeframe or zone or other numbers are designed as customizable so that a customer and a service provider can individualize and prioritize the information they want to see.

The supply and demand relating to a service provider can be displayed by search parameters preset by the customer based on a time within which the customer expects the pick-up to occur at the pick-up location, a distance from the pick-up location, and the desired number of service providers with whom the customer wants to negotiate a price for the service request. The search parameter based on time may create a search radius, and may include identifying all service providers on all possible routes leading to the pick-up location, identifying real-time traveling speed along each of the possible routes, multiplying the traveling speed of each service provider along the possible routes by a maximum time preset by the customer to calculate a maximum distance the service providers can travel within the maximum time preset by the customer, identifying the pick-up location of the customer as a center point of the search radius, and identifying the extreme point for the search radius, which may be the furthest location of a service provider within the search parameter or some other point that is at a distance preset by the customer. The supply and demand for the service request within the search parameters may be displayed for the customer as the number of potential available service providers for supply compared to the number of potential available customers for demand.

Presetting the search parameters by the customer may include presetting and searching for the desired number of service providers, and creating a search radius by identifying the pick-up location as the center point for the search radius, and identifying the extreme point for the search radius to be the furthest location from the center point of the service providers. The search radius may be smaller or larger than a search radius which is based on time or distance, and an estimated time of arrival of the service providers may be identified for the customer with assistance of the indicators. The number of service providers identified within the search radius may be prioritized for price negotiation for the customer.

Customers and service providers may have different indicators displayed on their own interfaces. Some of these indicators may be relevant to the type of user, whether providing or requesting service. Preferably, some indicators are more useful to customers, whereas some are more useful to service providers. However, indicators are not intended to be displayed to only service providers or to only customers exclusively, as indicators that are preferably displayed to one party may reflect information useful for the other party. If users choose, however, they can look at their own information throughs the system. If they are interested in seeing their own indicators or their service request history to make sure that the indicators other users see regarding their service request history are correct, they may do so through their profile information or any other means designated by the system, which shows all the indicators that apply to them. This service request history may include information that other parties can see, such as indicators regarding total number of service requests completed or requested. The service request history may also provide information that other parties cannot see, such as private information regarding how much money they have earned or spent. All such indicators are intended to provide customers and service providers with customizable information that may help them choose a best matching a service provider or a customer, respectively, to make a best deal for each other. It will be appreciated that additional indicators may be developed and/or utilized for deployment through one or more computing devices as a means for visually communicating a summary of other types of relevant information.

The first action a driver may take to accept a service request is pressing an 'Accept' button on driver device 132D1 . . . 132Dn. When the driver is ready to begin the service, he/she can press a 'Start' button to indicate that he/she is on the way to the pick-up location. The driver may also call the customer to give notice that he/she is on the way. If at any point after pressing the 'Start' button the driver needs to make a cancellation, he/she may do so, if, for example, he/she gets a flat tire, or if the driver's vehicle experiences a mechanical failure, or any other legitimate grounds for a cancellation. In such circumstances, the driver can provide the reasons for the cancellation, and cancel the service request, in which case the service request may be re-dispatched to another driver such as a partner driver.

Drivers may cancel the service requests any time they want. If drivers cancel one day in advance, then they may not need to report any reason for the cancellation. In such cases, dispatchers can reschedule and re-dispatch to a new driver. If drivers cancel on the date that the service requests are to be completed, then drivers may provide reasoning for the cancellation, choosing from potential default reasons or filling in the reasons by text entry. If no drivers are readily available to accept a service request following the cancelation, then the service request can go back to the service requests list on a main web portal for dispatchers to assign to other drivers. After a dispatcher reschedules and re-dispatches service requests, computing system 100 can be configured to send another notification to the customer, which can include the previous driver's name, the reason why the previous driver cannot provide service for the customer, the new driver's name, the new driver's phone number, the new driver's vehicle make, brand and color, the pick-up time, etc. The customer may change or cancel a service request at any time. If upon entering the vehicle a customer wishes to change destinations, the driver may reroute to the intended destination. Once the driver and the customer arrive at the drop-off location, the driver can ask the customer to sign for the service request as confirmation that correct and/or satisfactory service has occurred. Upon completion of these steps, the service request comes to an end.

It will be appreciated that prescheduling the dispatch of drivers gives individual drivers discretion in choosing which service requests to accept or reject. Computing system 100 may provide a functionality for a driver to choose potential service requests with, for example, an electronic map showing available routes for that day, the next day, the next week, etc. A driver's time and location limitations are taken into account by utilizing current and/or future predicted traffic and other events potentially impacting travel time (e.g., construction, road closures, accidents, etc.) or location limitations on the driver. Such data may be stored in database 108 and supplied into dispatch matrix 322 as part of the traffic and map data 326 (see FIG. 3).

Figure 4B:
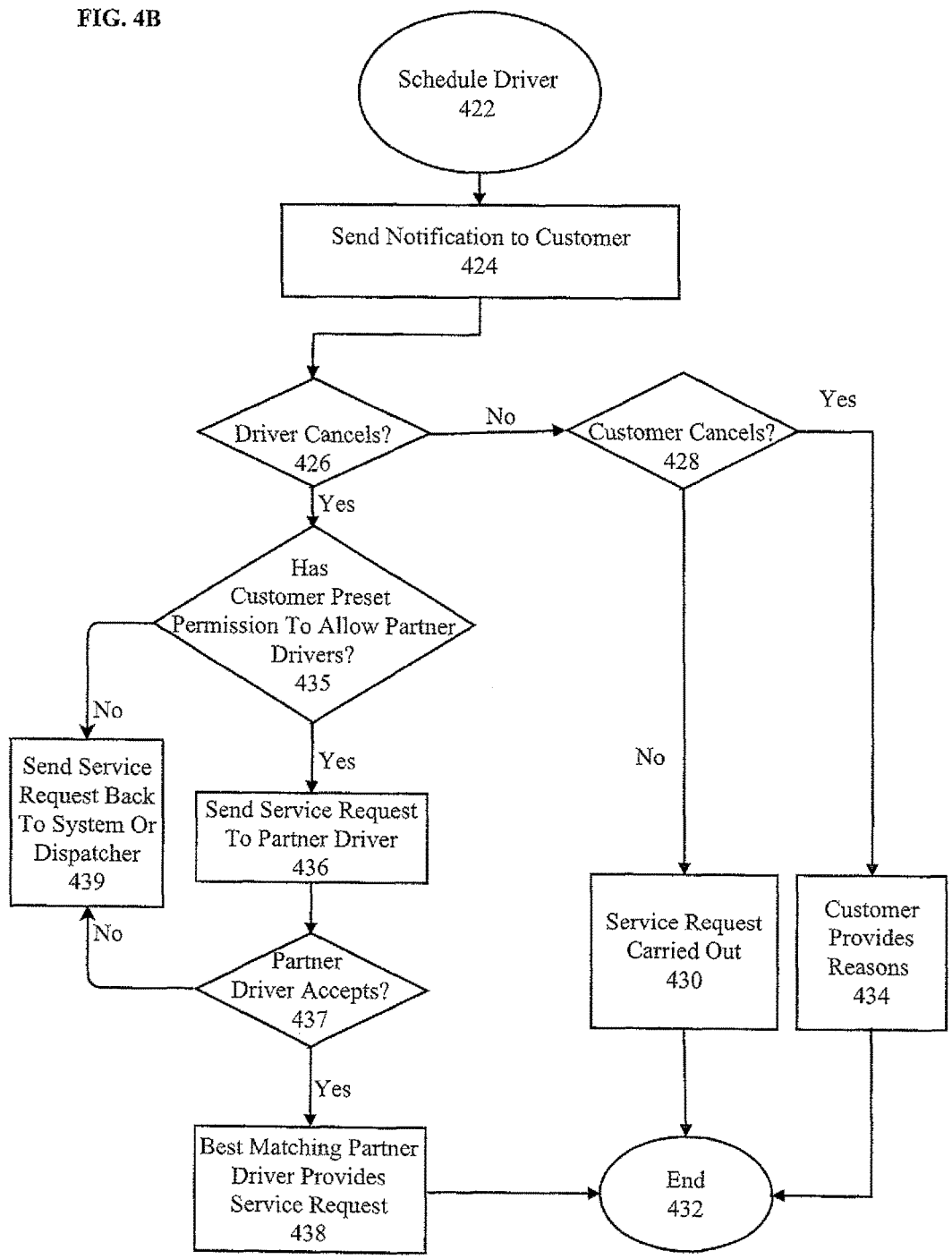
FIG. 4B is a flowchart illustrating an exemplary transport methodology and incorporating customer or driver cancellation in accordance with various embodiments of the invention.

Turning next to FIG. 4B, shown is a flowchart illustrating an exemplary series of steps for a customer or driver to cancel a prescheduled service request following the exemplary dispatch operation of FIG. 4A, and a new process for replacing the canceling driver. A driver or a customer may cancel a pre-scheduled service request at any time. If a driver (or customer) cancels a prescheduled service request far enough in advance (e.g., one day, one week, etc.), then the driver (or customer) need not report the reasoning for the cancellation. In such circumstances, dispatchers or computing system 100 simply cancels the service request if cancelled by the customer, or reschedules and re-dispatches the service request to a new driver. However, a different process may be utilized for replacing the driver who has canceled on short notice.

In particular, as shown in FIG. 4B, once service request 300 has been scheduled to a driver (Step 422), computing system 100 can send a notification to the customer (Step 424) indicating that service request 300 has been scheduled. If the driver does not cancel (Step 426) and the customer does not cancel (Step 428), then the service request is carried out (Step 430) as scheduled, and the process ends (Step 432). The driver may then begin the billing process. If, however, the customer cancels (Step 428) through, for example, one of customer devices 130C1 . . . 130Cn, then the customer may be asked to provide the reasons for cancelling (e.g., appointment canceled, driven by another person, service no longer needed, etc.) (Step 434), and the process ends (Step 432) with no billing required. The assigned driver may then be dispatched elsewhere. If the driver cancels (Step 426), then computing system 100 must dispatch a new driver. In one embodiment computer system 100 dispatches service request 300 based on one or more partner drivers identified by the cancelling driver if the customer has preset permission to allow partner drivers (Step 435). If so, then notification is sent to the partner driver for acceptance (Step 437). If the customer has not preset permission to allow partner drivers, then the service request can be sent to dispatch for processing (Step 439). The partner driver allocations can be stored in database 108 for quick access by computing system 100. In this case, service request 300 may be sent to the partner driver (Step 436) to complete service request 300. Optionally, service request 300 may be sent to more than one potential partner drivers and a list of these best matching partner drivers can be displayed for the customer choose from. If the partner driver chosen by the customer accepts the service request (Step 437), then this partner driver services the service request (Step 438).

The method utilized for selecting the partner driver who is to provide service for the service request (or the list of partner drivers who might provide service for the service request) can be similar to the methodologies for generating the compatible set of drivers and dispatch matrix discussed above with respect to FIG. 3. In other words, this may include assigning the potential partner driver a certain driver priority, assessing availability, limitations, etc., and the customer may use these considerations to make a selection at his/her discretion. Alternatively, a single partner driver may be associated with each driver such that a partner driver, if available and not on the customer blacklist, is automatically assigned to the service request at the moment the previously assigned driver cancels. Upon confirmation of the partner driver as a substitute for the canceling driver, the partner driver completes the service (Step 438) and the process ends (Step 432). The partner driver can then initiate the billing process.

If the customer cancels service request 300 far enough in advance (e.g., a threshold of one half hour), then service request 300 can be marked "Cancelled," and computing system 100 can notify the driver immediately. Once the driver is sent such cancellation notification, the system may be configured to require that the driver confirm receipt of the cancellation. Otherwise, if the driver does not confirm receipt of the cancellation, then the application running on the relevant one of driver devices 132D1 . . . 132n may be locked such that the driver cannot perform any kind of operation within the application until confirming receipt of the cancellation notification. If, however, the customer cancels the service request on short notice (e.g., less than one half hour before the pick-up time), then the customer can be assigned a means for identifying that he/she cancelled a service request at the last minute, such as an indication stating "Canceled 5 Min. Before Pick-Up." After a predetermined number of last minute and/or overall cancellations, the customer may be added to the system's blacklist such that computing system 100 will not preschedule any service requests for that customer for a certain length of time. Computing system 100 may be configured to send a notification to the customer as a warning that after another two cancellations within half an hour, he/she may be put into the system's blacklist. Computing system 100 may also provide contact information in case the customer has any questions.

If a customer's service request is cancelled last minute by a driver, then the service request is immediately re-dispatched. The first step of this process is to notify the customer about the cancellation, which may include details of the re-dispatch. In such scenarios, computing system 100 can first determine, for example, the compatibility of the service request with any driver on the customer's favorite list. If several are compatible, then the system can notify those drivers of the available service request, and whichever one of the favorite drivers accepts the service request first is assigned the service request.

Computing system 100 may be configured to give drivers the option of adding customers to their preset blacklists. Once a driver has added a customer to the driver's customer blacklist, the driver is skipped over by computing system 100 when searching for matching drivers for that same customer's service request. In order to avoid confrontation, the system can be configured such that when it receives a service request from a customer who was put on a driver's customer blacklist, computing system 100 will automatically send the request to another driver and skip any drivers who added the customer to their respective blacklists.

When a driver blacklists a customer, this precludes the same blacklisted customer from being added to the driver's favorite customer list. In other words, a blacklisted customer cannot simultaneously be on a driver's blacklist and the same driver's favorites list. Dispatchers may also be notified by computing system 100 when certain drivers are blacklisted by certain customers, and vice versa, so that they know which drivers not to dispatch for particular service requests if they want to override computing system 100 for any reason because they have a better or closer driver in mind. The "blacklist" is essentially for "difficult" customers or drivers who do not "perform well". However, it will be appreciated that a driver or a customer can be blacklisted for any reason. Blacklisted customers and drivers are automatically precluded from being matched with certain corresponding drivers or customers, or can be precluded from dispatch altogether.

Preset 'preferences' for a customer stored and dynamically updated in database 108 can include, but are not limited to, preferences related to pick-up locations, drop-off locations, make, model, and type of vehicle, years of driving experience, seating capacity, gender, language spoken, service accessibility, medical device availability, pet accommodation, and baby seat availability. Pick-up location preference allows a customer to identify his/her pick-up location. Drop-off location preference allows a customer to identify his/her drop-off location. Make, model and type of vehicle preference allows a customer to specify the make, model, and type of vehicle he/she prefers for his/her service request. 'Years of driving experience' preference allows a customer to preset the number of years' experience he/she may prefer his/her driver to have. 'Seating capacity preference' allows a customer to specify a number of passengers for his/her service request. Gender preference allows a customer to choose a driver of a certain gender. 'Language spoken' preference allows a customer to choose a driver speaking a certain language. 'Accessibility preference' allows a customer to preset a preference for drivers whose vehicle is equipped for special accessibility. 'Medical device availability' preference enables a customer to make sure that a transport vehicle has certain equipment, such as oxygen tanks or other medical devices. 'Pet accommodation' preference allows a customer to preset a preference for service requests who are able to accommodate pets. 'Baby seat availability' preference allows a customer to request a driver who can provide a baby seat.

A customer might also have a preference for how familiar a driver is with the particular route of the service request. A driver's familiarity might be "direct" or "indirect" familiarity, and both may be conveyed to the customer through a customer interface on the relevant one of customer devices 130C1 . . . 130Cn. Direct familiarity might be, for example, a calculation of how familiar a driver is with a route from the pick-up location to the drop-off location. Indirect familiarity might be a calculation of how familiar a driver is with the route between the pick-up and drop-off locations, but through piecemeal experience with the route. For example, two drivers may have one hundred percent (100%) familiarity with a given route, but through different experiences. The first driver may have provided service for the same route, from the same pick-up location to the same drop-off location. Such experience would constitute direct familiarity, and indicated by, in addition to the 100% rating for matching routes, a number or tier showing that this driver has provided service using the same route. The second driver may have serviced one part of the route for a different customer in the past, and another part of the route for another service request. Even though this second driver has traversed the length of the entire route of the service request, it was not from the same pick-up location to the same drop-off location. This second driver would thus have indirect familiarity with the route of the present service request.

The degree of familiarity with a requested route, whether direct or indirect, can be calculated by comparing the requested route with the routes of service requests previously completed by the same driver, and by tracking how common all or any parts of the requested route are to the routes previously completed by the driver. It will be appreciated that a driver's familiarity with a requested route matters particularly at times when any part of the requested route lies within an area known to have weak or no GPS signal, and/or when the service request takes place after dark, making it harder to follow navigation directions. It will also be appreciated that automated tracking of GPS data on each driver and continual storage and updating of such data in the database 108 may be used to verify the driver's level of familiarity with a given route.

The systems' customization is in part based on customers' preferences and drivers' limitations. The concept of preferences discussed herein relates to giving customers options to put certain conditions on service requests. It will be understood by those skilled in the art that the term "preference" is not intended to restrict that concept in any way. Other terms such as "condition," "filter condition(s)" or "qualification" may be used in its place. The term "limitation" is also not intended in any way to restrict the concept of enabling a driver to set limits on accepting service requests. Terms such as "restriction" or "boundary" may be used in place of "limitation". Furthermore, the terms "preference" and "limitation" may be used in contrast to one another, and this contrast is intended to convey the difference in user types between customers and drivers, not to place "preferences" and "limitations" as fundamentally opposed concepts. It will be appreciated that a customer who has preferences may also have limitations, or that a driver who has limitations may also have certain preferences.

Service limitations for a driver may include, but are not limited to, limitations related service time, return location and time, service area, accessibility, number of passengers, allergy, baby seat limitations, and any other relevant limitations. Service time limitations allow a driver to preset the time he/she is not available to provide service. Return location and time limitations allow a driver to preset certain locations where he/she wants to be at a certain time. Service area limitations allow a driver to preset one or more geographic zones where he/she is not willing to provide services, for example, based on a zip code, borough, city, state, etc. A driver may set limitations for geographic zones through an interactive map on a driver interface of the relevant one of driver devices 132D1 . . . 132Dn. A driver may click on a zip code on a map to determine a location where he/she does or does not want to provide service. Such driver limitations regarding selection of a geographic location may be required in embodiments where service requests are batched and distributed to drivers in groups as discussed below with respect to FIGS. 6-9 below.

For example, a driver in Brooklyn may see a map of the borough divided into subsections which reflect the zip codes within Brooklyn. The driver can click each to indicate the particular service areas. A clickable map interface (i.e. an interactive map interface) allows the driver to quickly and efficiently set his/her limitations on his/her own terms (e.g., enabling the driver to select the geographic region he/she wants to work in). In accordance with exemplary embodiments of the present invention, the clickable map of one driver may additionally or alternatively be integrated with a clickable map of another driver, such as a partner driver. By combining the service areas of a driver and a partner driver, computing system 100 could potentially generate and display for a dispatcher the scope of where a driver and the driver's partner drivers could provide service. In addition to personal location limitations, a driver may preset personal time limitations relating to his/her work shift. Computing system 100 may group zip codes into borough or county, town, city, or state into mapping data in database 108. Once computing system 100 identifies the zip codes or other location limitation information, it can skip a driver with relevant location limitations when generating dispatch matrix 322 and dispatch output 330 such that no service request is sent to that driver which involves areas within that driver's limitations. One of ordinary skill in the art will appreciate that the list of driver's service limitations described herein is not exclusive, and that a driver can have other limitations related to his/her service.

Limitations involving location may greatly affect where a driver eventually ends up providing services. It will be appreciated that exemplary embodiments of the invention allow for an efficient dispatch system utilizing different defined regions to schedule service requests. Computing system 100 can identify which service requests will take place where, especially the start and end locations, as they relate to the time they are scheduled, and may group them by region. In current industry practices, dispatching is executed almost randomly. In a large city such as New York, a driver may be dispatched at random times to random locations. By grouping service requests by geographic area and tracking drivers, dispatchers can preschedule service requests much more efficiently, and drivers can complete service requests in less time.

Referring now to FIG. 5, an exemplary workflow of a price negotiation between a service provider (e.g., a driver) and a customer is shown. In this exemplary embodiment of the present invention, a customer may submit his/her proposed price for a service request to the system (Step 501). The customer's proposed price may be based on a default price, and one or more processors may determine when the proposed price is higher, lower, or equal to the default price. The default price for a transport service may be different from that of a delivery service. When a customer requests a combination of services, the default price may be derived from the default price for each of the transport service and the delivery service.

For simplicity, FIG. 5 only depicts a scenario in which the customer proposes a price for transport service. The system queries the customer regarding who the customer would like to send the proposed price to, depending on whether the customer has or does not have any favorite service providers (or any favorite service providers available) (Decision 502). If there are favorite service providers available, then the customer can decide whether he/she wants to send the price proposal to one or more of those available favorite service providers (Decision 503). If the customer wants to send the price proposal to any of those favorite service providers, he/she additionally decides whether his/her proposed price will be negotiable or non-negotiable with the favorite service providers (Decision 504). If there are no favorite service providers, no favorite service providers available, or if the customer does not want to send out his/her proposed price to any of the favorite service providers, then the customer can decide whether his/her proposed price will be negotiable or non-negotiable with any preferred or regular service provider(s) (Decision 505). The process is the same regardless of whether the service provider is a favorite service provider or a regular service provider once it has been established whether the customer will be negotiating or not negotiating with one or more service providers.

When the customer sets a price he/she deems negotiable, then service providers will be advised of that (Step 506). It is then the service provider's decision whether to negotiate (Decision 507). The service provider has three options on a negotiable price proposal. If the service provider does not want to take the service request at all, he/she declines both negotiation and the request, and the request expires (Step 508). If the service provider does not want to negotiate but still wants to provide the service request, he/she accepts the original negotiable price as is (Step 513) and is then dispatched (Step 514). The third option available to the service provider is to negotiate the price. The service provider makes a counter (Step 509), which is sent to the customer. Then the customer may choose whether he/she accepts the counter (Decision 510). If the customer accepts the counter, the service provider is dispatched by the system (Step 514). If the customer does not accept the counter, then the customer counters the counter (Step 511), and the negotiation cycles back to the service provider. The service provider is then presented with a decision of whether to accept the counter price (Decision 512). If the service provider accepts the counter price, then the service provider is dispatched (Step 514). If the service provider does not accept the counter, then he/she counters the customer's counter (Step 509). The process repeats until the service provider and the customer both agree on the price, whereupon the service provider is dispatched (Step 514).

When the customer sets a price he/she deems non-negotiable, the request is routed to the customer's favorite service providers (or any other service providers if the customer does not have available service providers on his/her favorites list), who either accept or don't accept the non-negotiable price (Decision 515). If the service provider accepts the non-negotiable price, then he/she is dispatched (Step 514). If the service provider does not accept the request, then the customer is notified that the service request has not been accepted at the price he/she proposed (Step 516). The customer may then, upon notification, revise the original service request and resubmit a new price proposal (Step 501).

One of ordinary skill in the art will appreciate that FIG. 5 only depicts one of many possible scenarios for price negotiation between a service provider and a customer, and that the system could receive an initial price proposal from either a service provider or a customer. Accordingly, the initial price proposal could be countered by both a customer and a service provider. In addition, one of ordinary skill in the art will appreciate that the process depicted herein is not exclusive and does not require the particular order shown to achieve desirable results.

Figure 6:
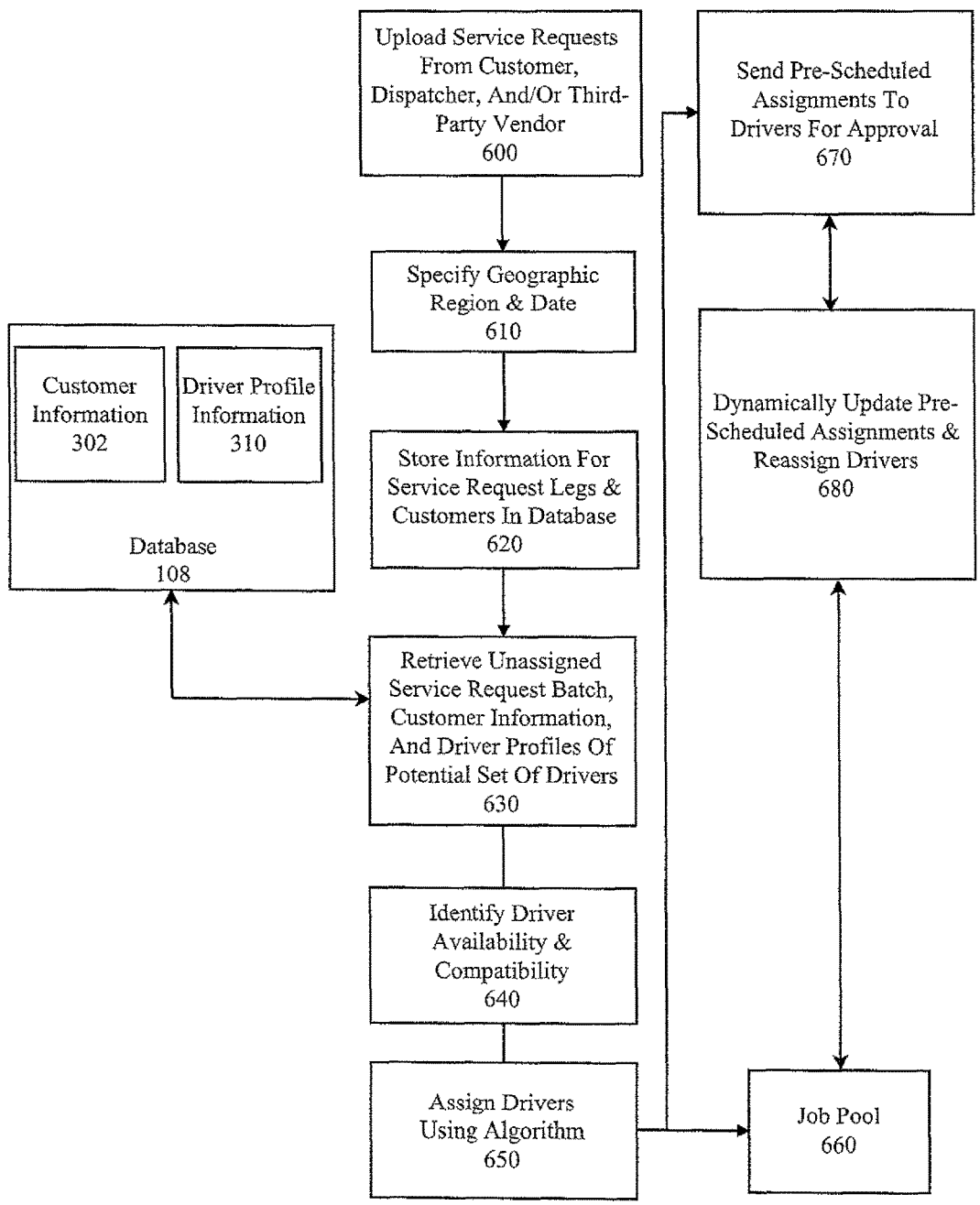
FIG. 6 is a flowchart illustrating an exemplary methodology for assigning a plurality of prescheduled service requests in accordance with various embodiments of the invention.

Turning now to FIG. 6, shown is a flowchart illustrating an exemplary methodology for prescheduling a batch (i.e., a plurality) of unassigned service requests. A plurality of service requests may be received by computing system 100 (e.g., uploaded by customers/passengers and/or by a third-party vendor such as an insurance company on behalf of its patients who will need transport services) and assigned respective identification numbers (IDs) (Step 600). Such uploads can be made by the customer using one or more of customer computing devices 130C1 . . . 130Cn, electronically by the customer or third-party vendor using vendor device 126 through a web interface, and/or manually by a dispatcher using dispatcher device 136 after receiving the service request(s) and associated schedules by phone, text message, email, or paper copy. Alternatively, the system may employ interactive voice recognition (IVR) technology and/or voice-to-text technology to automatically receive service requests via traditional telephone systems.

If appropriate, each service request 300 is broken down into legs corresponding to each portion of a trip (e.g., pick-up location(s), drop-off location(s), etc.) (Step 620). A service request may consist of being picked up at location A and dropped off at location B, and at a later time, picked up at location B and dropped off at location A. However, it will be appreciated that a service request may alternatively contain three or more legs and/or different pick-up and drop-off locations, and may spread out over the course of the day. For example, service request 300 might include a customer's home (location A), a hospital (location B), and place of work (location C), and have three legs, A to B, B to C, and C to A. The three legs would take place chronologically, but with different time periods between them. The service request, the legs thereof, and all information associated therewith, including the zip codes corresponding to the pick-up and drop-off locations of each leg, and any required pick-up and/or drop-off times, can be stored in database 108.

A dispatcher can use dispatcher device 136 to specify a particular geographic region (e.g., one of the five boroughs of New York City) and a particular date (e.g., the same day, the following day, several days from the present day, a week from the present day, etc.) on which he/she wishes to assign drivers to unassigned service requests in computing system 100 (Step 610). Alternatively, computer system 100 may be preset to automatically batch and assign service requests a predetermined number of days before the requested date of service. For example, computer system 100 may be preset to perform the batched assignment process on August 17$^{th}$ for service requests scheduled for August 18$^{th}$. The dispatcher may view, via an interface on dispatcher device 136, a list of the received unassigned service requests in computing system 100 chronologically or otherwise by their respective service request dates. The dispatcher or computer system 100 might simply begin with the earliest future date for which unassigned service requests remain in computing system 100. Computing system 100 may also be configured to automatically select the particular date (e.g., the earliest date for which any unassigned service requests remain in the system) and the first geographic region to schedule (e.g., Manhattan, Queens, etc.) on that date.

Following receipt of the particular date and the particular geographic region, computing system 100 retrieves a batch of unassigned service requests from the stored plurality of unassigned service requests uploaded (Step 630). The retrieved batch of unassigned service requests preferably has legs with pick-up and drop-off locations falling within the particular geographic region specified (or with at least one of the respective pick-up and drop-off locations falling within the particular geographic region specified), and have requested pick-up and/or drop-off times on the particular date (the designated date) (Step 620). Computing system 100 may also retrieve customer information corresponding to a plurality of customers associated with the batch of unassigned service requests, and driver profiles corresponding to a potential set of drivers to assign to the batch based on the particular geographic region and the particular date specified. The customer information may include a customer ID number or name, service preferences, a favorites list, a preferred list, and a blacklist. The driver profiles can include driver information comprising one or more service limitations, a service history, a favorites list, a blacklist, and historical data.

Computing system 100 may identify the availability and compatibility of the potential set of drivers for the unassigned service requests of the batch (Step 640), and assign drivers to a plurality of the unassigned service requests of the batch (Step 650). It will be appreciated that the system can execute steps 640 and 650 prior to receipt of a dispatch date, whereby drivers are preliminarily assigned to service requests and dynamically updated using the algorithm (step 650) prior to receiving a specific dispatch date from a dispatcher, at which point the system prints a proposed schedule for the designated dispatch date. As shown, computing system 100 cycles between identifying available and compatible drivers and assigning drivers since each assignment may likely change the availability of a particular driver with respect to the next service request being prescheduled (Steps 640, 650). The availability of the drivers can be assessed based on the driver's preset limitations, and an estimated location of the driver at the pick-up time of the unassigned service request (e.g., the driver may already be assigned to an earlier service request leg stored in database 108) whose drop-off location and drop-off time will make it feasible/unfeasible for the driver to be available to provide service for the unassigned service request.

For example, if the final leg of a prior assigned service request has a request for a drop-off at location $X_1$ at approximately time $T_1$, and the first leg has a request for pick-up at location $X_2$ at approximately time $T_2$, then if locations $X_1$ and $X_2$ are relatively close to one another (e.g., within the same zip code) and times $T_1$ and $T_2$ are relatively close in time such that a driver would have time to get from $X_1$ at time $T_1$ to $X_2$ at time $T_2$ (e.g., based on a travel time estimate using the stored traffic and map data 326), then this driver may be deemed available by computing system 100 with respect to the unassigned service request. In this manner, after accounting for customer and driver preferences/limitations, computing system 100 can efficiently assign service requests to drivers.

The compatibility of the potential set of drivers for the unassigned service requests of the batch is assessed in accordance with one or more algorithms or criteria based on, for example, presence of the drivers on blacklists, favorite lists, or preferred lists of the customers as discussed herein. In preferred embodiments, available drivers on the customer's favorite list are given the highest priority, followed by available drivers on a customer's preferred list. Available drivers on a customer's blacklist are excluded from being assigned to that customer's service request. All available drivers on a customer's favorites list, and if necessary, preferred list, can be reviewed and considered for potential assignment by computing system 100.

Computing system 100 assigns drivers according to a predetermined algorithm (Step 650). Computing system 100 can start with a first service request, check driver limitations regarding locations, times, conflicts, blacklists, trip conflicts, etc., and rule out any drivers who cannot service the unassigned service request due to unavailability, blacklists, expected geographic location at the pick-up time, expected lunch breaks or stopping times, or any other reasons. Computing system 100 can next check to determine whether any drivers not excluded (e.g., who are expected to be available and reasonably close to the pick-up location at the pick-up time and date) are on the customer's favorites or preferred lists. If so, then such driver can be accorded high priority.

Optionally, the same driver may be assigned to all legs of a service request at Step 650 using compatibility as the leading criteria to maximize client satisfaction. However, it will be appreciated that a second leg (e.g., a return leg) of a service request could potentially be serviced by a different driver than the driver assigned to the first leg. Alternatively, computing system 100 may assign the first driver to the second leg of the first service request while simultaneously keeping the first driver's status for the hours in between the two legs as 'available', and subsequently assign the first driver to another leg of another service request during that available time period should one arise for which the first driver is compatible and matched as computing system 100 works through the service requests of the batch. Computing system 100 can be configured to book one or more drivers to different legs of a service request while also adhering to customer and driver preferences and limitations.

It will be appreciated that the overall time during a shift that a driver has a passenger, minimize wait times for a driver, and automatically preschedule work for the drivers may be increased. It will also be appreciated that dispatch and workflow of drivers can be updated dynamically as situations arise due to cancellations, delays, or other problems. As service requests are received, grouped, and dispatched ahead of time, the drivers' work schedules will fill up in advance, and computing system 100 can maximize efficiency, dynamically update the scheduling as driver availability changes (e.g., as drivers call in sick, change their hours, etc.) while catering to customer and driver needs.

Computing system 100 may be configured to store any remaining service requests of the batch not assigned to a driver in accordance with the algorithms/criteria utilized at Step 650 in a job pool (Step 660) accessible by a plurality of available drivers through remote driver computing devices 132D1 . . . 132Dn to enable the drivers to select at least one of the remaining unassigned service requests. Computing system 100 can cap the number of unassigned service requests in the job pool that a single driver can select.

Figure 10:
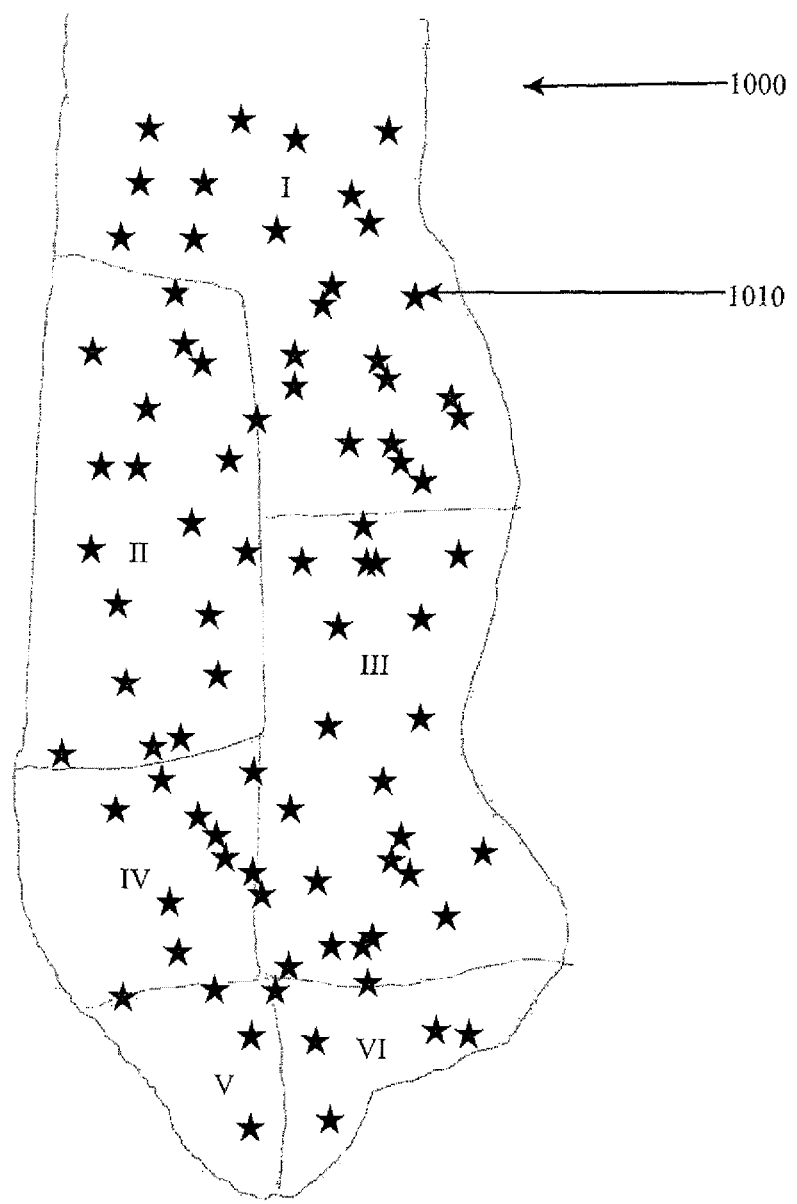
FIG. 10 illustrates an exemplary electronic map interface showing unassigned service requests in different geographic regions in accordance with various embodiments of the invention.

As illustrated in FIG. 10, the unassigned service requests of the job pool can be displayed via a clickable electronic map display 1000 accessible by the drivers via driver devices 132D1 . . . 132Dn. Electronic map display 1000 may display different geographical regions as noted by the six partitions (i.e., I, II, III, IV, V, and VI) corresponding, for example, to a plurality of local geographic regions where the unassigned service request pick-up and drop-off locations are located. The unassigned service requests can be displayed as clickable indicators 1010. While 'stars' are shown, it will be appreciated that any type of shape, icon, character or image may be used, and that more than one type of indicator may be used to reference different things or features. Drivers may select (e.g., click on), via the relevant one of driver devices 132D1 . . . 132Dn, one of the plurality of partitions I thru VI and/or to select one or more of clickable indicators 1010 to request an assignment area or the corresponding unassigned service request. A driver can also specify his/her initial limitations or other presettings for service using such a map display 1000. For example, a driver can designate, as a default setting or for one or more days, a preferred working area in computing system 100 by selecting one of the six partitions I thru VI. A driver's default preferred working area can be set at one corresponding to the driver's home address.

Referring again to FIG. 6, once a particular driver has been assigned to enough service requests and he/she has minimal availability remaining for the designated date, computing system 100 can send an overview of the driver's pre-scheduled trips for review and approval (Step 670). The driver can accept or reject each service request in the schedule. While such notification to and approval by the driver can take place, for example, days or even weeks before the designated date when service requests are to be serviced, such notification may be provided close to or even at the beginning of the scheduled date.

A customer may also add a driver to his/her favorites list, preferred list, or blacklist at any time, and a driver may similarly add a customer to the driver's blacklist or favorites list (provided if the request is to add to favorites, the customer agrees to the request). Such additions may occur, for example, following completion of a pre-scheduled service request of the batch. Users may view the profiles of previous drivers and customers, and to send requests to be on each other's favorites list. A search function can be provided to find the accounts of customers and drivers. Addition of a customer on a driver's blacklist or addition of a driver on a customer's blacklist may or may not occur with mutual notification or approval. It will be appreciated that such one-way authorization for blacklists without notification to the other party will help avoid confrontations or awkwardness between customers and drivers. A driver may add a partner driver at any time if both drivers approve.

When a driver rejects (or cancels) a prescheduled service request (Step 670), computing system 100 may be configured to engage a micro-dispatch system and/or process wherein the canceling driver dispatches the cancelled pre-scheduled service request to a partner driver. If such partner driver is available and accepts, then computing system 100 can assign the partner driver provided the partner driver is not on the customer's blacklist or vice versa. Such partner drivers may also be utilized if, for example, a driver accepts a service request but cannot make it to the pick-up location on time. The driver could send the service request leg to his partner driver provided computing system 100 allows this based on partner driver's compatibility with the customer. Each driver may have multiple partner drivers in the micro-dispatch system and process. The driver may be given the option to forward a prescheduled service request that he/she is cancelling to another, non-partner driver, and computing system 100 can assign the cancelled prescheduled request to the other driver if the other driver accepts, is available, and is deemed compatible with the customer (e.g., not on the customer's blacklist).

If a driver rejects any prescheduled assignments (Step 670), then computing system 100 can switch both the driver's status during the cancelled time period and the service request's status from "assigned" to "unassigned", identify and assign an alternative driver for the service request using the same criteria/algorithm discussed above (Step 680). The prescheduled driver assignments stored in the database 108 may be dynamically updated and drivers reassigned (Step 680). If a driver rejects a particular service request on his/her schedule, then computing system 100 may add the rejected service request to the job pool (Step 660), or may automatically reassign the service request to a partner driver, provided such partner driver is available. The job pool may be dynamically updated continually as drivers approve or reject the schedule of service requests sent to them, in whole or in part. Such updates can be stored in the database 108.

In certain embodiments, computing system 100 may be configured such that if a driver rejects any prescheduled service requests or legs thereof, then that driver may lose priority. It will be appreciated that based on customer preferences and driver limitations, computing system 100 can quickly identify compatible drivers for an unassigned service request. For example, a driver with no limitations and a customer with no preferences can be identified as compatible, and therefore, as a match. Alternatively, if any settings (e.g., driver limitations, customer preferences, etc.) conflict with one another, then the driver and customer may be deemed incompatible, and be prevented from being matched. It will also be appreciated that comprehensive disclosure of service request details, a driver's limitations, and a customer's preferences will improve the experiences of both customers and drivers.

Figure 7A:
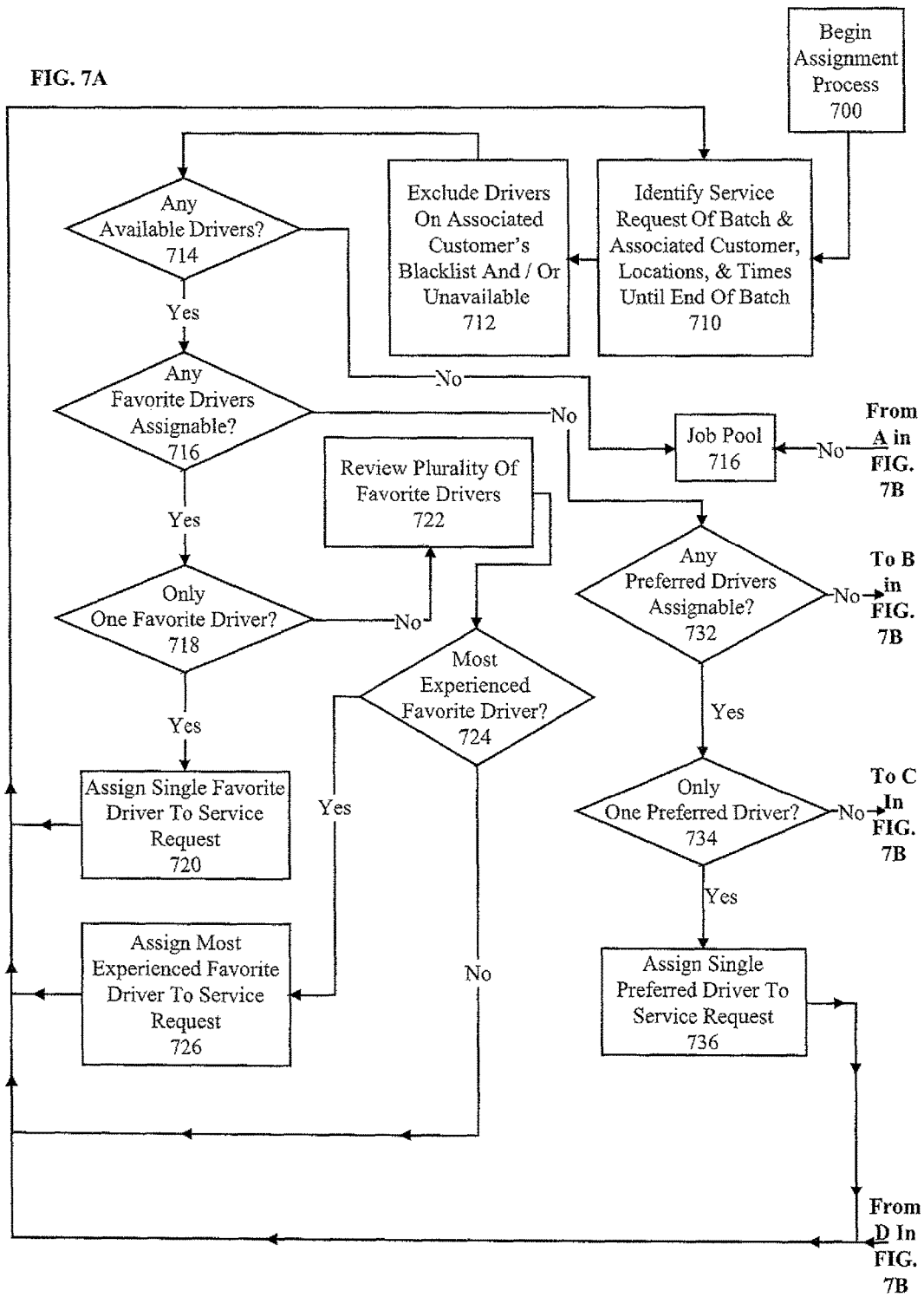
FIGS. 7A and 7B are flowcharts illustrating an exemplary methodology for assigning a plurality of prescheduled service requests based on a first algorithm in accordance with various embodiments of the invention.
Figure 7B:
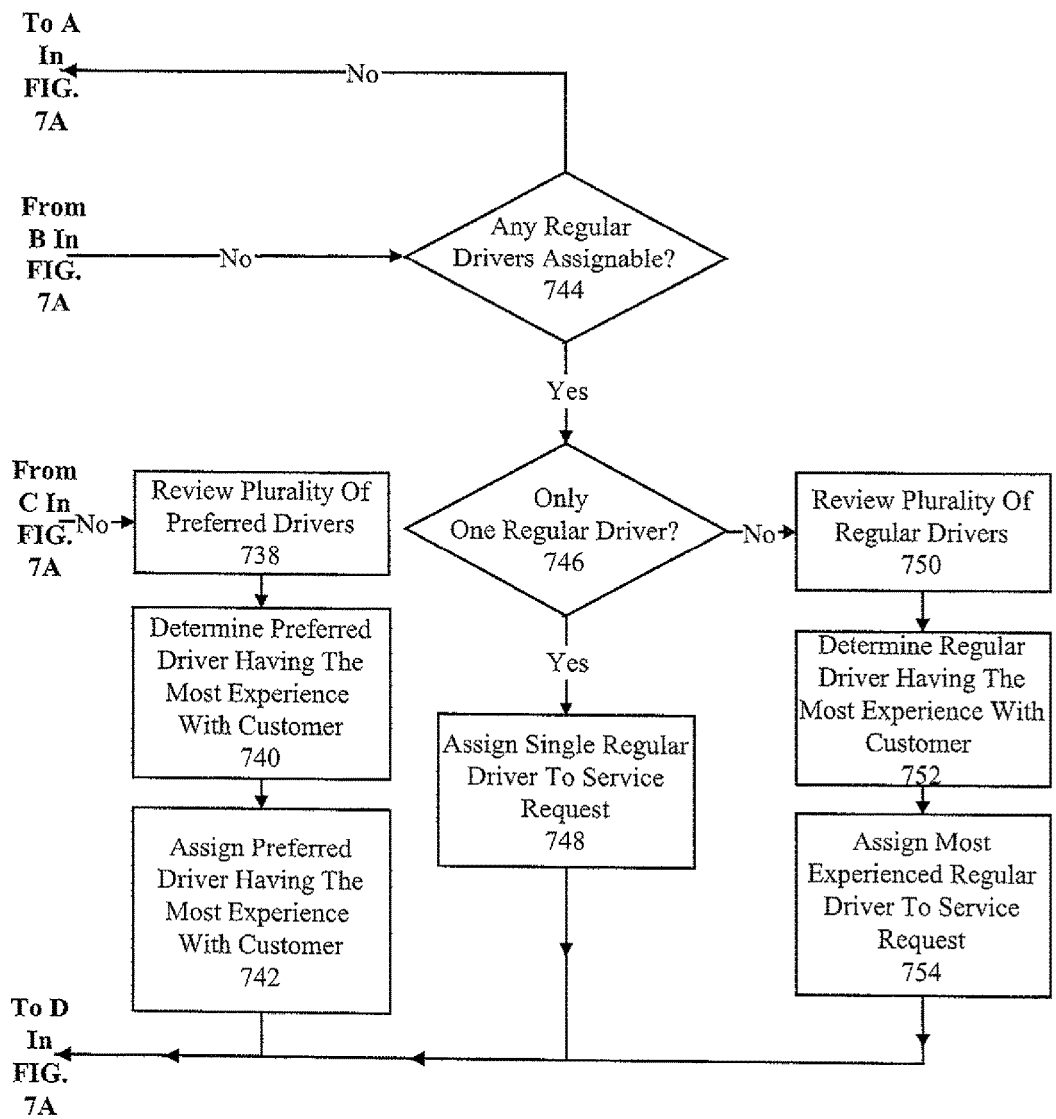

Referring now to FIGS. 7A-7B, shown is a flowchart illustrating a first exemplary algorithm for assigning a plurality (or a batch) of prescheduled service requests in accordance with an exemplary embodiment of the invention. Once a potential set of drivers and a batch of unassigned service requests for a designated date and geographic location have been retrieved by computing system 100 (e.g., at Step 630 of FIG. 6), the process of cycling through the unassigned service requests in the batch, and assigning drivers to as many of them as possible begins (Step 700). Preferably, drivers in a potential set of drivers being considered for the batched service requests must have a preset limitation for the geographical region in which he/she will accept jobs.

A first unassigned service request of the batch is identified, as well as the associated customer corresponding thereto, and any pick-up and/or drop-off locations and/or time requirements on the designated date (Step 710). The potential set of drivers (initially retrieved based on the designated date and the geographic region specified by the dispatcher or system) is reviewed and any of the potential set of drivers who are on the customer's blacklist are excluded, and any who list the customer on his/her blacklist are excluded (Step 712). Whether any of the remaining potential set of drivers are available to service the unassigned service request is then determined (Step 714). Availability can be assessed based on both the driver's preset limitations and the estimated location of where the driver will be prior to the pick-up time of the unassigned service request as discussed above. For example, a driver who will need to get from location $X_1$ to location $X_2$ in time T may be able to do so based on historical traffic and map data 326 stored in database 108, but may have a preset limitation on how far he/she is willing to travel between different legs of respective service requests. If a driver is deemed unavailable, then his/her status is set to 'unavailable' and he/she is excluded from the potential set of drivers for this particular unassigned service request. If none of the drivers in the potential set are deemed available, then the service request is sent to a job pool 716 where it can be viewed and potentially selected by other available drivers as described herein. The assignment process begins again (Step 700) and where it identifies a second unassigned service request of the batch, as well as the new customer, location, and time information associated with the second service request (Step 710).

If computing system 100 determines that drivers are available (Step 714), whether any of the available drivers are on the particular customer's favorite list is determined (Step 716). Whether only a single favorite driver or a plurality of favorite drivers are available is then determined (Step 718). If only one favorite driver is available, then the single favorite driver is assigned to the unassigned service request (Step 720). The next unassigned service request is the processed (Step 710). If a driver, while carrying out a previously assigned service request, receives a second service request assignment, the driver may be able to accept the second service request, depending on customer preferences. For example, a driver who has preset a return location might be willing to wait for the second service request since the drop-off location and the drop-off time of that service request are compatible with the driver's return location and time. Preferably, computing system 100 may be configured to avoid empty legs when possible, and the ability to assign a driver whose preset return location and preset return time coordinate with the customer's service request is beneficial for the driver as he/she can profit from a leg of the service request that might otherwise be empty.

If a plurality of favorite drivers are available, then computing system 100 can review the plurality of favorite drivers (Step 722) to determine which of them is the most experiences (e.g., with this customer in terms of the total number of service requests previously performed for this customer, etc.) (Step 724) as indicated by the historical data retrieved at Step 630. It will be appreciated that such historical and other data stored in database 108 can be retrieved at various steps of the process disclosed herein. The most experienced favorite driver is assigned to the unassigned service request (Step 726).

If a plurality of most experienced favorite drivers are determined (Step 724), then computing system 100 can determine which of these drivers will be the closest based on the shortest estimated time period to get from an estimated location on the designated date at the pick-up time to the designated pick-up location of the unassigned service request (e.g., as discussed in the example above with respect to locations $X_1$, $X_2$ and times $T_1$ and $T_2$). The closest experienced favorite driver is then assigned to the unassigned service request. Once a driver has been assigned to the request, (Step 726), the next unassigned service request is processed (Step 710).

If none of the remaining potential set of drivers are on the customer's favorites list, then whether any of the remaining potential set of drivers is/are on the customer's preferred list is determined (Step 732). If only one preferred driver is available (Step 734), then this single preferred driver is assigned to the unassigned service request (Step 736). If a plurality of preferred drivers are available (Step 738), then computing system 100 can determine a most compatible or most experienced preferred driver and select him/her based on the number of matches between the preset preferences of the customer and the various attributes or limitations of the driver and his/her vehicle (Step 740). This most compatible or most experienced preferred driver may be assigned to the unassigned service request (Step 742). Historical data may be used to determine which of these preferred drivers is the most experienced for the customer based on the total number of service requests previously performed for the customer.

Matching attributes between the customer's preset preferences and the drivers' preset preferences/limitations can include, for example, the following: car type, car size, color, make, model, year, two-door, four-door, nationality, number of years driving, type of vehicle, make and model of vehicle, vehicle seating capacity, vehicle space capacity, vehicle weight capacity, wheelchair accessibility, baby seat availability, accommodation for pets, driver's language abilities, driver's gender, driver's driving experience, driver's familiarity with the route, driver's experience handling certain types of goods, or accommodation for fragile goods or goods requiring other special packaging or delivery methods, or any other attribute or preference. The number of these attributes matched can serve as the basis for assignment of a preferred driver to the unassigned service request rather than the number of previous trips the preferred driver performed for the customer. It will also be appreciated that the criteria or algorithm used for selecting one of the plurality of available preferred drivers may use a combination of these concepts. For example, the preferred driver with the most preference matches to the customer may be given priority, then the one with the most previous trips for the customer, and then, if two or more preferred drivers are otherwise deemed equally compatible based on those criteria, the one estimated to be closest based on location and time can be assigned.

When no favorite or preferred driver is available, the unassigned service request may be assigned to a driver categorized as a regular driver (Step 744). Computing system 100 first assesses whether only a single driver is available or if multiple drivers are available (Step 746). If only one regular driver is available (Step 746), then this single regular driver is assigned to the unassigned service request (Step 748). If a plurality of preferred drivers are available (Step 746), then computing system 100 may review the available regular drivers (Step 750) and determine a most compatible or most experienced regular driver (Step 752) and select him/her based on the number of matches between the preset preferences of the customer and the various attributes or limitations of the driver and his/her vehicle. This most compatible or most experienced regular driver may be assigned to the unassigned service request (Step 754). Historical data may be used to determine which of these regular drivers is the most experienced for the customer based on the total number of service requests previously performed for the customer or within the particular area. It will be appreciated that one of the driver's preset limitations (or the customer's preferences) may preclude assignment of a driver to a particular service request at any step. If for any reason, no regular drivers are available (Step 744), then computing system 100 can put the unassigned service request in the job pool (Step 716).

If two or more of the remaining plurality of regular drivers have previously performed an equal number of service requests for the customer, then computing system 100 can determine a closest driver based on the regular driver having a shortest estimated time to get from his/her estimated location to the pick-up location of the service request. Computing system 100 may then assign the closest and most experienced regular driver to the unassigned service request (Step 754). Once a driver has been assigned to the request, (Step 748 or 754), the next unassigned service request is processed (Step 710).

In preferred embodiments, the customer optionally presets his/her favorite and preferred drivers and a specific ranking for each favorite driver and each preferred driver if the customer has multiple favorite drivers and/or multiple preferred drivers. Drivers can similarly preset specific rankings for favorite or preferred customers. For example, if a customer has four favorite drivers on his/her favorites list, then the customer can preset rankings 1st, 2nd, 3rd, and 4th corresponding to each of his/her four favorite drivers. A customer can also preset two or more drivers with the same favorite ranking or preferred ranking. It will be appreciated that a number of ranking scenarios are thus possible. In a first scenario, classifications (favorite, preferred) are preset without any rankings among the classified favorite and preferred drivers/customers. In a second scenario, classifications and rankings of drivers/customers are both preset. In a third scenario, classifications and rankings of drivers/customers are both preset, and two or more drivers/customers within a classification are given the same ranking. In a fourth scenario, a customer assigns classifications and rankings of drivers, but one or more drivers only assign classifications to customers without rankings, etc. If more than one favorite or preferred driver of the same ranking is available, then the system can randomly assign the service request to one of these drivers with the same ranking, or use additional criteria as discussed in various embodiments herein, such as number of prior service requests performed for the customer, level of familiarity with the route, etc. Thus, the system may be configured to first look at a customer's available favorite drivers when assigning a service request, and then assign by favorite driver rank (if it identifies multiple favorite drivers), without regard to which of the favorite drivers is the most experienced or closest. If there are no available favorite drivers, then the system can similarly assign by preferred driver rank. In this manner, a customer can leave little doubt as to the hierarchy of driver assignments he/she desires.

The system can also be configured to take into account a driver's classification and ranking of customers on the driver's favorite or preferred customer lists when making assignments. In other words, the driver's ranking of a customer and the customer's ranking of a driver may be used as part of the matching criteria in matching drivers to service requests of customers. However, as drivers will generally want as much business as possible, it will be appreciated that the customer's preferences will take priority in preferred embodiments. The system can utilize all preset information when assigning customer service requests to drivers. All preset data can be done through one or more web portals or computing devices (e.g., $130_{C1}$-$130_{Cn}$, $132_{D1}$-$132_{Dn}$).

Default settings may alternatively or additionally be utilized if the settings are not completed by a customer or driver.

The customer can additionally preset whether he/she wants to allow partner drivers to be assigned to his/her service request(s) if specific favorite or preferred drivers are unavailable or cancel on the designated dispatch date. Partner drivers are further discussed with respect to FIG. 9 below. If a customer does not want any partner drivers to handle his/her requests and presets this in the system, then the system can cycle through favorite and preferred drivers using ranking as priority, and/or using the algorithms discussed herein with respect to FIGS. 7A-9. If a customer does want a partner driver to handle his/her service requests in the event the assigned prescheduled driver (e.g., favorite or preferred) cancels or becomes unavailable, then the system can assign a partner driver provided the partner driver is not precluded from being assigned to the customer due to being on the customer's blacklist or failing to meet any other requirement of the customer's service request or preferences. The hierarchy by which partner drivers may be woven into assignments for prescheduled service requests (e.g., whether the system should look to the next highest ranking of favorite drivers or to the partner driver of the favorite driver of a specific ranking) may be preset by each customer. Default settings for such algorithms may be utilized if the customer does not preset certain criteria. Thus, the partner driver methodologies disclosed herein may be utilized not only in prescheduling embodiments where a prescheduled assigned driver cancels, rejects, or becomes unavailable to service a service request or where a customer changes a service request as discussed with respect to FIG. 9, but also in the initial prescheduling of a single service request or a plurality of service requests in a given batch.

When more than two or more drivers partner with one another as described herein, such grouping creates a micro-dispatching system which mitigates or eliminates traditional manual dispatch. This micro-dispatch system dynamically connects with and updates the general dispatch system 100 through computing devices (e.g., driver devices 132 and dispatcher device 136) over server 102 and network 124. When service requests are transferred between partner drivers, all customer and driver preferences and limitations still apply, whereby when service requests cannot transfer between partner drivers, the service requests can be routed to the job pool or handled in accordance with any other methodology disclosed herein.

Figure 8:
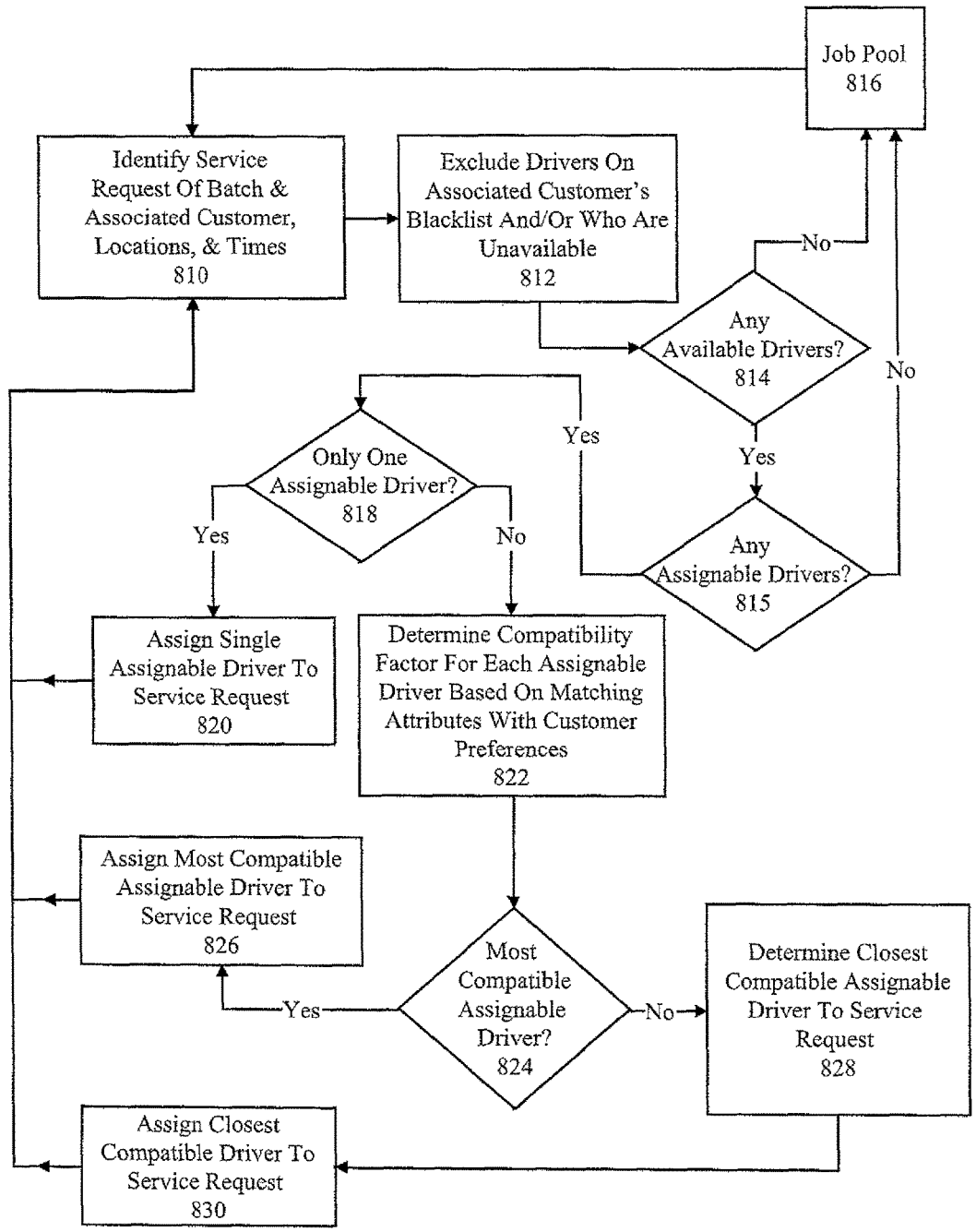
FIG. 8 is a flowchart illustrating an exemplary methodology for assigning a plurality of prescheduled service requests based on a second algorithm in accordance with various embodiments of the invention.

Referring to FIG. 8, a flowchart is shown which depicts a second algorithm for assigning a plurality of prescheduled service requests in accordance with various exemplary embodiments of the invention. As illustrated, an algorithm which prioritizes customer preference and driver limitation matching before customer favorite and preferred lists may be used. Once a potential set of drivers and a batch of unassigned service requests for a designated date and geographic location have been retrieved (see FIG. 6, Step 630), computing system 100 is ready to begin cycling through the unassigned service requests in the batch to assign drivers to as many of them as possible. It will be appreciated that favorite and preferred classifications may alternatively be given weighted rankings themselves in addition to other matching criteria utilized (e.g., rather than first looking at classification and rank, and then other matching attributes, in certain embodiments, the system can be preset to give matching classifications a weighted value in a matching criteria calculation to determine best matching drivers.

Computing system 100 identifies a first unassigned service request of the batch, including any associated customer-related information, any pick-up/drop-off locations/times, etc. (Step 810). A first potential set of drivers is reviewed based on the designated date and the geographic region specified by the drivers limitations such that certain drivers may be excluded for being on a customer's blacklist or for having the customer on his/her blacklist (Step 812). Next, whether any of the remaining potential set of drivers are available (e.g., based on time, location, etc. (see FIGS. 7A-7B)) to service the unassigned service request (Step 814). If a driver is deemed unavailable, then his/her status may be set to 'unavailable' and he/she will be excluded from the first potential set of drivers with respect to this particular service request. If none of the drivers in the first potential set are deemed available, then the service request may be sent to a job pool (Step 816) where it may be viewed and selected by other available drivers. A second unassigned service request of the batch is then identified, as well as the new customer, location, and time information associated with the second service request, and the process continues until all of the service requests of the batch are assigned, and any unassigned requests are sent to the job pool.

If it is determined that potential drivers are available, then computing system 100 may inquire as to whether such drivers are also assignable (Step 815) (e.g., whether any customer preferences or driver limitations preclude assignment of the service request to such drivers). If at least one driver is found to be assignable, computing system 100 inquires whether there is only one or a plurality of available and assignable drivers (Step 818). If only one driver is available and assignable, then such driver is assigned to the service request (Step 820). The next unassigned service request is identified for processing.

If more than one available and assignable drivers are determined, then computing system 100 can determine a compatibility factor for each such driver based on matching attributes with customer preferences (Step 822). In some embodiments, such compatibility factors may take precedence over whether or not any drivers are on the customer's favorites or preferred lists. Based on customer information and the driver profile information, system 100 may preclude one or more drivers deemed not sufficiently compatible with a customer because of one or more aspects of the service request, customer preferences, and/or driver limitations. Such aspects or compatibility factors may be prioritized by the customer in the order in which the customer wants preference to be given. A processing function may be used in which different variables/attributes relating to such preferences, limitations, and/or service request requirements are assigned different priorities and processed. Such matching criteria can be used in accordance with the embodiments discussed with respect to any of the embodiments disclosed in U.S. patent application Ser. No. 15/239,783, entitled "Method and System for On-Demand Customized Services" ("the '783 application"), which has been incorporated by reference herein in its entirety.

Computing system 100 determines whether there is a most compatible driver (e.g., a driver with a highest compatibility factor (Step 824), and assigns the service request to the most compatible assignable driver (Step 826). A new service request is then identified for processing (Step 810). If multiple compatible drivers are determined to have the highest compatibility factors but are equal or substantially equal, then computing system 100 may estimate which of such drivers will be the closest to the pick-up location of the service request based on location and time (Step 828). Computing system 100 then assigns the service request to the closest of the multiple compatible drivers remaining with the highest compatibility factors (Step 830), and the next unassigned service request to process is identified (Step 810).

Figure 9:
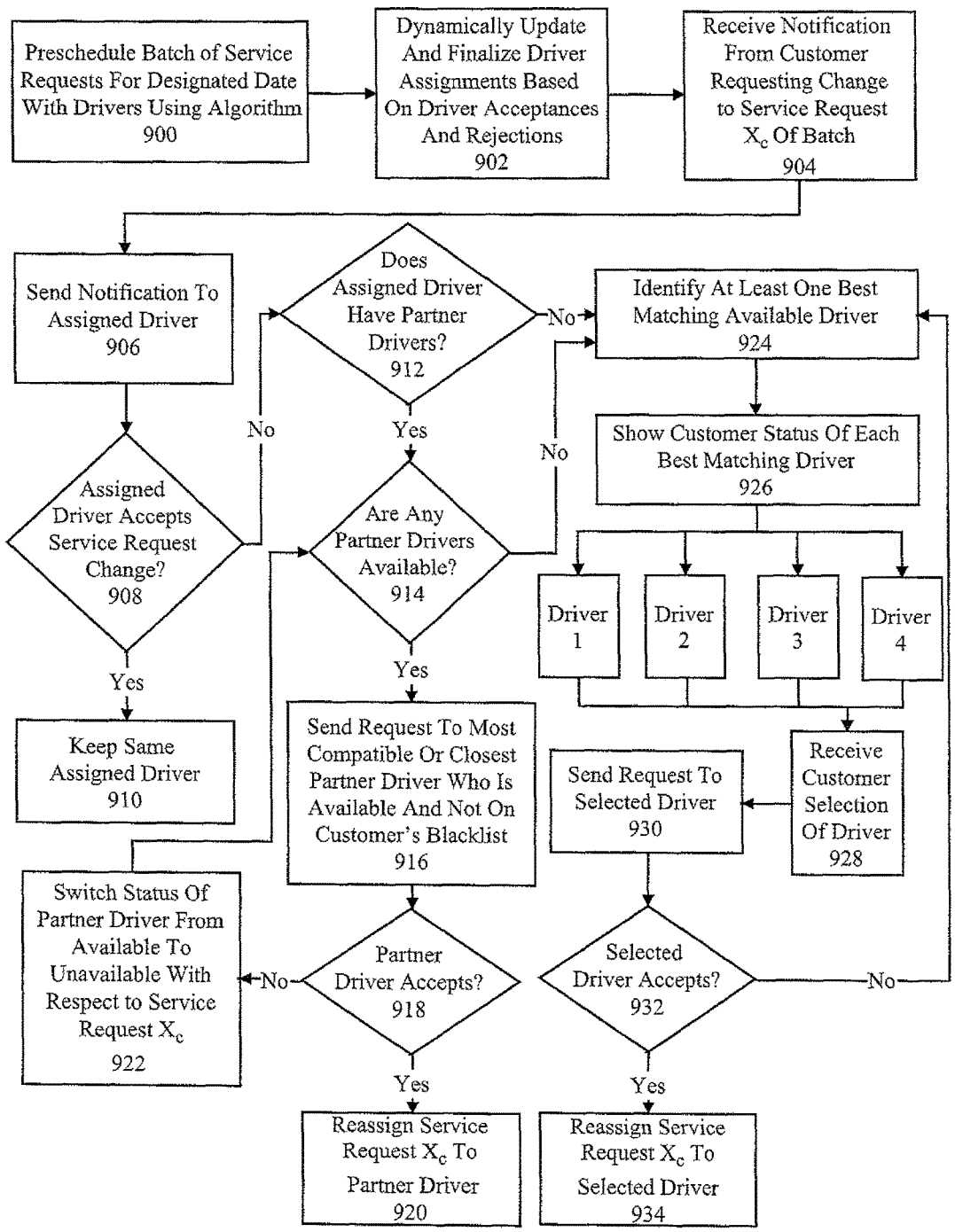
FIG. 9 is a flowchart illustrating an exemplary methodology for prescheduling and rescheduling a plurality of service requests using partner driver and on-demand methodologies in accordance with various embodiments of the invention.

Turning now to FIG. 9, shown is a flowchart illustrating an exemplary methodology for prescheduling and rescheduling a plurality of service requests of a retrieved batch using partner driver and on-demand methodologies in accordance with various embodiments of the present invention. Computing system 100 may preschedule a batch of service requests (Step 900), for example, on Aug. 15, 2017, for a particular designated date of, for example, Aug. 18, 2017, with drivers utilizing one of the algorithms or criteria discussed herein (e.g., the algorithms shown and discussed regarding FIGS. 7A, 7B and 8). In this example, between Aug. 15, 2017 and Aug. 17, 2017, computing system 100 will preferably dynamically update and finalize driver assignments for the batch as drivers accept/reject the service request assignments given to them and computing system 100 will reassign the service requests in accordance with various embodiments discussed herein (Step 902). A notification is then received on the designated dispatch date (e.g., Aug. 18, 2017) from a customer corresponding to a particular service request, $X_C$, of the batch indicating that the customer needs to change the pick-up time of the service request from 2:00 PM to 5:00 PM (Step 904). It will be appreciated that the customer may alternatively desire other changes, such as, for example, the location of the pick-up or any other attribute of the service request or customer preferences associated therewith.

Upon receipt of the requested change(s) from the customer, computing system 100 notifies the prescheduled driver for the service request, $X_C$ (Step 906). The customer may be enabled to communicate directly with the assigned driver to request the change(s). Such communication may take place, for example, directly from the relevant customer device 130C1 ... 130Cn to the driver device 132D1 ... 132Dn, the vender device 126, the administrator device 134, the dispatcher device 136, or some combination thereof. The assigned driver is prompted to indicate whether he/she accepts the change(s) to the service request (Step 908). It will be appreciated that accepting a change to the service request may cause a conflict with another of the assigned driver's service requests, and that computing system 100 may be configured to allow the assigned driver to accept the change regardless of its effect on later service requests, or may be configured to prevent the driver from accepting the change, and to reassign a new driver to the service request such as a partner driver. Alternatively, a driver may be allowed to accept the change if it is anticipated to only cause some disruption to subsequent service requests. If the assigned driver accepts the change (Step 908), then computing system 100 keeps the same assigned driver assigned to the service request (Step 910).

If the assigned driver does not accept the change (Step 908), then computing system 100 may identify whether the assigned driver has any partner drivers (Step 912). If so, computing system 100 may identify whether any of the partner drivers are or will be available to service the service request $X_C$ based on their current or estimated locations, any potential conflicts such as blacklists, etc., or any conflicts between their limitations and the customer's preferences which would preclude an assignment (Step 914). When one or more partner drivers are available, then computing system 100 sends a request to the most compatible or closest partner driver who is available (Step 916). Closeness may be established based on location and time estimates using both historical and up-to-date traffic and map data 326. Compatibility may be established based on favorites lists, preferred lists, or matching criteria customer preferences and driver limitations as discussed herein. The partner driver responds with his/her acceptance or rejection of the request (Step 918). If accepted, computing system 100 reassigns the service request $X_C$ to the partner driver (Step 920). If rejected, computing system 100 may automatically switch the status of the partner driver (Step 922) from "available" to "unavailable", and again check for any other available partner drivers (Step 914).

When no partner drivers are available (Steps 912, 914), computing system 100 may identify at least one best matching available driver (Step 924) using the customer preferences, driver limitations, and other matching criteria. As the pick-up time draws near for a prescheduled service request, if there are problems (e.g., last-minute driver cancellation or customer change, or the service request remains unassigned), computing system 100 can operate in accordance with the various on-demand embodiments illustrated and described in the '783 application.

The best matching available drivers can be identified based on matches between customer preferences and driver limitations, as well as driver availability based on location, time, and preset limitations, if any. Computing system 100 may automatically and periodically track a time-varying geographic location of, for example, the customer devices 103C1 . . . 130Cn and driver devices 132D1 . . . 132Dn, and in conjunction with traffic and map data 326 and driver location data 324, be able to identify drivers who may be available to complete the service request. The geographic location of the customer devices 103C1 . . . 130Cn, driver devices 132D1 . . . 132Dn, job pools 716/816, electronic map display 1000 may be dynamically updated in database 108, to indicate changes in a customer's and a driver's presets, settings, preferences, limitations, feedback or other information to provide quality services. During this on-demand process of identifying at least one best matching available driver, a service provider (e.g., driver) and a customer can be appropriately matched based on a matrix of customer preferences and driver limitations such that customers can be provided last minute assignments with efficiency while also continuing to cater to the customer's personal preferences. By taking into account both the customer's preferences and the driver's limitations, more customized experience can be offered that accommodates both parties when prescheduling services and when providing service on-demand.

Feedback may include positive, neutral, or negative feedback. Positive and negative feedback may be provided in the form of preset positive/negative reasons, respectively, based on evaluation of a provider's performance. The evaluation may be provided either by a customer or a best matching service provider, who can further choose to add a corresponding party to a favorites list or blacklist. Neutral feedback or no feedback may not affect a match between customers and a service provider in the assignment of future service requests. Service providers and customers can mutually be on each other's favorites lists or blacklists, but cannot be on each other's blacklist and favorites list simultaneously. A customer can add one or more entities to his/her blacklist, and all service providers affiliated with such entities may also be added to the blacklist.

Alternatively, negative feedback may be provided by preset negative reasons to rate a customer anonymously by putting the customer on a service provider's blacklist. Negative reasons may include uncleanliness, being a no-show, being too noisy, verbal or physical abuse, refusal of payment or other similar reasons. Similarly, negative feedback may be provided to rate a service provider anonymously by putting the second service provider on a customer's blacklist. Here, negative reasons may include rudeness, verbal or physical abuse, messy vehicle, poor driving skills, lack of familiarity with street conditions, inability to follow through with customer's instructions, improper handling of goods, broken or lost goods, late delivery or other similar reasons. Notifications may be provided to a customer and service provider a certain time after any negative feedback is provided to inform them that they received negative feedback and/or why. Based on the negative feedback, a customer and/or service provider may be suspended from the service.

Once identified, computing system 100 can show the customer a group of best matching drivers (e.g., Driver 1, Driver 2, Driver 3, Driver 4, etc.) with details about each driver, expressed through indicators (Step 926). Such details may include distance or time from the customer, route information, route familiarity, etc. Sets of indicators may also be utilized to facilitate a customer in selecting a driver from a proposed group of best matching drivers for his/her service request in a convenient and efficient way. A customer selection is received identifying one of the best matching drivers (Step 928), who is then notified (Step 930). The selected best matching driver is queried as to whether he/she would like to accept the service request (Step 932). If the selected driver does not accept the service request, then computing system 100 identifies another best matching available driver (Step 924) using the customer preferences, driver limitations, and other matching criteria. If the selected driver accepts the service request, computing system 100 reassigns the service request $X_C$ to the selected driver (Step 934).

It will be appreciated that in certain preferred embodiments, the concepts introduced herein may be utilized in various combinations as desired in order to customize prescheduling services for customers and drivers for a single prescheduled service request of a single customer, for multiple service requests of a single customer, or for a plurality of service requests for a plurality of customers assigned to one or more drivers, in advance of or on a designated dispatch date, and that various matching algorithms may be utilized. It will also be appreciated that the prescheduling methods disclosed herein may be utilized in conjunction with on-demand methods, and that the system may switch between prescheduling and on-demand, or vice versa, depending on the situation. For example, a customer may input a single service request into the system for prescheduling and receive a list of best matching drivers with a set of indicators corresponding to each best matching driver based on specific information about each driver the customer is interested in viewing (e.g., indicators representative of matching attributes of the driver, level of familiarity or experience with a particular route, etc.), and select one or more of such best matching drivers to perform the service request. Alternatively, the customer may be notified of a last minute cancellation by a prescheduled driver, and given the option to select from a list of best matching drivers. Similarly, the system may switch from an on-demand method to a prescheduling method if, for example, a customer who selected a driver for on-demand service suddenly learns that his/her doctor is running late, and that he/she now needs to cancel the on-demand service request and instead be picked up in several hours or on another day.

It will be appreciated that the more information customers and drivers preset into the system, the better the system can customize assignments, relieve or eliminate manual dispatch (e.g., provide automated customizable dispatching), and provide all users of the system increased information and options. The customer may optionally preset one or more aspects of the matching criteria utilized to assign a driver to his/her service request(s), or may simply not set any criteria at all other than the terms of the service request itself (e.g., pick-up time, drop-off time, day, and location).

It will also be appreciated that partner drivers may or may not have preferred geographic regions in the same regions as the drivers from whom they are referred or sent requests, as the partner driver system is meant to minimize dispatching. For example, if a driver cancels a service request, then he/she may press a button and see the current status of his/her partner drivers and their respective locations, send a recommendation or notification to one of these partner drivers. The partner driver can then accept the request if the system allows it (e.g., if the system determines that the partner driver and customer of the service request are not on one or the other's blacklist or precluded because of some other preset criteria or reason). Such functionality can enable drivers to preserve their business and keep their customers happy if they have to cancel at the last minute.

While "available" and "unavailable" have been discussed herein with respect to whether a driver is working on a particular date and whether that driver will be able to reach a particular designated pick-up location at a particular designated pick-up time based on (1) the expected location of that driver on that day and at that time, and (2) the anticipated time for the driver to reach the pick-up location given traffic and map data, it will be appreciated that the system may be configured to be flexible in determining whether a driver is "available", as a driver may be able to make adjustments to service a service request, and may be able to work with a customer to arrange for a slightly different pick-up time or location. Such flexibility may be preset in the system by the customer (e.g., a favorite driver who can reach the customer a half hour later than the requested pick-up time may be acceptable).

In embodiments in which the system preschedules a plurality of service requests on a designated date, each driver's preferences as to the geographic region(s) to receive work and the time period(s) to receive work are preferably preset, along with any limitations the driver has with respect to geographic locations within the preferred geographic region(s), or limitations with respect to time periods within the driver's preferred time period(s). For example, if a driver presets specific geographic region(s) in the system (e.g., by clicking on and/or highlighting a specific geographic region of a map in a map interface), then he/she may receive a plurality of prescheduled service requests by the system, each having a pick-up time and drop-off location within that geographic region. If there are specific zip codes or locations within that geographic region the driver does not wish to service, he/she can specify such limitations within the system, by manual entry or by clicking on a map display interface. If there are specific time periods during which a driver prefers to receive work within his/her preset geographic region, then the driver can similarly preset such specific time period preferences in the system. If there are specific time periods during which the driver does not wish to receive work during that preferred time period (e.g., during his/her lunch break or during a personal appointment during the day), then the driver can also preset such time period limitations in the system. In this manner, the system can preschedule a plurality of service requests accurately and efficiently. It will be appreciated that for single pre-scheduled service requests, customer and driver preference with regard to time and location are not required as there is more flexibility in scheduling—drivers may be individually notified and/or selected by the customer. Thus, a driver's preferences for geographic region and time are optionally preset, but in certain embodiments, are required for being considered for being assigned a plurality of requests on a designated date. When the system contains preset data regarding which geographic regions each driver prefers, it can more efficiently assign a plurality of service requests since most service requests will fall within specific geographic regions designated by drivers (e.g., within Manhattan, Queens, Brooklyn, between $30^{th}$ street and $90^{th}$ street, etc) as opposed to between designated geographic regions.

In certain embodiments, the system may recommend or notify various drivers of service requests sent to or already within the job pool 660, 716 when the system deems such drivers a good match based on preset data and algorithms the system is configured to execute. For example, the system may recommend a service request in the job pool to a driver who suddenly becomes available and/or enters a particular geographic region and/or meets the customer's matching criteria. The system can give the driver a predetermined time period to accept. If the driver does not accept, then the system may notify another driver of the available service request, etc. In other embodiments, the system may notify available drivers of service requests about to be placed in the job pool (either because an assigned driver has cancelled or because the system was not able to preschedule the service request based on preset driver preferences), and give such drivers the ability to select the service request before it is placed in the job pool and/or modify their preset preferences and limitations. Drivers may be inclined to take such recommended service request as once it is placed in the job pool, a driver previously given exclusive rights to it may lose out if another driver selects it. In certain embodiments, the system may be configured to execute a more inclusive or less restrictive algorithm (e.g., eliminating one or more criteria or reducing the weighting thereof) for service requests in the job pool in order to identify potential drivers not previously identified using the more restrictive algorithm. The more inclusive algorithm may be less restrictive on, for example, any presettings related to availability. For example, drivers familiar with a geographic region may be able to handle a service request in less time than the system calculates and/or be able to communicate with the customer and agree on a different pick-up time. Such communications can help resolve dispatching issues and allow more service requests to be removed from the job pool.

It will be appreciated that new customers to the system, or existing customers who now want service in a new geographic region, may not have favorite or preferred drivers in the new region(s). Thus, in certain embodiments, the system may recommend drivers to the customer and vice versa based on, for example, the driver's level of familiarity with a given route and/or the number of service requests the driver typically does in the geographic area. All data can be retrieved and analyzed from the database 108, and dynamically updated through the system as customers and drivers change their presettings, as well as during and following completion of service requests.

In preferred embodiments, the database 108 may be dynamically updated with new driver location data 324, traffic and map data 326, data from job pool 660, 716, data from map display 1000, and any user interfaces on the customer devices $130_{C1}$-$130_{Cn}$ and driver devices $132_{D1}$-

$132_{Dn}$ may be dynamically updated in real time when service requests are started, completed, modified, selected, cancelled, assigned, etc.

In certain embodiments, the best matching driver steps discussed herein may additionally or alternatively be utilized for prescheduling a single service request for a customer in combination with, for example, the price negotiation steps discussed with respect to FIG. 5. A customer can review a list of best matching drivers with respective indicators reflecting a summary of information associated with the particular driver, and select one or more for a price negotiation.

It will be appreciated that the sets of indicators disclosed herein can help the customer evaluate supply and demand factors, which may be critical in setting prices for the negotiation as the customer may propose lower prices at times of lower demand or higher prices at times of higher demand. The number of available service providers who can provide the service and the number of customers currently requesting service in a particular region may be dynamically updated in the database 108. Any service provider who provides the same type of service as the type of service in the customer's service request can be included in a pool of potential available service providers as long as the service provider is within the geographic zone and available. The sets of indicators displayed to the customer may be turned on or off by the customer via the customer device 130. If the customer has turned a set of indicators off, then he/she will not see it on his/her display. However, the customer's service requests may still be counted in a census by the system of all available requests within a proper subcategory.

Various sets of indicators may be displayed to service providers (e.g., drivers) via driver device 132, and may be useful to drivers for setting a price for the service request based on, for example, various types of customer information. In certain embodiments, the service provider may want access to and be provided with the same search results or supply and demand information displayed to the customer. In certain embodiments, the system may allow the customer and the service provider to exchange with one another, in full or in part, information displayed to them, which allows for a more transparent negotiation process. It will be appreciated that drivers may be provided with indicators representative of customer attributes not only for price negotiation, but also for various other embodiments discussed herein. For example, when a driver is evaluating whether to select a job from the job pool, or whether to accept a new or available service request he/she is notified about by the system, the system may be configured to enable the driver to access customer information associated with the service request, and review indicators associated with the desired customer information. In this manner, the driver can make an informed decision as to whether to accept the prescheduled service request.

According to an exemplary embodiment of the present invention, the system may utilize a set of indicators to help streamline pricing information regarding one or more service providers' response to a price proposal from a customer, whereby the customer may negotiate price simultaneously with several best matching drivers. In certain embodiments, when a customer sends a service request without a quoted price, and the service provider responds with a proposed price, which may be either negotiable or non-negotiable, the system may display pricing numbers initiated by the driver (s) for the customer with a set of indicators. If the proposed prices is/are negotiable, then the negotiation may go back and forth until a final deal or no deal can be made.

In accordance with certain embodiments, various sets of indicators may be utilized for different situations depending on which party initiates a price proposal. The indicators themselves may convey whether a price proposal is above, below, or equal to a default price provided by the system. For example, the system may display a green indicator or an upward arrow for an initiated price above the default price or a red indicator or a downward arrow for a price that lies below it. Prices that exactly match the default price can be displayed as yellow or as a dot. Those three different colors convey the difference in each of these three situations, and illustrate a clear difference that allows users to sort more quickly, based on an easy-to-see visual representation which would otherwise take longer. Included in the representation is, for example, the actual price proposed, along with information that compares the difference between the price proposal and the default price as a dollar amount or as a percentage. This set of indicators may be turned off, or may selectively have one or any parts displayed depending on the user's discretion. During such a prescheduled service request, the system may be configured to time out the negotiation if no final price is agreed upon, or may give the customer the option of continuing the negotiation up until the date and time of the service request. Users may also set limits on which price proposals are automatically rejected, by presetting a price threshold higher or lower than the default price. Preferably, these sets of indicators are displayed to both a customer and a service provider. Various sets of indicators may be displayed to any user type in the system. A customer who requests price proposals from a service provider may preset in the settings not to see any price proposal that is higher than or equal to 50 percent above the default price. Otherwise, the price proposals may be automatically rejected. A customer has discretion in choosing which price indicators to see depending on price difference.

An indicator may also be displayed for a customer reflecting information regarding zone information based on the total number of service requests completed by a service provider within the geographic zone in which a customer indicates the pick-up location of the service request. Such indicator may be representative of historical data retrieved from database 108. It will be appreciated that this indicator can provide a customer with a visual representation which quickly conveys the service provider's experience or familiarity in the pick-up location. Such information may help inform a customer about which service provider may be better suited for their service request because of more experience in the area.

A set of indicators can display the number of potential available service providers compared to the number of potential available customers within each geographic zone, the pool of potential available service providers and the pool of potential available customers, and the geographic zones based on search parameters including number, time and distance or any combination thereof. This set of indicators can provide information about supply and demand within each geographic zone based on the search parameters, which may be factored into setting prices. In certain embodiments, service providers may also limit their displays to show only requests from favorite customers, preferred customers, or from favorite, preferred, regular, and new customers.

It will be appreciated that various embodiments of systems and methods disclosed herein substantially reduce or eliminate manual dispatching by providing automated dispatching through computing devices, allow for greater communication between customers, drivers, and dispatchers through dynamically deploying relevant information through the one or more remote computing devices, and enable full service dispatching, including prescheduling service requests, dispatching service requests, dynamically updating and facilitating changes to service requests, and providing real time information to all parties during transport of customers.

It will be understood that the phrases or terminology employed herein is for purposes of description and not of limitation. While the present invention has been shown and described with reference to various preferred embodiments, those skilled in the art will readily appreciate that various changes and/or modifications may be made without departing from the spirit and scope of the invention as defined by the claims. Any exemplary embodiments described herein are merely illustrative, and many variations can be introduced without departing from the spirit of the disclosure or from the scope of the appended claims. For example, elements and/or features of different exemplary embodiments may be combined with each other and/or substituted for each other. The scope of the invention, therefore, shall be defined solely by the following claims, and it will be apparent to those of skill in the art that numerous changes may be made in such details without departing from the spirit and the principles of the invention.

What is claimed is:

1. A computer-implemented method for providing customizable automated prescheduled transportation dispatching, the method comprising:
   receiving, by a server, zone data associated with a plurality of preset driver service zones, wherein each preset driver service zone is defined by one or more geographic regions;
   receiving, by the server, a plurality of preset driver preferences or limitations of a plurality of drivers;
   receiving, by the server, a plurality of optionally preset customer preferences of a plurality of customers;
   storing, in a database, the plurality of preset driver service zones, the plurality of preset driver preferences or limitations, and the plurality of optionally preset customer preferences;
   receiving, by the server, a plurality of service requests for prescheduling, wherein each service request corresponds to one of the plurality of customers and contains time-location data associated with at least a pick-up location and a drop-off location;
   parsing, by the server, the plurality of service requests into one or more batches, wherein each batch corresponds to a respective preset driver service zone and includes one or more of the plurality of service requests having pick-up and drop-off locations both within the respective preset driver service zone;
   prescheduling the plurality of service requests by, for each of the one or more batches:
      (i) retrieving, from the database, a set of the plurality of drivers associated with the respective preset driver service zone corresponding to the batch;
      (ii) automatically establishing, by the server, in accordance with the one or more predetermined rules, for each respective service request of the batch, a weighted priority for each driver of the set, wherein the weighted priority is based on assigned weights for at least one service relevant factor associated with the respective service request, and wherein the at least one service relevant factor includes at least one of the plurality of preset driver preferences or limitations or at least one of the optionally preset customer preferences of the customer corresponding to the service request; and
      (iii) applying, by the server, the one or more predetermined rules to assign a driver from the set to the respective service request based on the weighted priority of the driver;
   transmitting, by the server to a computing device of a particular driver, a dispatch notification which includes one or more assigned service requests; and
   receiving, by the server from the computing device of the particular driver, an acceptance of at least one of the assigned service requests.

2. The method according to claim 1, wherein each of the one or more predetermined rules comprises a rule criteria and a rule function.

3. The method according to claim 2, wherein the one or more predetermined rules comprise default rules and preferential rules, wherein the preferential rules are preset by at least one of a customer or a driver and have priority over the default rules, and wherein the default rules or the preferential rules dictate the assigned weights for each of the at least one service relevant factor.

4. The method according to claim 1, wherein the plurality of preset driver service zones are received by the server from a plurality of driver computing devices, and the plurality of driver computing devices are configured to allow the plurality of drivers to select the preset driver service zone to which the driver is assigned.

5. The method according to claim 1, further comprising:
   receiving an input from one or more computing devices of the plurality of drivers, the input comprising the plurality of preset driver service zones or the plurality of preset driver preferences or limitations, wherein the plurality of preset driver preferences or limitations comprise at least one or more personal limitations or one or more regulatory limitations; and
   storing the input by dynamically updating the database with respect to the plurality of preset driver preferences or limitations.

6. The method according to claim 1,
   wherein at least one preset driver service zone is defined by a geographic service region selectable, via at least one of a plurality of driver computing devices, from at least one of: one or more streets, one or more neighborhoods, one or more zip codes, one or more towns or villages, one or more cities, one or more boroughs, one or more counties, or one or more states.

7. The method according to claim 6, further comprising:
   displaying, on at least one of the plurality of driver computing devices, an electronic map display divided into a plurality of clickable geographic regions corresponding to the plurality of preset driver service zones, wherein each clickable geographic region is selectable by a driver to input a preset driver service zone.

8. The method according to claim 1, further comprising:
   displaying, on one or more customer computing devices, an interactive electronic interface; and
   prompting one or more customers to provide one or more of the optionally preset customer preferences as required customer preferences, wherein the optionally preset customer preferences comprise preferences related to at least one of: a type of driver, a type of vehicle, make and model of vehicle, vehicle seating capacity, vehicle space capacity, vehicle weight capacity, wheelchair accessibility, baby seat availability, accommodation for pets, language ability, gender, driving experience, familiarity with the route, experience handling certain types of goods, accommodation for fragile goods or goods requiring special packaging, delivery method, or one or more other attributes of the type of driver or the type of vehicle.

9. The method according to claim 1, further comprising:
generating, by the server, a data table for a particular batch, the data table including, for each service request of the particular batch, in accordance with the one or more predetermined rules, a ranked compatibility of each of the set of the plurality of drivers based on the weighted priority of each driver of the set and another factor comprising at least one of: availability of each driver of the set to accept the service request, a driver type, one or more sets of indicators defining the service relevant factors, or a customer type.

10. The method according to claim 9, wherein the driver type comprises a favorite driver, a preferred driver, or a regular driver, and wherein the customer type comprises a favorite customer, a preferred customer, or a regular customer.

11. The method according to claim 10, further comprising:
determining, based on the weighted priority of each driver in the set for a particular service request, a top priority favorite driver or a top priority preferred driver and a subsequent favorite driver or a subsequent preferred driver; and
assigning the service request to the subsequent favorite driver or the subsequent preferred driver in response to the top favorite driver or the top preferred driver being unavailable, wherein a favorite driver is assigned a higher weight than a preferred driver and a preferred driver is assigned a higher weight than a regular driver.

12. The method according to claim 1, further comprising:
retrieving, from the database, a set of historical global positioning system (GPS) location data associated with at least a portion of historical service data for one or more of the plurality of drivers, wherein the GPS location data is received from a GPS receiver associated with one or more driver computing devices of the plurality of drivers; and
calculating a level of familiarity with a route of at least one of the respective service requests for at least one driver of the plurality of drivers by (i) comparing a set of GPS location data for the route of the respective service request with the set of historical GPS location data, and (ii) determining a matching relationship between the set of GPS location data for the route of the respective service request and the set of historical GPS location data, wherein the level of familiarity is calculated by determining an amount of overlap between a route of the respective service request and route data associated with at least one of the set of the plurality of drivers; and
displaying, on at least one customer computing device, the amount as at least one of: a tier, a range of tiers, a grade, a range of grades, a score, a range of scores, a percentage, a range of percentages, or a depiction or illustration, wherein at least one of the service relevant factors comprise the level of familiarity.

13. The method according to claim 1, further comprising:
in response to one or more service requests remaining unassigned or not accepted by at least one driver, storing the one or more unassigned or not accepted service requests in a job pool, the job pool accessible by at least one or more available drivers via one or more driver computing devices;
displaying the one or more unassigned service requests with one or more customer indicators on the one or more driver computing devices, wherein the one or more customer indicators correspond to a customer associated with the one or more unassigned or not accepted service requests;
receiving a selection of the one or more unassigned service requests in the job pool by an available driver; and
updating the job pool in response to the selection.

14. The method according to claim 13, wherein the one or more customer indicators identify the service relevant factors associated with the unassigned or not accepted service requests.

15. The method according to claim 1, further comprising:
receiving, from the driver assigned to at least one service request, an indication of inability by the driver to complete the at least one service request, and receiving from the driver a request to transfer the at least one service request to a partner driver;
transmitting, to the partner driver, a request to transfer the at least one service request;
receiving acceptance of the request to transfer the at least one service request from the partner driver; and
updating the database to indicate transfer of the at least one service request to the partner driver.

16. A computer-implemented system for providing customizable automated prescheduled transportation dispatching, the system comprising:
a server communicatively coupled to one or more computing devices via a network, wherein the one or more computing devices include one or more location identifiers configured to generate location data corresponding to one or more locations, and wherein the server includes at least one non-transitory computer-readable storage medium with computer-readable instructions stored therein, a database, and a processor for executing the computer-readable instructions to:
receive, by the server, zone data associated with a plurality of preset driver service zones, wherein each preset driver service zone is defined by one or more geographic regions;
receive, by the server, a plurality of preset driver preferences or limitations of a plurality of drivers;
receive, by the server, a plurality of optionally preset customer preferences of a plurality of customers;
store, in the database, the plurality of preset driver service zones, the plurality of preset driver preferences or limitations, and the plurality of optionally preset customer preferences;
receive, by the server, a plurality of service requests for prescheduling, wherein each service request corresponds to one of the plurality of customers and contains time-location data associated with at least a pick-up location and a drop-off location;
parse, by the server, the plurality of service requests into one or more batches, wherein each batch corresponds to a respective preset driver service zone and includes one or more of the plurality of service requests having pick-up and drop-off locations both within the respective preset driver service zone;
preschedule the plurality of service requests by, for each of the one or more batches:
(i) retrieve, from the database, a set of the plurality of drivers associated with the respective preset driver service zone corresponding to the batch;

(ii) automatically establish, by the server, in accordance with the one or more predetermined rules, for each respective service request of the batch, a weighted priority for each driver of the set, wherein the weighted priority is based on assigned weights for at least one service relevant factor associated with the respective service request, and wherein the at least one service relevant factor includes at least one of the plurality of preset driver preferences or limitations or at least one of the optionally preset customer preferences of the customer corresponding to the service request; and (iii) apply, by the server, the one or more predetermined rules to assign a driver from the set to the respective service request based on the weighted priority of the driver; and transmit, by the server to a computing device of a particular driver, a dispatch notification which includes one or more assigned service requests; and receive, by the server from the computing device of the particular driver, an acceptance of at least one of the assigned service requests.

17. The system according to claim 16, wherein each of the one or more predetermined rules comprises a rule criteria and a rule function.

18. The system according to claim 17, wherein the one or more predetermined rules comprise default rules and preferential rules, wherein the preferential rules are preset by at least one of a customer or a driver and have priority over the default rules, and wherein the default rules or the preferential rules dictate the assigned weights for each of the at least one service relevant factor.

19. The system according to claim 16, wherein the processor further executes the computer-readable instructions to:

receive, by the server, the plurality of preset driver service zones from a plurality of driver computing devices, wherein the plurality of driver computing devices are configured to allow the plurality of drivers to select the preset driver service zone to which the driver is assigned.

20. The system according to claim 16, wherein the processor further executes the computer-readable instructions to:

receive an input from one or more computing devices of the plurality of drivers, the input comprising the plurality of preset driver service zones, or the plurality of preset driver preferences or limitations, wherein the plurality of preset driver preferences or limitations comprise at least one or more personal limitations or one or more regulatory limitations; and store the input by dynamically updating the database with respect to the plurality of preset driver preferences or limitations.

21. The system according to claim 16, wherein at least one preset driver service zone is defined by a geographic service region selectable, via at least one of a plurality of driver computing devices, from at least one of: one or more streets, one or more neighborhoods, one or more zip codes, one or more towns or villages, one or more cities, one or more boroughs, one or more counties, or one or more states.

22. The system according to claim 21, wherein the processor further executes the computer-readable instructions to:

display, on at least one of the plurality of driver computing devices, an electronic map display divided into a plurality of clickable geographic regions corresponding to the plurality of preset driver service zones, wherein each clickable geographic region is selectable by a driver to input a preset driver service zone.

23. The system according to claim 16, wherein the processor further executes the computer-readable instructions to:

display, on one or more customer computing devices, an interactive electronic interface; and prompt one or more customers to provide one or more of the optionally preset customer preferences as required customer preferences, wherein the optionally preset customer preferences comprise preferences related to at least one of: a type of driver, a type of vehicle, make and model of vehicle, vehicle seating capacity, vehicle space capacity, vehicle weight capacity, wheelchair accessibility, baby seat availability, accommodation for pets, language ability, gender, driving experience, familiarity with the route, experience handling certain types of goods, accommodation for fragile goods or goods requiring special packaging, delivery method, or one or more other attributes of the type of driver or the type of vehicle.

24. The system according to claim 16, wherein the processor further executes the computer-readable instructions to:

generate, by the server, a data table for a particular batch, the data table including, for each service request of the particular batch, in accordance with the one or more predetermined rules, a ranked compatibility of each of the set of the plurality of drivers, based on the weighted priority of each driver of the set and another factor comprising at least one of: availability of each driver of the set to accept the service request a driver type, one or more sets of indicators defining the service relevant factors, or a customer type.

25. The system according to claim 24, wherein the driver type comprises a favorite driver, a preferred driver, or a regular driver, and wherein the customer type comprises a favorite customer, a preferred customer, or a regular customer.

26. The system according to claim 25, wherein the processor further executes the computer-readable instructions to:

determine, based on the weighted priority of each driver in the set for a particular service request, a top priority favorite driver or a top priority preferred driver and a subsequent favorite driver or a subsequent preferred driver; and assign the service request to the subsequent favorite driver or the subsequent preferred driver in response to the top favorite driver or the top preferred driver being unavailable, wherein a favorite driver is assigned a higher weight than a preferred driver and a preferred driver is assigned a higher weight than a regular driver.

27. The system according to claim 16, wherein the processor further executes the computer-readable instructions to:

retrieve, from the database, a set of historical global positioning system (GPS) location data associated with at least a portion of historical service data for one or more of the plurality of drivers, wherein the GPS location data is received from a GPS receiver associated with one or more driver computing devices of the plurality of drivers; and calculate a level of familiarity with a route of at least one of the respective service requests for at least one driver of the plurality of drivers by (i) comparing a set of GPS location data for the route of the respective service request with the set of historical GPS location data, and (ii) determining a matching relationship between the set of GPS location data for the route of the respective service request and the set of historical GPS location data, wherein the level of familiarity is calculated by determining an amount of overlap between a route of the respective service request and route data associated with at least one of the set of the plurality of drivers; and display, on at least one customer computing device, the amount as at least one of: a tier, a range of tiers, a grade, a range of grades, a score, a range of scores, a percentage, a range of percentages, or a depiction or illustration, wherein at least one of the service relevant factors comprise the level of familiarity.

28. The system according to claim 16, wherein the processor further executes the computer-readable instructions to:

in response to one or more service requests remaining unassigned or not accepted by at least one driver, store the one or more unassigned or not accepted service requests in a job pool, the job pool accessible by at least one or more available drivers via one or more driver computing devices;

display the one or more unassigned service requests with one or more indicators on the one or more driver computing devices, wherein the one or more customer indicators correspond to a customer associated with the one or more unassigned or not accepted service requests;

receive a selection of the one or more unassigned service requests in the job pool by an available driver; and update the job pool in response to the selection.

29. The system according to claim 28, wherein the one or more customer indicators identify the service relevant factors associated with the unassigned or not accepted service requests.

30. The system according to claim 16, wherein the processor further executes the computer-readable instructions to:

receiving, from the driver assigned to at least one service request, an indication of inability by the driver to complete the at least one service request, and receive from the driver a request to transfer the at least one service request to a partner driver;

transmit, to the partner driver, a request to transfer the at least one service request;

receive acceptance of the request to transfer the at least one service request from the partner driver; and update the database to indicate transfer of the at least one service request to the partner driver.

* * * * *